US011463701B2

(12) United States Patent
Aono et al.

(10) Patent No.: US 11,463,701 B2
(45) Date of Patent: *Oct. 4, 2022

(54) CODING DEVICE PREDICTING CHROMINANCE BASED ON DOWN-SAMPLED LUMINANCE

(71) Applicants: SHARP KABUSHIKI KAISHA, Sakai (JP); FG Innovation Company Limited, Tuen Mun (HK)

(72) Inventors: Tomoko Aono, Sakai (JP); Tomohiro Ikai, Sakai (JP); Takeshi Chujoh, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,024

(22) Filed: May 20, 2021

(65) Prior Publication Data

US 2021/0274187 A1  Sep. 2, 2021

Related U.S. Application Data

(63) Continuation of application No. 16/644,525, filed as application No. PCT/JP2018/033251 on Sep. 7, 2018, now Pat. No. 11,051,021.

(30) Foreign Application Priority Data

Sep. 14, 2017 (JP) ................................. 2017-176817

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/117* (2014.11); *H04N 19/176* (2014.11); *H04N 19/186* (2014.11)

(58) Field of Classification Search
CPC .. H04N 19/132; H04N 19/105; H04N 19/117; H04N 19/176; H04N 19/186; H04N 19/154; H04N 19/593; H04N 19/70
(Continued)

(56) References Cited

U.S. PATENT DOCUMENTS

2014/0064386 A1* 3/2014 Chen ...................... H04N 19/30
 375/240.29
2017/0150186 A1* 5/2017 Zhang .................. H04N 19/625
2018/0205946 A1* 7/2018 Zhang .................. H04N 19/186

* cited by examiner

*Primary Examiner* — Marnie A Matt
(74) *Attorney, Agent, or Firm* — ScienBiziP, P.C.

(57) ABSTRACT

A prediction image generation method is provided. The method derives a down-sampled luminance image and a down-sampled neighboring luminance image by down-sampling the luminance image of a target block and a neighboring luminance image based on information related to a down-sampling and indicating one of a plurality of position relationships between at least one luma pixel and a chroma pixel. The method derives a neighboring chrominance image, parameters derived from the down-sampled neighboring luminance image and the neighboring chrominance image, and the prediction image by using the down-sampled luminance image and the parameters. The position relationships include that a position of the chroma pixel is identical to a position of one of the at least one luma pixel and that the position of the chroma pixel is located in an intermediate of two of the at least one luma pixel on a left side of a 2×2 luma pixel block.

18 Claims, 32 Drawing Sheets

(51) Int. Cl.
*H04N 19/117* (2014.01)
*H04N 19/176* (2014.01)
*H04N 19/186* (2014.01)

(58) Field of Classification Search
USPC .................................................. 375/240.02
See application file for complete search history.

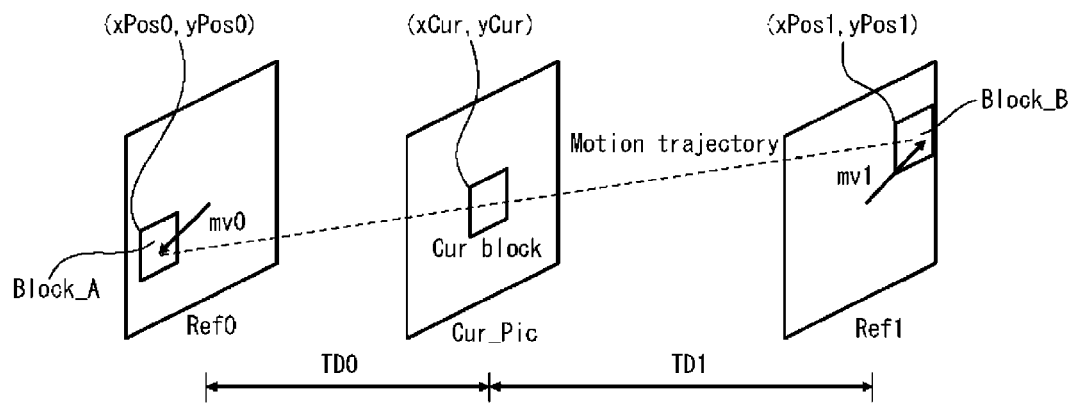
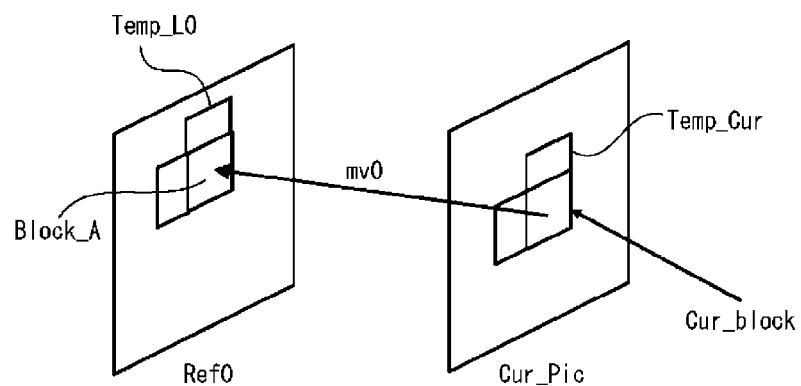
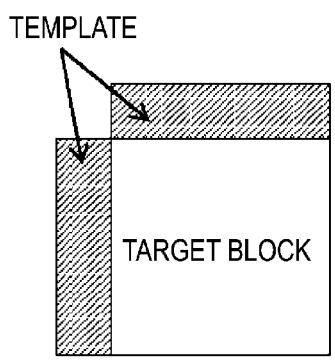
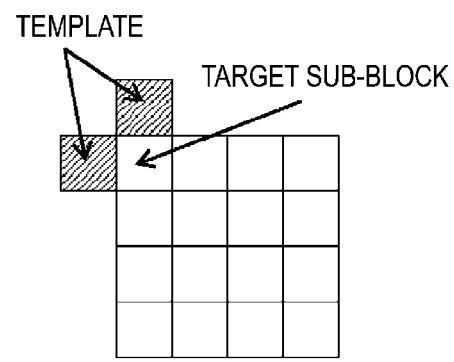
FIG. 12

(a)
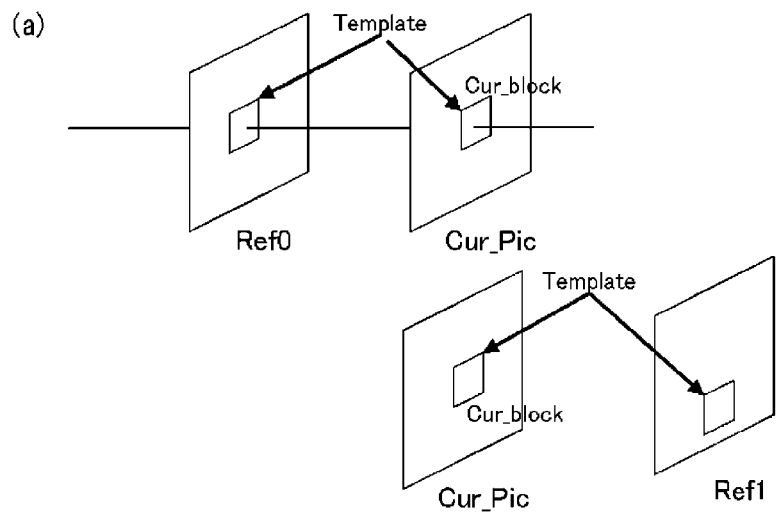
(b)
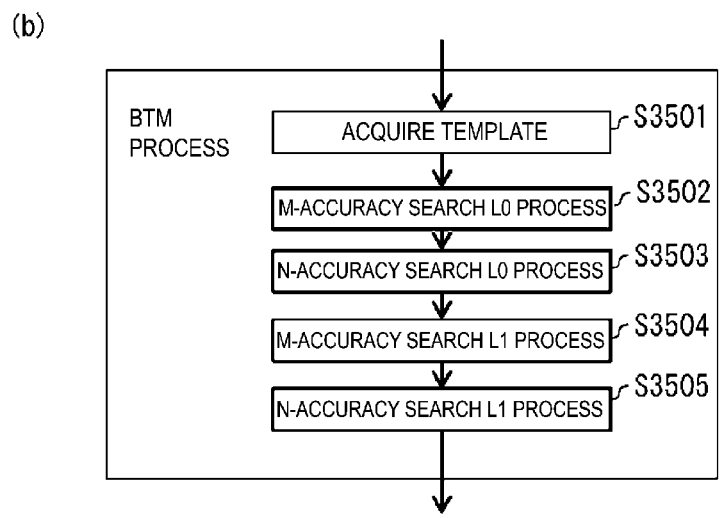
(c)
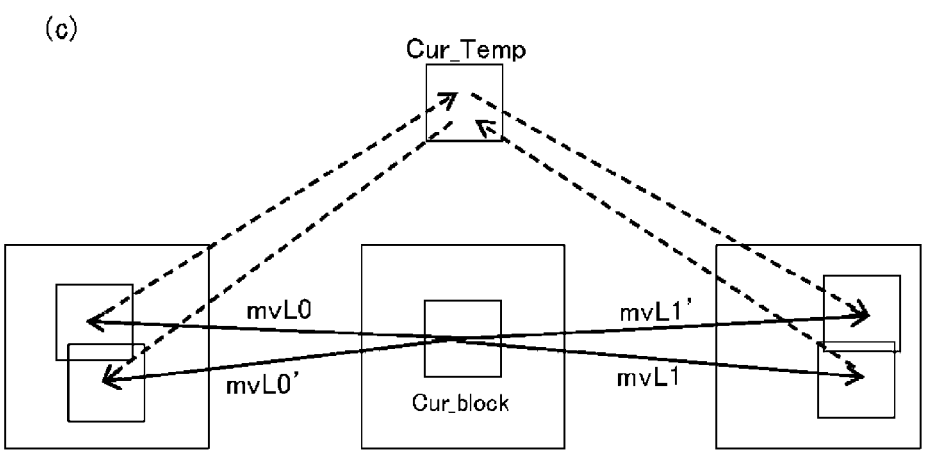
FIG. 14

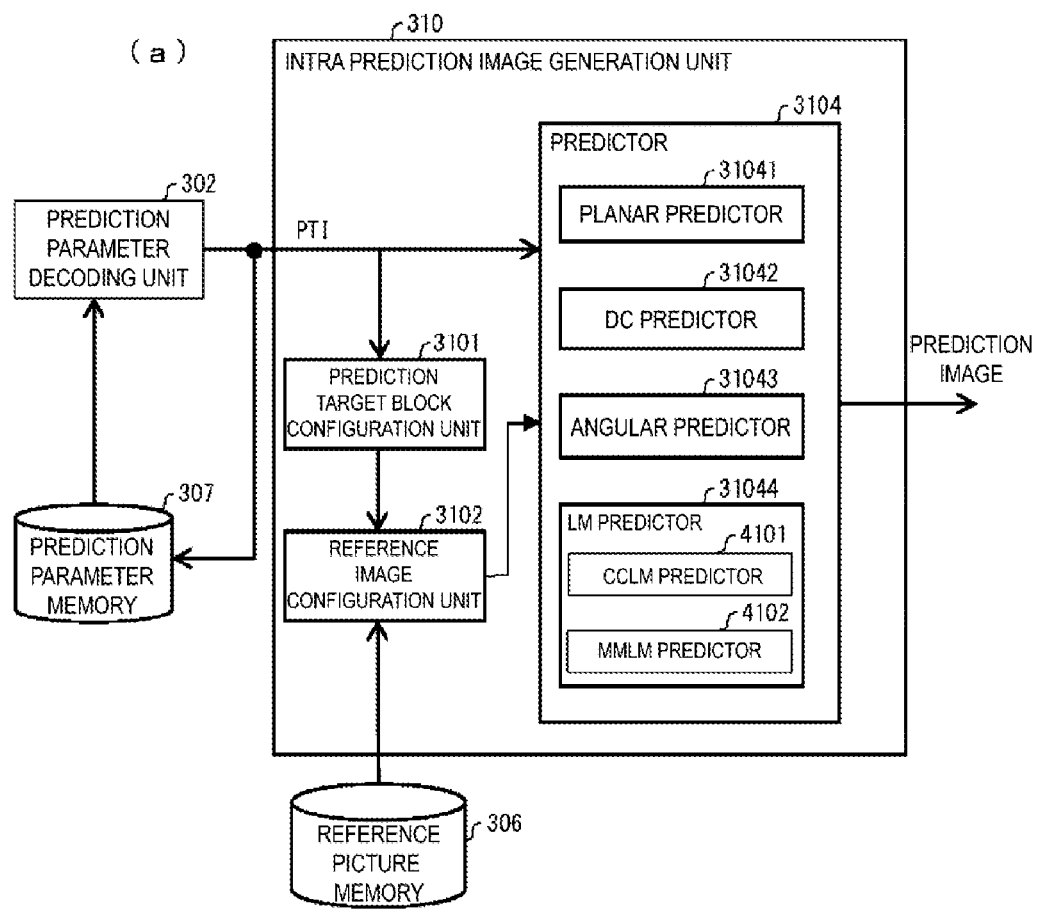
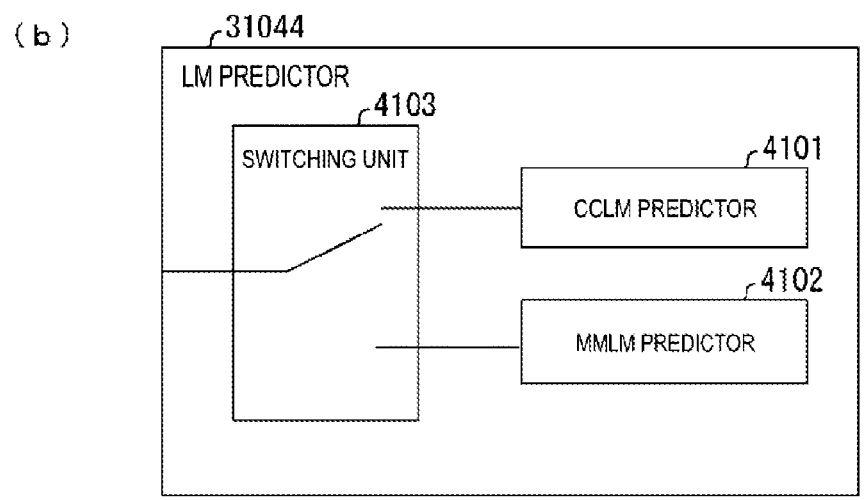
FIG. 18

(a) INCREMENT D OF SEARCH RANGE

| Sblk \ Spict | SMALLER THAN THP1 | GREATER THAN OR EQUAL TO TH1 AND SMALLER THAN THP2 | GREATER THAN OR EQUAL TO THP2 AND SMALLER THAN THP3 | GREATER THAN OR EQUAL TO THP3 |
|---|---|---|---|---|
| SMALLER THAN THP1 | 1 | 1 | 2 | 4 |
| GREATER THAN OR EQUAL TO TH1 AND SMALLER THAN THP2 | 2 | 2 | 4 | 8 |
| GREATER THAN OR EQUAL TO THS2 | 3 | 3 | 6 | 12 |

(b) THRESHOLD (THS1, THS2)

| SMALLER THAN THP1 | GREATER THAN OR EQUAL TO TH1 AND SMALLER THAN THP2 | GREATER THAN OR EQUAL TO THP2 AND SMALLER THAN THP3 | GREATER THAN OR EQUAL TO THP3 |
|---|---|---|---|
| (8, 16) | (12, 24) | (16, 32) | (16, 32) |

FIG. 19

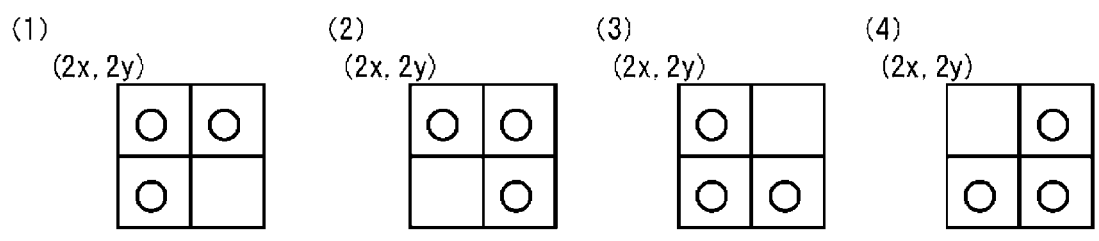
 LUMINANCE PIXEL INPUT TO MEDIAN FILTER
FIG. 30

(a)

| INTRA PREDICTION MODE | NUMBER OF LINEAR MODELS | FILTER INDEX |
|---|---|---|
| 67 | 1 | 0 |
| 68 | 1 | 1 |
| 69 | 1 | 2 |
| 70 | 1 | 3 |
| 71 | 2 | 0 |
| 72 | 2 | 1 |
| ... | ... | ... |

(b)

| INTRA PREDICTION MODE | NUMBER OF LINEAR MODELS | FILTER INDEX |
|---|---|---|
| 35 | 1 | 0 |
| 36 | 1 | 1 |
| 37 | 1 | 2 |
| 38 | 1 | 3 |
| 39 | 2 | 0 |
| 40 | 2 | 1 |
| ... | ... | ... |

(c)

| INTRA PREDICTION MODE | NUMBER OF LINEAR MODELS | FILTER INDEX |
|---|---|---|
| 0 (LM PREDICTION) | 1 | 0 |
| ... | ... | ... |
| 7 (LM PREDICTION) | 2 | 3 |
| 8 (PLANAR) | – | – |
| 9 (DC) | – | – |
| 10 (Angular) | – | – |
| ... | ... | ... |

(d)

| INTRA PREDICTION MODE | NUMBER OF LINEAR MODELS | FILTER INDEX |
|---|---|---|
| 0 (PLANAR) | – | – |
| 1 (DC) | – | – |
| 2 (LM PREDICTION) | 1 | 0 |
| ... | ... | ... |
| 9 (LM PREDICTION) | 2 | 3 |
| 10 (Angular PREDICTION) | – | – |
| ... | – | – |

CODING DEVICE PREDICTING CHROMINANCE BASED ON DOWN-SAMPLED LUMINANCE

CROSS-REFERENCE TO RELATED APPLICATION(S)

This application is a continuation application of U.S. patent application Ser. No. 16/644,525, filed on Mar. 5, 2020, currently pending, which is a national stage application of International Patent Application PCT/JP2018/033251, filed on Sep. 7, 2018, now published as WO2019/054300, which claims the benefit of and priority to a JP Patent Application Serial No. 2017-176817, filed on Sep. 14, 2017. The contents of JP Patent Application 2017-176817, International Patent Application PCT/JP2018/033251 and U.S. patent application Ser. No. 16/644,525 are hereby incorporated fully by reference into the present disclosure.

TECHNICAL FIELD

One aspect of the present invention relates to an image decoding device and an image encoding device.

BACKGROUND ART

An image encoding device (a video encoding device) which generates coded data by coding a video, and an image decoding device (a video decoding device) which generates decoded images by decoding the coded data are used to transmit or record a video efficiently.

Examples of specific video coding schemes include schemes suggested in H.264/AVC and High-Efficiency Video Coding (HEVC).

In such a video coding scheme, images (pictures) constituting a video are managed by a hierarchy structure including slices obtained by splitting images, Coding Tree Units (CTUs) obtained by splitting the slices, Coding Units (CUs) obtained by splitting the coding tree units, Prediction Units (PUs) which are blocks obtained by splitting the coding units, and Transform Units (TUs), and are coded/decoded for each CU.

In such a video coding scheme, usually, a prediction image is generated based on local decoded images obtained by coding/decoding input images, and prediction residual (also sometimes referred to as "difference images" or "residual images") obtained by subtracting the prediction images from input images (original images) are coded. Generation methods of prediction images include an inter-picture prediction (an inter prediction) and an intra-picture prediction (intra prediction) (NPL 1).

In recent years, there has been an active development of prediction schemes that do not encode parameters necessary for image generation in a prediction scheme or that reduce parameters to be coded by using a correlation in the spatial or temporal direction of the video. For example, it is known that a Linear Model (LM) prediction scheme for predicting chrominance from luminance in an intra prediction, a Frame Rate Up Conversion (FRUC) scheme and a Bilateral Template Maching (BTM) scheme that perform motion estimation on a decoder side in an inter prediction have large improvement in coding efficiency.

CITATION LIST

Non Patent Literature

NPL 1: "Algorithm Description of Joint Exploration Test Model 7", JVET-G1001, Joint Video Exploration Team (JVET) of ITU-T SG 16 WP 3 and ISO/IEC JTC 1/SC 29/WG 11, 13-21 Jul. 2017

NPL 2: ITU-T H.265 (04/2015) SERIES H: AUDIOVISUAL AND MULTIMEDIA SYSTEMS Infrastructure of audiovisual services—Coding of moving video High efficiency video coding

SUMMARY OF INVENTION

Technical Problem

The coding efficiency and the amount of processing can be further improved in methods that use the correlation between spatial and temporal directions to estimate parameters that are required for predictions. For example, in the LM prediction for predicting chrominance pixels from luminance pixels, in a case of a format in which the number of luminance pixels is greater than the number of chrominance pixels, luminance pixels are once down-sampled, but there is a problem in that the coding amount of a switching signal for selecting a down-sampling filter corresponding to pixel positions of luminance and chrominance is large. In FRUC and BTM, a motion vector required for the prediction is estimated by performing the same matching process in the image encoding device and the image decoding device, but in particular, the load of data transfer is large in small blocks.

Solution to Problem

A decoding device according to an aspect of the present invention for generating a prediction image of chrominance by using a luminance image includes a decoding circuitry and a predictor. The decoding circuitry decodes information related to a down-sampling in a sequence parameter set. The information indicates one of a plurality of position relationships between at least one luma pixel and a chroma pixel. The predictor derives (i) a down-sampled luminance image derived by down-sampling the luminance image of a target block, (ii) a down-sampled neighboring luminance image derived by down-sampling a neighboring luminance image, (iii) a neighboring chrominance image and (iv) parameters derived from the down-sampled neighboring luminance image and the neighboring chrominance image. Each of the down-sampled luminance image and the down-sampled neighboring luminance image is derived based on the information. The plurality of position relationships include that a position of the chroma pixel is identical to a position of one of the at least one luma pixel and that the position of the chroma pixel is located in an intermediate of two of the at least one luma pixel on a left side of a 2×2 luma pixel block. The prediction image is derived by using the down-sampled luminance image and the parameters.

A coding device according to an aspect of the present invention for generating a prediction image of chrominance by using a luminance image includes a coding circuitry and a predictor. The coding circuitry codes information related to a down-sampling in a sequence parameter set. The information indicates one of a plurality of position relationships between at least one luma pixel and a chroma pixel. The predictor derives (i) a down-sampled luminance image derived by down-sampling the luminance image of a target block, (ii) a down-sampled neighboring luminance image derived by down-sampling a neighboring luminance image, (iii) a neighboring chrominance image and (iv) parameters derived from the down-sampled neighboring luminance image and the neighboring chrominance image. Each of the down-sampled luminance image and the down-sampled neighboring luminance image is derived based on the information. The plurality of position relationships include that a position of the chroma pixel is identical to a position of one of the at least one luma pixel and that the position of the chroma pixel is located in an intermediate of two of the at least one luma pixel on a left side of a 2×2 luma pixel block. The prediction image is derived by using the down-sampled luminance image and the parameters.

A prediction image generation method for generating a prediction image of chrominance by using a luminance image includes deriving a down-sampled luminance image by down-sampling the luminance image of a target block based on information related to a down-sampling and indicating one of a plurality of position relationships between at least one luma pixel and a chroma pixel, deriving a down-sampled neighboring luminance image by down-sampling a neighboring luminance image based on the information, deriving a neighboring chrominance image, deriving parameters derived from the down-sampled neighboring luminance image and the neighboring chrominance image, and deriving the prediction image by using the down-sampled luminance image and the parameters. The plurality of position relationships include that a position of the chroma pixel is identical to a position of one of the at least one luma pixel and that the position of the chroma pixel is located in an intermediate of two of the at least one luma pixel on a left side of a 2×2 luma pixel block.

Advantageous Effects of Invention

According to an aspect of the present invention, the problem of down-sampling in an LM prediction can be solved and coding efficiency can be improved. In FRUC and BTM, the load of transfer can be significantly reduced while suppressing the reduction in the coding efficiency by reducing the amount of data transferred by the image encoding device and the image decoding device.

BRIEF DESCRIPTION OF DRAWINGS

FIG. 12(a) is a diagram for illustrating Bilateral matching.
FIG. 12(b) is a diagram for illustrating Template matching.

FIG. 14 is a diagram illustrating a bilateral template matching process.

FIG. 18 is a block diagram illustrating a configuration of an LM predictor.

FIG. 19 is a diagram illustrating an example of an increment of a search range.

FIG. 30 is a diagram illustrating a luminance pixel position to be input to a median filter.

FIG. 32 is a diagram illustrating an example of an intra prediction mode in an LM prediction mode.

DESCRIPTION OF EMBODIMENTS

First Embodiment

Hereinafter, embodiments of the present invention are described with reference to the drawings.

Figure 29:
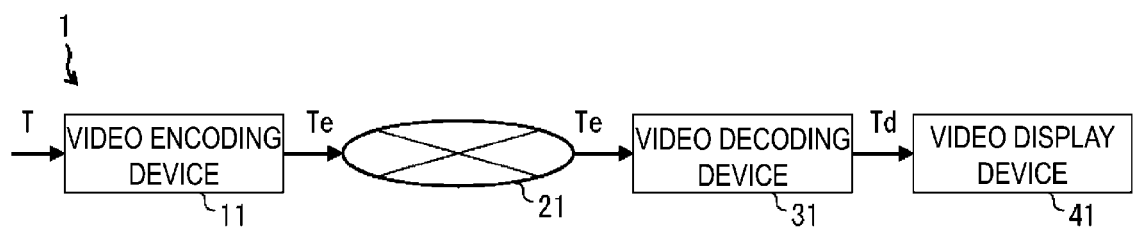
FIG. 29 is a schematic diagram illustrating a configuration of an image transmission system according to the present embodiment.

FIG. 29 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image encoding device (video encoding device) 11, a network 21, an image decoding device (video decoding device) 31, and an image display device (video display device) 41.

An image T indicating an image of a single layer or multiple layers is input to the image encoding device 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. In a case of not performing a prediction, in a case of (simulcast), coded data can be compiled.

The network 21 transmits a coding stream Te generated by the image encoding device 11 to the image decoding device 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blue-ray Disc (BD).

The image decoding device 31 decodes each of the coding streams Te transmitted by the network 21, and generates one or multiple decoded images Td.

The image display device 41 displays all or part of one or multiple decoded images Td generated by the image decoding device 31. For example, the image display device 41 includes a display device such as a liquid crystal display and an organic Electro-luminescence (EL) display. Examples of a display type include stationary, mobile, HMD, and the like. In spatial scalable coding and SNR scalable coding, in a case that the image decoding device 31 and the image display device 41 have high processing capability, an enhanced layer image having high image quality is displayed, and in a case of having lower processing capability, a base layer image which does not require as high processing capability and display capability as an enhanced layer is displayed.

Operator

Operators used herein will be described below.

An operator ">>" is a right bit shift operator, "<<" is a left bit shift operator, "&" is a bitwise AND operator, "|" is a bitwise OR operator, and "|=" is an OR assignment operator.

An operator "x ? y:z" is a ternary operator representing that y is obtained in case that x is true (that is, other than "0") or z is obtained in a case that x is false (that is, "0").

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

"abs(a)" is a function that returns an absolute value of a.

"Int(a)" is a function that returns an integer value of a.

"floor(a)" is a function that returns a maximum integer that is smaller or equal to a.

"a/d" represents a division of a by d (decimal places are rounded down).

Structure of Coding Stream Te

Prior to the detailed description of the image encoding device 11 and the image decoding device 31 according to the present embodiment, the data structure of the coding stream Te generated by the image encoding device 11 and decoded by the image decoding device 31 will be described.

Figure 1:
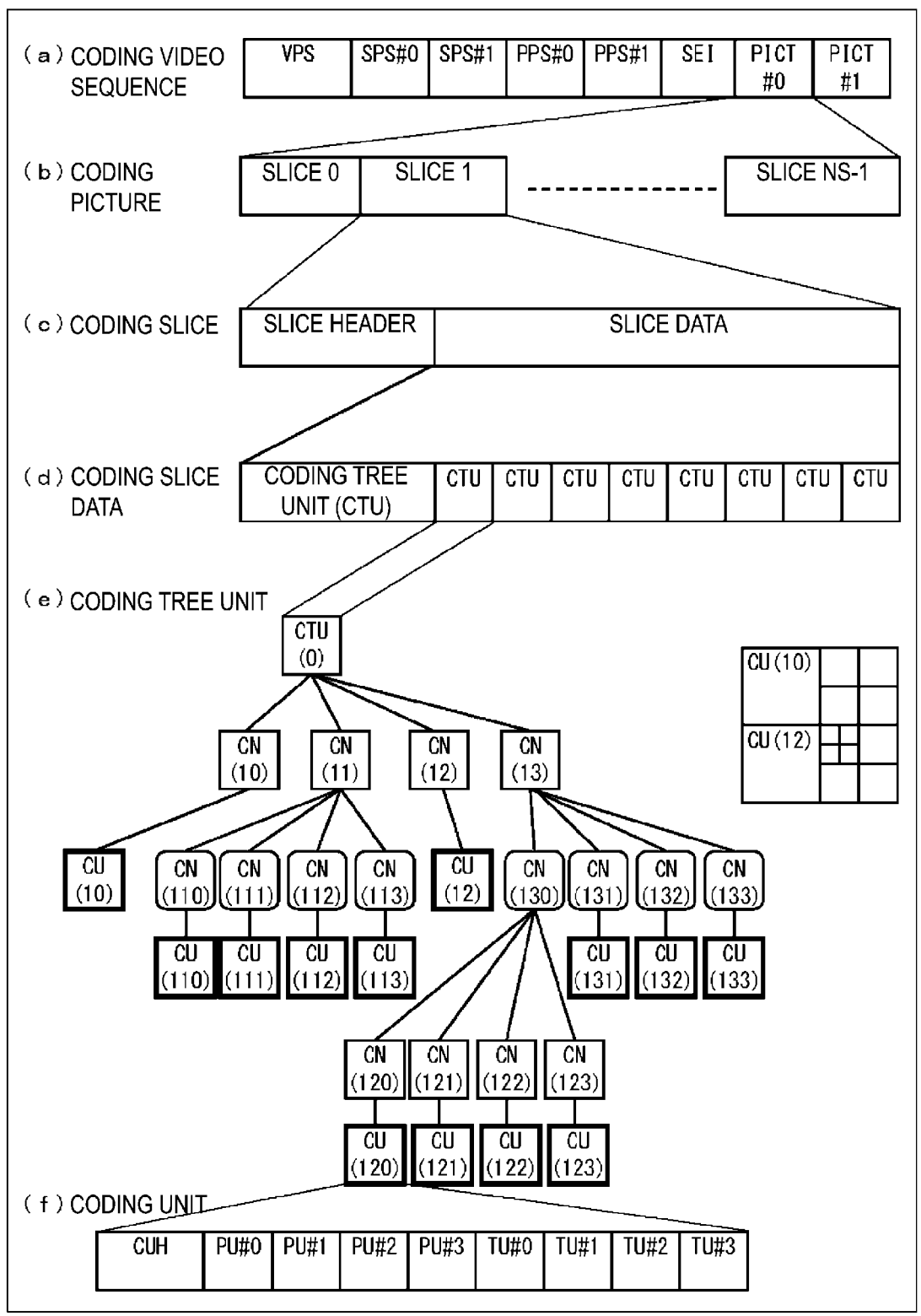
FIG. 1 is a diagram illustrating a hierarchy structure of data of a coding stream according to the present embodiment.

FIG. 1 is a diagram illustrating a hierarchy structure of data in the coding stream Te. The coding stream Te includes a sequence and multiple pictures constituting a sequence illustratively. (a) to (f) of FIG. 1 are diagrams illustrating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referred to by the image decoding device 31 to decode the sequence SEQ of a processing target is prescribed. As illustrated in (a) of FIG. 1, the sequence SEQ includes a Video Parameter Set VPS, a Sequence Parameter Set SPS, a Picture Parameter Set PPS, a picture PICT, and Supplemental Enhancement Information SEI. Here, a value indicated after # indicates a layer ID. FIG. 1 illustrates an example in which there is coded data of #0 and #1, that is, layer 0 and layer 1, but types of layer and the number of layers are not limited thereto.

In the video parameter set VPS, for a video including multiple layers, a set of coding parameters common to multiple videos and a set of coding parameters associated with multiple layers and an individual layer included in a video are prescribed.

In the sequence parameter set SPS, a set of coding parameters referred to by the image decoding device 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the image decoding device 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each slice header in a target sequence.

Coding Picture

In the coding picture, a set of data referred to by the image decoding device 31 to decode the picture PICT of a processing target is prescribed. As illustrated in (b) of FIG. 1, the picture PICT includes slices S0 to SNS−1 (NS is the total number of slices included in the picture PICT).

Note that in a case not necessary to distinguish the slices S0 to SNS−1 below, subscripts of reference signs may be omitted and described. The same applies to other data included in the coding stream Te described below and described with an added subscript.

Coding Slice

In the coding slice, a set of data referred to by the image decoding device 31 to decode the slice S of a processing target is prescribed. As illustrated in (c) of FIG. 1, the slice S includes a slice header SH and a slice data SDATA.

The slice header SH includes a coding parameter group referred to by the image decoding device 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, (3) B slice using a unidirectional prediction, a bidirectional prediction, or an intra prediction in coding, and the like. Note that an inter prediction is not limited to a uni-prediction or a bi-prediction, and a greater number of reference pictures may be used to generate a prediction image. Hereinafter, in a case that a slice is referred to as a P or B slice, the slice refers to a slice that includes a block that may employ an inter prediction.

Note that, the slice header SH may include a reference (pic_parameter_set_id) to the picture parameter set PPS included in the coding video sequence.

Coding Slice Data

In the coding slice data, a set of data referred to by the image decoding device 31 to decode the slice data SDATA of a processing target is prescribed. As illustrated in (d) of FIG. 1, the slice data SDATA includes a Coding Tree Unit (CTU, CTU block). The CTU is a block of a fixed size (for example, 64×64) constituting a slice, and may be referred to as a Largest Coding Unit (LCU).

Coding Tree Unit

In (e) of FIG. 1, a set of data referred to by the image decoding device 31 to decode the coding tree unit of a processing target is prescribed. The coding tree unit is split into Coding Units (CUs), each of which is a basic unit of coding processing, by recursive quad tree split (QT split) or binary tree split (BT split). A tree structure obtained by the recursive quad tree splits or binary tree is referred to as a Coding Tree (CT), and a node of the tree structure is referred to as a Coding Node (CN). An intermediate node of the quad tree or binary tree is a coding node, and the coding tree unit itself is also prescribed as the highest coding node.

The CT includes, as CT information, a QT split flag (cu_split_flag) indicating whether or not to perform the QT split and a BT split mode (split_bt_mode) indicating a split method of the BT split. cu_split_flag and/or split_bt_mode are transmitted for each coding node CN. In a case that cu_split_flag is 1, the coding node CN is split into four coding nodes CN. At the time when cu_split_flag is 0, in a case that split_bt_mode is 1, the coding node CN is horizontally split into two coding nodes CN, in a case that split_bt_mode is 2, the coding node CN is vertically split into two coding nodes CN, and in a case that split_bt_mode is 0, the coding node CN is not split and has one coding unit CU as a node. The coding unit CU is an end node (leaf node) of the coding nodes, and is not split anymore.

In a case that a size of the coding tree unit CTU is 64×64 pixels, a size of the coding unit can be any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, and 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

In (f) of FIG. 1, a set of data referred to by the image decoding device 31 to decode the coding unit of a processing target is prescribed. Specifically, the coding unit includes a prediction tree, a transform tree, and a CU header CUH. In the CU header, a prediction mode, a split method (PU split mode), and the like are prescribed.

In the prediction tree, prediction parameters (a reference picture index, a motion vector, and the like) of each prediction unit (PU) are prescribed, the prediction unit being obtained by splitting the coding unit into one or multiple pieces. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "sub-block". The sub-block includes multiple pixels. In a case that the sizes of the prediction unit and the sub-block are the same, there is one sub-block in the prediction unit. In a case that the prediction unit is larger than the size of the sub-block, the prediction unit is split into sub-blocks. For example, in a case that the prediction unit is 8×8, and the sub-block is 4×4, the prediction unit is split into four sub-blocks formed by horizontal split into two and vertical split into two.

The prediction processing may be performed for each of these prediction units (sub-blocks).

Types of prediction for the prediction tree are roughly classified into two for a case of the intra prediction and a case of the inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N, N×N, and the like. Expressions of 2N×N and N×2N represent a 1:1 symmetric partition, and expressions of 2N×nU and 2N×nD, and nL×2N and nR×2N represent a 1:3 asymmetric partition and a 3:1 asymmetric partition, respectively. The PUs included in the CU are expressed as PU0, PU1, PU2, and PU3 sequentially.

Figure 2:
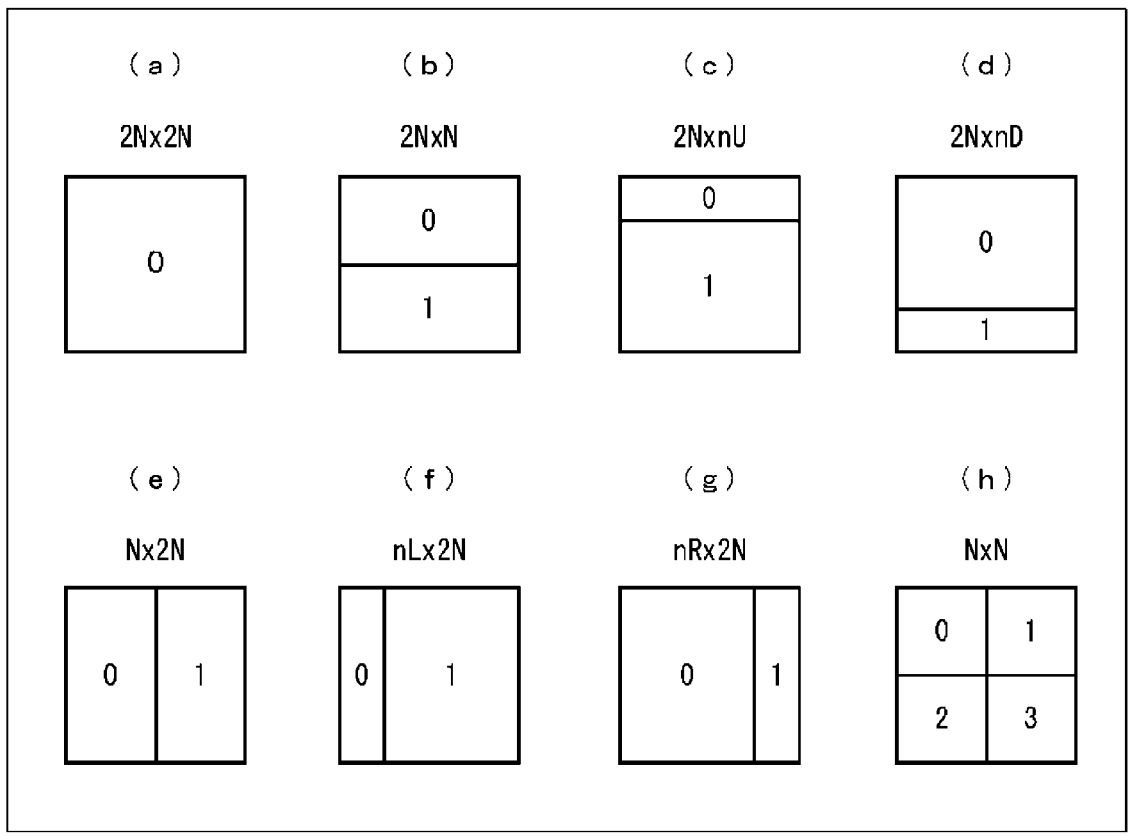
FIG. 2 is a diagram illustrating patterns of PU split modes. (a) to (h) illustrate partition shapes in cases that PU split modes are 2N×2N, 2N×N, 2N×nU, 2N×nD, N×2N, nL×2N, nR×2N, and N×N, respectively.

(a) to (h) of FIG. 2 illustrate shapes of partitions in respective PU split modes (positions of boundaries of PU split) specifically. (a) of FIG. 2 illustrates a partition of 2N×2N, and (b), (c), and (d) of FIG. 2 illustrate partitions (horizontally long partitions) of 2N×N, 2N×nU, and 2N×nD, respectively. (e), (f), and (g) of FIG. 2 illustrate partitions (vertically long partitions) in cases of N×2N, nL×2N, and nR×2N, respectively, and 2(h) illustrates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units TUs, and a position and size of each transform unit are prescribed. In another expression, the transform unit is one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameters) will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real devices and methods.

Examples of an syntax element for deriving the inter prediction parameter included in the coded data include a PU split mode part_mode, a merge flag merge_flag, a merge index merge_idx, an inter prediction identifier inter_pred_idc, a reference picture index ref_idx_lX (refIdxLX), a prediction vector index mvp_lX_idx, and a difference vector mvdLX, for example.

Reference Picture List

Figure 3:
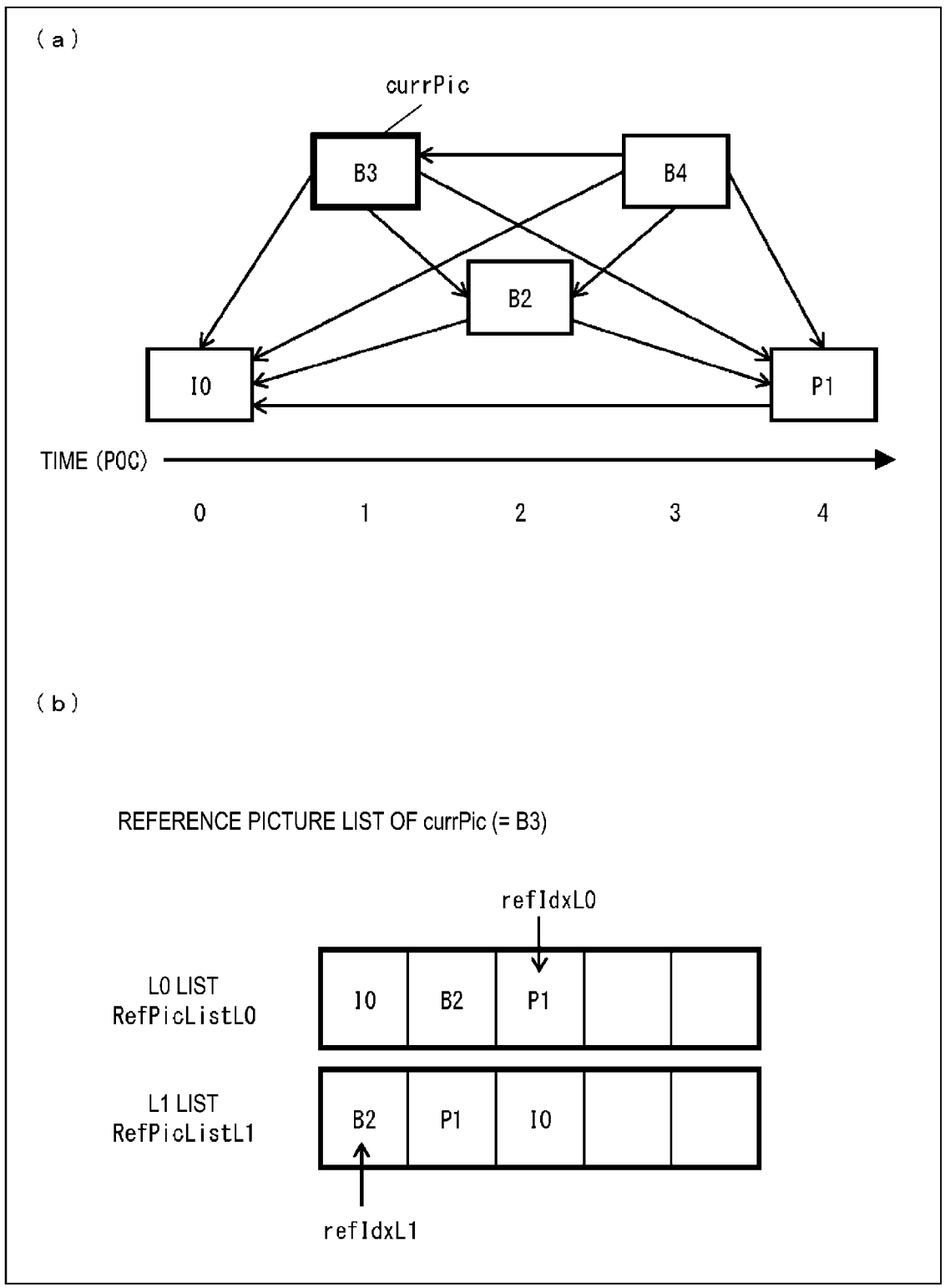
FIG. 3 is a conceptual diagram illustrating an example of reference pictures and reference picture lists.

A reference picture list is a list constituted by reference pictures stored in a reference picture memory 306. FIG. 3 is a conceptual diagram illustrating an example of reference pictures and reference picture lists. In FIG. 3(a), a rectangle represents a picture, an arrow represents a picture reference relationship, an abscissa represents time, characters "I", "P", and "B" in the rectangles represent an intra picture, a uni-prediction picture, and a bi-prediction picture, respectively, and a numeral in the rectangle represents a decoding order. As illustrated, the decoding order of the pictures is I0, P1, B2, B3, and B4, and the display order is I0, B3, B2, B4, and P1. FIG. 3(b) illustrates an example of the reference picture lists. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, the reference picture includes these pictures as elements. In each prediction unit, which picture in the reference picture list RefPicListX (X=0 or 1) is referred to is indicated by a reference picture index refIdxLX. The diagram indicates an example where reference pictures P1 and B2 are referred to by refIdxL0 and refIdxL1. Note that "LX" is a description method used in a case that L0 prediction and L1 prediction are not distinguished from each other, and parameters for the L0 list and parameters for the L1 list are distinguished by replacing "LX" with "L0" and "L1" in the following description.

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these. The merge mode is a mode in which a prediction list utilization flag predFlagLX (or inter prediction identifier inter_pred_idc), a reference picture index refIdxLX, and a motion vector mvLX are not included in the coded data, but is derived from prediction parameters for a neighboring PU already processed. The AMVP mode is a mode in which the inter prediction identifier inter_pred_idc, the reference picture index refIdxLX, and the motion vector mvLX are included in the coded data. Note that the motion vector mvLX is coded as a prediction vector index mvp_lX_idx identifying the prediction vector mvpLX and as a difference vector mvdLX.

The inter prediction indicator inter_pred_idc is a value indicating types and the number of reference pictures, and takes any value of PRED_L0, PRED_L1, and PRED_BI. PRED_L0 and PRED_L1 indicate to use reference pictures managed in the reference picture list of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_lX_idx is an index indicating a prediction vector, and the reference picture index refIdxLX is an index indicating reference pictures managed in a reference picture list.

The merge index merge_idx is an index to indicate to use which prediction parameter as a prediction parameter of a decoding target PU among prediction parameter candidates (merge candidates) derived from PUs for which the processing is completed.

Motion Vector

The motion vector mvLX indicates a displacement (shift) between the blocks on two different pictures. A prediction vector and a difference vector related to the motion vector mvLX is referred to as a prediction vector mvpLX and a difference vector mvdLX respectively. Inter Prediction indicator inter_pred_idc and Prediction List Utilization Flag predFlagLX A relationship between an inter prediction indicator inter_pred_idc and prediction list utilization flags predFlagL0 and predFlagL1 are as follows, and those can be converted mutually.
 inter_pred_idc=(predFlagL1<<1)+predFlagL0
 predFlagL0=inter_pred_idc & 1
 predFlagL1=inter_pred_idc>>1

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred of whether or not a bi-prediction BiPred can be derived from whether or not two prediction list utilization flags are both 1. For example, the flag can be derived by the following expression.

biPred=(predFlagL0==1 && predFlagL1==1)

The flag biPred can be also derived from whether an inter prediction indicator is a value indicating to use two prediction lists (reference pictures). For example, the flag can be derived by the following expression.

biPred=(inter_pred_idc==PRED_BI) ? 1:0

The above expression can be also expressed by the following expression.

biPred=(inter_pred_idc==PRED_BI)

Note that, for example, PRED_BI can use the value of 3.

Intra Prediction

Next, an intra prediction prediction parameter will be described.

The intra prediction parameter is a parameter used for processing to predict a CU with information in a picture, for example, an intra prediction mode IntraPredMode. And a luminance intra prediction mode IntraPredModeY and a chrominance intra prediction mode IntraPredModeC may be different from each other. There are 67 types of intra prediction modes, for example, and are composed of Planar prediction, DC prediction, Angular (direction) prediction. For the chrominance prediction mode IntraPredModeC, for example, any of a Planar prediction, a DC prediction, an Angular prediction, a direct mode (mode in which a prediction mode for luminance is used), and LM prediction (a mode for performing linear prediction, based on the luminance pixel) is used.

The luminance intra prediction mode IntraPredModeY is derived using a Most Probable Mode (MPM) candidate list including intra prediction modes estimated to have a high probability of being applied to a target block in one case, and is derived from REM that is a prediction mode not included in the MPM candidate list in the other case. Which method is to be used is signaled with a flag prev_intra_luma_pred_flag, and in the former case, an index mpm_idx and the MPM candidate list derived from an intra prediction mode of a neighboring block is used to derive IntraPredModeY. In the latter case, a flag rem_selected_mode_flag, and modes rem_selected_mode and rem_non_selected_mode are used to derive the intra prediction mode.

The chrominance intra prediction mode IntraPredModeC is derived using a flag not_lm_chroma_flag indicating whether or not to use the LM prediction in a case, is derived using a flag not_dm_chroma_flag indicating whether or not to use the direct mode in a case, or is derived using an index chroma_intra_mode_idx directly specifying the intra prediction mode applied to a chrominance pixel in a case.

Loop Filter

A loop filter is a filter provided in a coding loop to remove a block distortion and a ringing distortion and improve an image quality. The loop filter mainly includes a deblocking filter, a Sample Adaptive Offset (SAO), and an Adaptive Loop Filter (ALF).

In a case that a difference in deblock-unperformed pixel values of pixels of the luminance component neighboring to each other through the block boundary is less than a predetermined threshold value, the deblocking filter performs deblocking on the pixels of the luminance and the chrominance component with respect to the block boundary to smooth the image in the vicinity of the block boundary.

The SAO is a filter that is applied after the deblocking filtering, and has the effect of removing a ringing distortion and a quantization distortion. The SAO, which is a process in units of CTU, is a filter that classifies pixel values into several categories to add or subtract offsets in units of pixel for each category. Edge offset (EO) processing of the SAO determines an offset value that is added to the pixel value in accordance with a magnitude relationship between the target pixel and the neighboring pixel (reference pixel).

The ALF subjects a ALF-unperformed decoded image to an adaptive filtering process using an ALF parameter (filter coefficient) ALFP that is decoded from the coding stream Te to generate a ALF-performed decoded image.

The filter coefficient is signaled immediately after the slice header and stored in a memory. In a slice or picture for which the subsequent inter prediction is used, other than signaling the filter coefficients themselves, filter coefficients that have been signaled in the past and stored in the memory are specified by indexes without signaling the filter coefficients themselves to reduce a bit amount required to code the filter coefficients.

Entropy Coding

Entropy coding includes a method of variable-length coding a syntax using a context (probability model) that is adaptively selected depending on the type of syntax or the surrounding situation, and a method of variable-length coding a syntax using a predetermined table or calculation formula. In the former Context Adaptive Binary Arithmetic Coding (CABAC), the probability model updated for each coded or decoding picture is stored in the memory. Then, in the P picture or B picture for which the subsequent inter prediction is used, as an initial state of the context of the target picture, a probability model of the picture using the same slice type and the same slice level quantization parameter is selected among the probability models stored in the memory and is used for coding and decoding processing.

Configuration of Image Decoding Device

Figure 5:
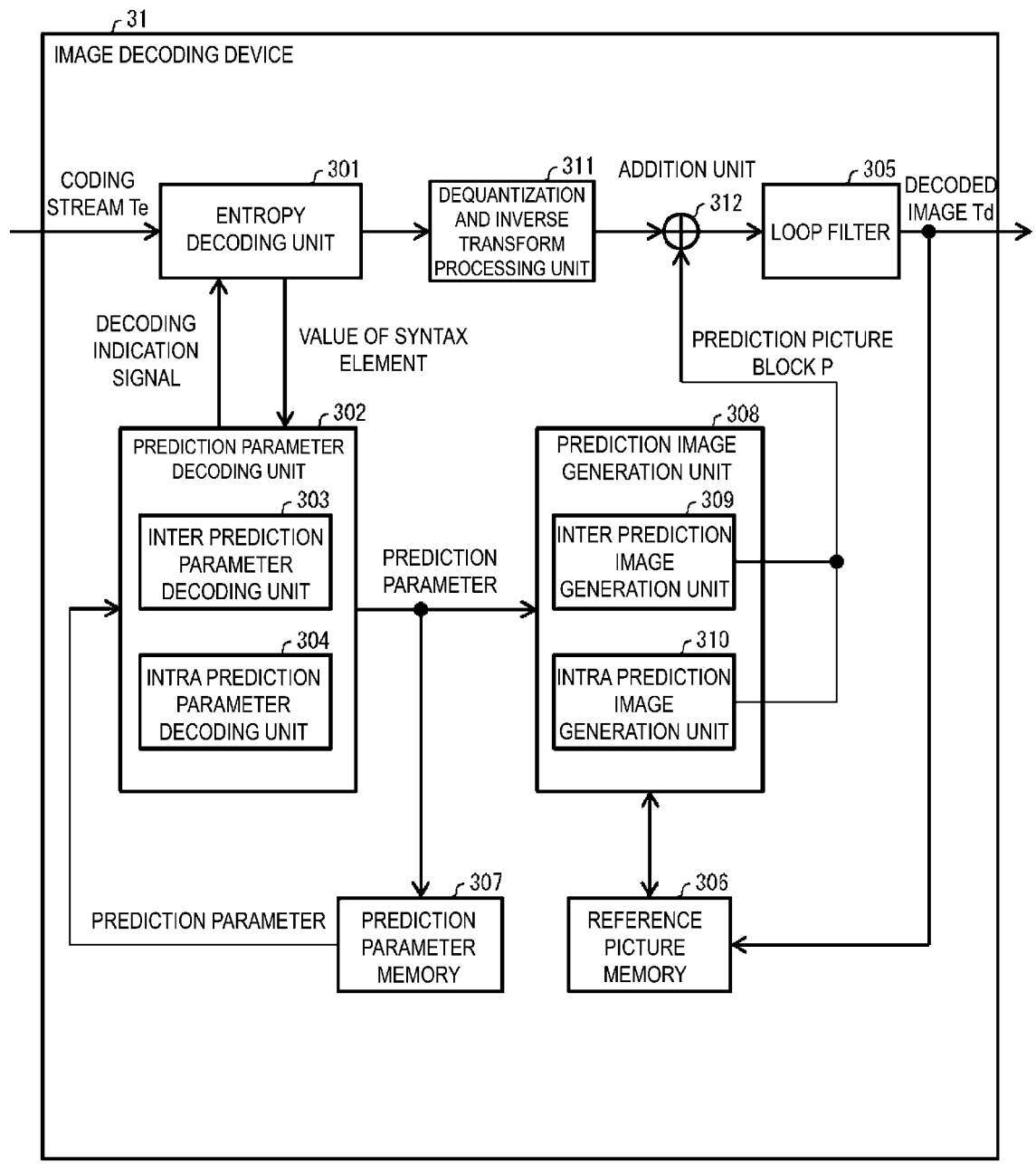
FIG. 5 is a diagram illustrating a configuration of an image decoding device according to the present embodiment.

A configuration of the image decoding device 31 will be described. A configuration of the image decoding device 31 as an example will be described below with reference to FIG. 5. FIG. 5 is a block diagram illustrating a configuration of the image decoding device 31. The image decoding device 31 includes an entropy decoding unit 301, a prediction parameter decoding unit (a prediction image decoding device) 302, a loop filter 305, a reference picture memory 306, a prediction parameter memory 307, a prediction image generation unit (prediction image generation device) 308, a dequantization and inverse transform processing unit 311, and an addition unit 312. Note that, in conformity with the following image encoding device 11, the image decoding device 31 may be configured without including the loop filter 305.

The prediction parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310.

In addition, examples in which the CTU, the CU, the PU, and the TU are used as the units for processing are described below, but the present invention is not limited to this example, and the process may be performed in units of CU instead of in units of TU or PU. Alternatively, the CTU, the CU, the PU, and the TU may be interpreted as the block, and the process may be interpreted as the process in units of block.

The entropy decoding unit 301 performs entropy decoding on the coding stream Te input from the outside, and separates and decodes individual codes (syntax elements). Examples of the separated codes include the prediction parameters for generating the prediction image and residual information for generating a difference image.

The entropy decoding unit 301 outputs a part of the separated codes to the prediction parameter decoding unit 302. Examples of a part of the separated codes include a prediction mode predMode, a PU split mode part_mode, a merge flag merge_flag, a merge index merge_idx, an inter prediction identifier inter_pred_idc, a reference picture index ref_idx_lX, a prediction vector index mvp_lX_idx, and a difference vector mvdLX. The control of which code to decode is performed based on an indication of the prediction parameter decoding unit 302. The entropy decoding unit 301 outputs quantized transform coefficients to the dequantization and inverse transform processing unit 311. These quantized transform coefficients are coefficients obtained through quantization by performing, on the residual signal, frequency conversion such as Discrete Cosine Transform (DCT), Discrete Sine Transform (DST), and Karyhnen Loeve Transform (KLT).

The inter prediction parameter decoding unit 303 decodes an inter prediction parameter with reference to a prediction parameter stored in the prediction parameter memory 307, based on a code input from the entropy decoding unit 301. The inter prediction parameter decoding unit 303 outputs the decoded inter prediction parameter to the prediction image generation unit 308, and also stores the decoded inter prediction parameter in the prediction parameter memory 307. Details of the inter prediction parameter decoding unit 303 will be described later.

The intra prediction parameter decoding unit 304 decodes an intra prediction parameter with reference to a prediction parameter stored in the prediction parameter memory 307, based on a code input from the entropy decoding unit 301. The intra prediction parameter is a parameter used in a processing to predict a CU in one picture, for example, an intra prediction mode IntraPredMode. The intra prediction parameter decoding unit 304 outputs a decoded intra prediction parameter to the prediction image generation unit 308, and also stores the decoded intra prediction parameter in the prediction parameter memory 307.

Figure 15:
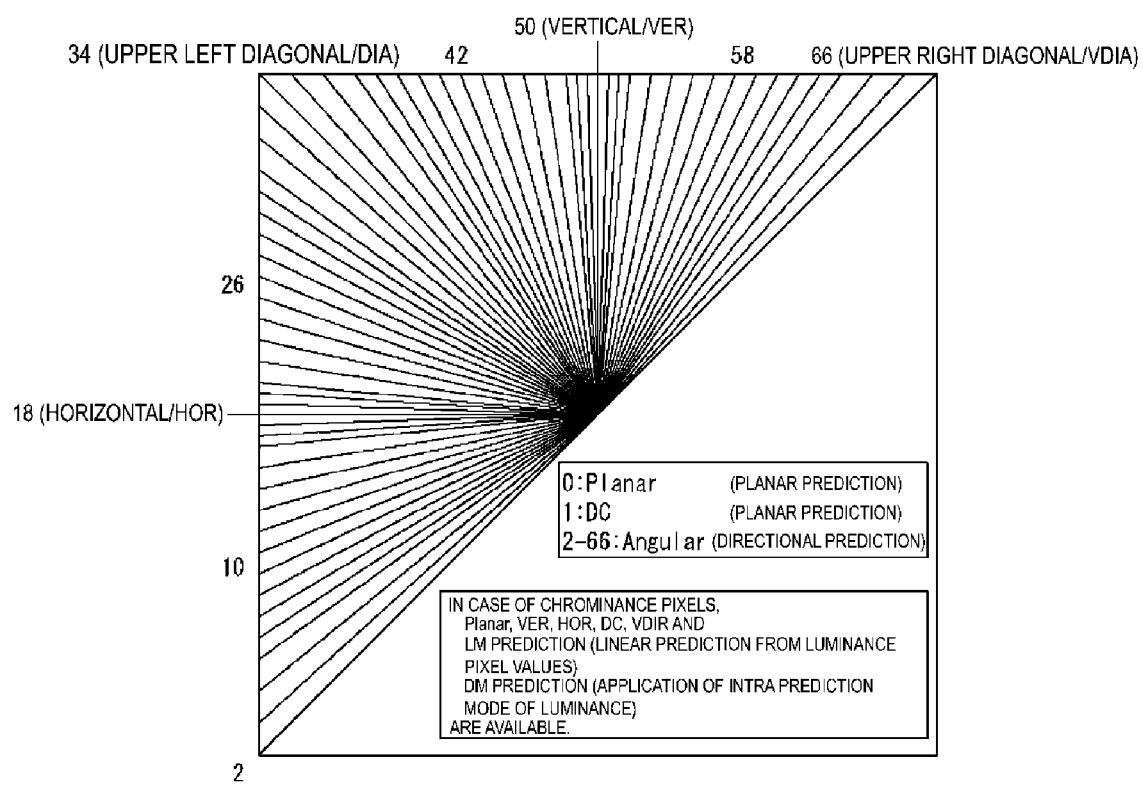
FIG. 15 is a diagram illustrating an intra prediction mode.

The intra prediction parameter decoding unit 304 may derive different intra prediction modes depending on luminance and chrominance. In this case, the intra prediction parameter decoding unit 304 decodes a luminance prediction mode IntraPredModeY as a prediction parameter of luminance, and decodes a chrominance prediction mode IntraPredModeC as a prediction parameter of chrominance. The luminance prediction mode IntraPredModeY has 67 modes, which correspond to the Planar prediction (0), the DC prediction (1), and the Angular (directional) predictions (2 to 66). The chrominance prediction mode IntraPredModeC uses any of the Planar prediction (0), the DC prediction (1), the Angular (directional) predictions (2 to 66), and the LM predictions (67 to 72). The intra prediction parameter decoding unit 304 decodes a flag indicating whether or not the chrominance prediction is a LM prediction, and in a case that the flag indicates a LM prediction, the intra prediction parameter decoding unit 304 decodes information regarding the LM prediction (information indicating whether or not it is a CCLM prediction, information specifying a down-sampling method). Here, the LM prediction will be described. The LM prediction is a prediction scheme using a correlation between a luminance component and a color component, in which a prediction image of the chrominance image (Cb, Cr) is generated using a linear model based on the decoded luminance image. The LM prediction includes a Cross-Component Linear Model prediction (CCLM prediction) and a Multiple Model ccLM (MMLM) prediction. The CCLM prediction is a prediction scheme using one linear model for predicting a chrominance from a luminance for one block. The MMLM prediction is a prediction scheme using two or more linear models for predicting a chrominance from a luminance for one block. In a case that a chrominance format is 4:2:0, the luminance image is down-sampled to have a size the same as that of the chrominance image in order to create a linear model. This down-sampling method includes a method using a fixed sampling filter (default sampling filter) and a method of adaptively switching four sampling filters (additional sampling filters). Therefore, decoded as information specifying the down-sampling method are information specifying whether the LM prediction is a CCLM prediction or a MMLM prediction, information indicating whether or not the sampling filter is a default sampling filter, and an index specifying the sampling filter in a case of using the additional sampling filter. In a case that the flag indicates that a prediction is different from the LM prediction, decoded as IntraPredModeC are the Planar prediction (0), the DC prediction (1), the Angular predictions (2 to 66), and the DM prediction (chrominance prediction using the same prediction mode as the luminance prediction mode). FIG. 15 is a diagram illustrating an intra prediction mode. Directions of straight lines corresponding to 2 to 66 in FIG. 15 represent the prediction directions, and more accurately indicate directions of pixels on a reference region R (described later) to which prediction target pixels refer.

The loop filter 305 applies a filter such as a deblocking filter 313, a sample adaptive offset (SAO) 314, and an adaptive loop filter (ALF) 315 to a decoded image of the CU generated by the addition unit 312. Note that the loop filter 305 may not necessarily include the three types of filters as long as the loop filter 305 is paired with the image encoding device 11, and may include only the deblocking filter 313, for example.

The reference picture memory 306 stores the decoded image of the CU generated by the addition unit 312 in a predefined position for each decoding target picture and CTU or CU.

The prediction parameter memory 307 stores a prediction parameter in a prescribed position for each picture and prediction unit (or a sub-block, a fixed size block, and a pixel) of a decoding target. Specifically, the prediction parameter memory 307 stores an inter prediction parameter decoded by the inter prediction parameter decoding unit 303, an intra prediction parameter decoded by the intra prediction parameter decoding unit 304 and a prediction mode predMode separated by the entropy decoding unit 301. For example, inter prediction parameters stored include a prediction list utilization flag predFlagLX (the inter prediction indicator inter_pred_idc), a reference picture index refIdxLX, and a motion vector mvLX.

To the prediction image generation unit 308, a prediction mode predMode input from the entropy decoding unit 301 is input, and a prediction parameter is input from the prediction parameter decoding unit 302. The prediction image generation unit 308 reads a reference picture from the reference picture memory 306. The prediction image generation unit 308 uses the input prediction parameters and the read out reference picture (reference picture block) to generate a prediction image of the PU (block) or sub-block in the prediction mode indicated by the prediction mode predMode.

Here, in a case that the prediction mode predMode indicates an inter prediction mode, the inter prediction image generation unit 309 uses the inter prediction parameter input from the inter prediction parameter decoding unit 303 and the read out reference picture (reference picture block) to generate the prediction image of the PU (block) or sub-block by the inter prediction.

For a reference picture list (an L0 list or an L1 list) where a prediction list utilization flag predFlagLX is 1, the inter prediction image generation unit 309 reads a reference picture block from the reference picture memory 306 in a position indicated by a motion vector mvLX, based on a decoding target PU from reference pictures indicated by the reference picture index refIdxLX. The inter prediction image generation unit 309 performs interpolation based on the read out reference picture block to generate the prediction image of the PU (interpolation image, motion compensation image). The inter prediction image generation unit 309 outputs the generated prediction image of the PU to the addition unit 312. Here, the reference picture block is a set of pixels on the reference picture (the reason to be called a block is because it generally has a rectangle shape), and is a region referred to in order to generate the prediction image of the PU or sub-block.

In a case that the prediction mode predMode indicates an intra prediction mode, the intra prediction image generation unit 310 performs an intra prediction by using an intra prediction parameter input from the intra prediction parameter decoding unit 304 and a read reference picture. Specifically, the intra prediction image generation unit 310 reads a neighboring PU, which is a picture of a decoding target, in a prescribed range from a decoding target PU among PUs already decoded, from the reference picture memory 306. The prescribed range is, for example, any of neighboring PUs in left, upper left, top, and upper right in a case that a decoding target PU moves in order of so-called raster scan sequentially, and varies according to intra prediction modes. The order of the raster scan is an order to move sequentially from the left edge to the right edge in each picture for each row from the top edge to the bottom edge.

The intra prediction image generation unit 310 performs the prediction in the prediction mode indicated by the intra prediction mode IntraPredMode based on the read out neighboring PU to generate the prediction image of the PU. The intra prediction image generation unit 310 outputs the generated prediction image of the PU to the addition unit 312.

In a case that the intra prediction parameter decoding unit 304 derives the intra prediction mode different in luminance and chrominance, the intra prediction image generation unit 310 generates a luminance prediction image of the PU by any of the Planar prediction (0), the DC prediction (1), and the Angular predictions (2 to 66) in accordance with the luminance prediction mode IntraPredModeY, and generates a chrominance prediction image of the PU by any of the Planar prediction (0), the DC prediction (1), the Angular predictions (2 to 66), and the LM mode (67 to 72) in accordance with the chrominance prediction mode IntraPredModeC.

In the Planar prediction, DC prediction, and Angular prediction, a decoded peripheral region neighboring to (proximate to) the prediction target block is configured as the reference region R. Schematically, these prediction modes are prediction schemes for generating a prediction image by extrapolating pixels on the reference region R in a particular direction. For example, the reference region R may be configured as a reverse L-shaped region including a left and top (or even upper left, upper right, lower left) portion of the prediction target block.

Details of Prediction Image Generation Unit

Next, a configuration of the intra prediction image generation unit 310 will be described in detail by using FIG. 18.

As illustrated in FIG. 18, the intra prediction image generation unit 310 includes a prediction target block configuration unit 3101, a reference image configuration unit 3102, and a predictor 3104.

The prediction target block configuration unit 3101 configures the target CU in the prediction target block. The reference image configuration unit 3102 outputs each reference pixel on the input reference region R to the predictor 3104. The predictor 3104 generates a prediction image of the prediction target block, based on the input intra prediction mode and the reference image and outputs the generated image to an addition unit 15.

Hereinafter, the components included in the intra prediction image generation unit 310 will be described.

Prediction Target Block Configuration Unit 3101

The prediction target block configuration unit 3101 configures the target CU in the prediction target block, and outputs information on the prediction target block (prediction target block information). The prediction target block information includes at least a prediction target block size, a prediction target block position, and information indicating whether the prediction target block is a luminance or a chrominance.

Reference Image Configuration Unit 3102

The reference image configuration unit 3102 configures a peripheral region neighboring to the prediction target block as the reference region R, based on the prediction target block size and the prediction target block position in the prediction target block information. Subsequently, each pixel value in the reference region R (the boundary pixels) is set with each decoded pixel value at the corresponding position on the reference picture memory 306. In other words, the reference image $r[x][y]$ is configured by the following expressions using the decoded pixel value $u[px][py]$ of the target picture expressed with reference to the upper left coordinates of the target picture.

$$r[x][y]=u[xB+x][yB+y]$$

$$x=-1, y=-1..(BS*2-1) \text{ and } x=0..(BS*2-1), y=-1 \text{(Expression INTRAP-1)}$$

where, (xB, yB) represent the upper left coordinates of the prediction target block, and BS represents a value of the larger one of the width W and height H of the prediction target block.

Figure 16:
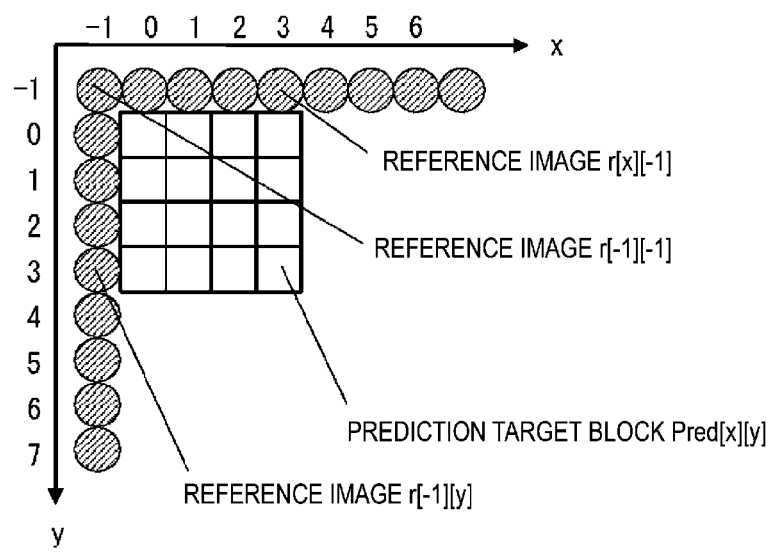
FIG. 16 is a diagram illustrating a prediction target block and reference images.

In the above expressions, as illustrated in FIG. 16(a), a line r[x][−1] of the decoded pixels neighboring to an upper side of the prediction target block and a column r[−1][y] of the decoding pixels neighboring to a left side of the prediction target block are reference images. Note that, in a case that a decoded pixel value corresponding to a reference pixel position is not present or is not referable, a predetermined value (for example, 1<<(bitDepth−1) in a case that a pixel bit depth is bitDepth) may be configured as an reference image, or a referable decoded pixel value that is present neighboring to the corresponding decoded pixel value may be configured as an reference image. In addition, "y=−1..(BS*2−1)" indicates that y may take (BS*2+1) values from −1 to (BS*2−1), and "x=0..(BS*2−1)" indicates that x may take (BS*2) values from 0 to (BS*2−1).

In the above expression, as described later with reference to FIG. 16(a), the decoded image included in the row of decoded pixels neighboring to the prediction target block upper side and the decoded image included in the column of decoded pixels neighboring to the prediction target block left side are reference images. Note that, in accordance with the intra prediction mode, an image that filters the reference image r[x][y] may be a reference image.

Configuration of Predictor 3104

The predictor 3104 generates a prediction image of the prediction target block, based on the intra prediction mode and the reference image, and outputs the generated image to the addition unit 15. The predictor 3104 includes therein a Planar predictor 31041, a DC predictor 31042, an Angular predictor 31043, and a LM predictor 31044. The predictor 3104 selects a specific predictor in accordance with the input intra prediction mode to input the reference image. A relationship between the intra prediction mode and the corresponding predictor is as follows.

Planar prediction—Planar predictor 31041
DC prediction—DC predictor 31042
Angular prediction—Angular predictor 31043
LM prediction—LM predictor 31044

Planar Prediction

The Planar predictor 31041 linearly adds multiple reference images filtered by the reference image configuration unit 3102 according to the distance between the prediction target pixel position and the reference pixel position, further performs correction by using a reference image that is not filtered by the reference image configuration unit 3102, and generates a prediction image.

DC Prediction

The DC predictor 31042 derives an average value (an DC prediction value) of the reference image filtered by the reference image configuration unit 3102 to be input, and outputs a prediction image having a pixel value of the derived DC prediction value.

Angular Prediction

The Angular predictor 31043 generates the prediction image by using the reference image in the prediction direction (reference direction) indicated by the intra prediction mode filtered by the reference image configuration unit 3102.

LM Prediction

The LM predictor 31044 predicts a pixel value of a chrominance, based on a pixel value of a luminance. The LM predictor 31044 selects a down-sampling filter, and derives the chrominance prediction image predCb[ ][ ] and predCr[ ] by a linear prediction, from the decoded image drL[ ] [ ] (reference region) and duL[ ] [ ] (target block) down-sampled by the selected filter for the luminance component. The LM predictor 31044 derives linear prediction parameters a, b (a is a scaling parameter, b is an offset) used for the linear prediction described above from the decoded image drL[ ][ ] of the down-sampled luminance component adjacent to the target block and the decoded image rCb[ ][ ] and rCr[ ][ ] of the chrominance component adjacent to the target block.

Figure 17:
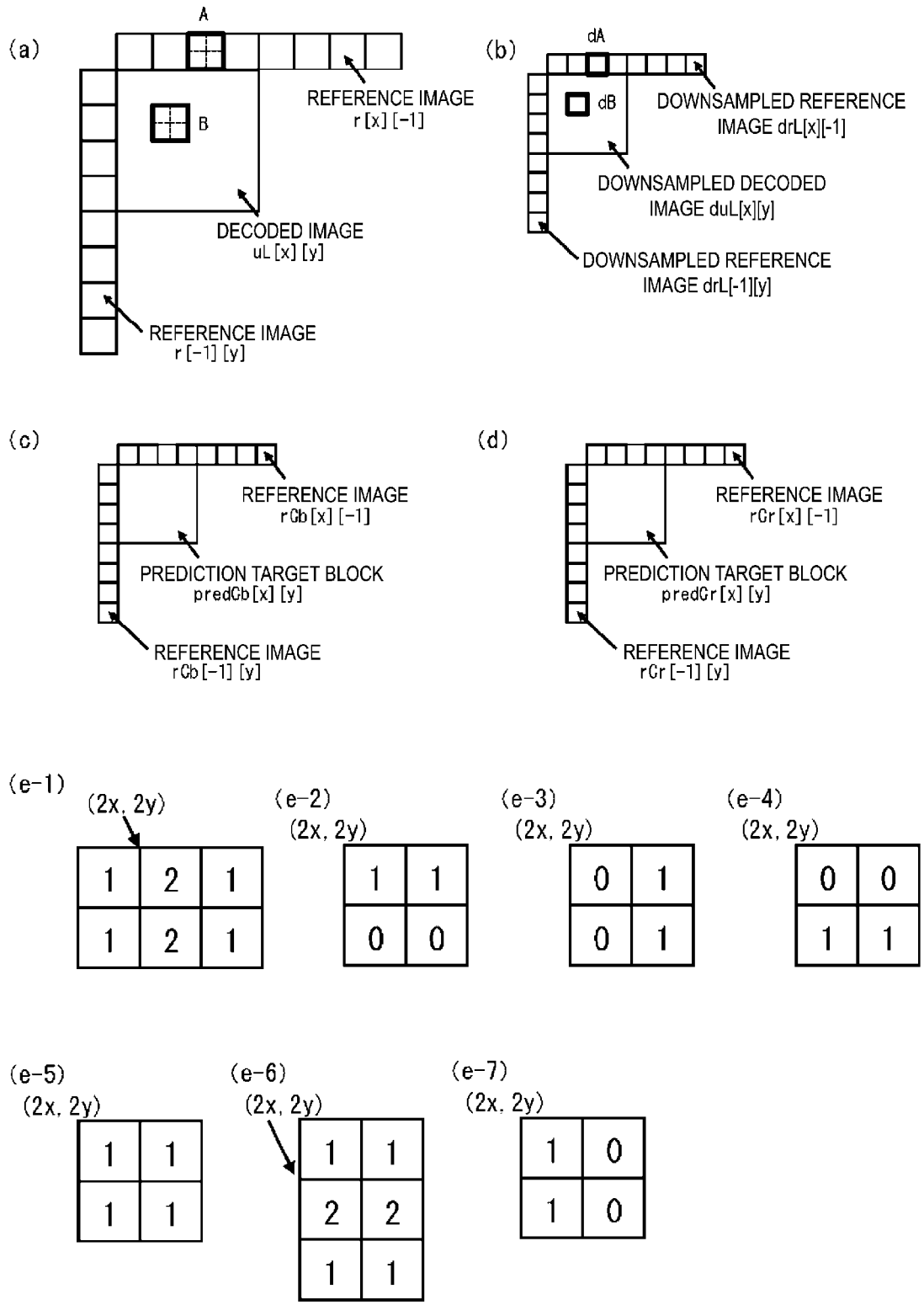
FIG. 17 is a diagram illustrating a CCLM prediction process.

The CCLM prediction process will be described with reference to FIG. 17. FIG. 17 is a diagram illustrating a situation in which the decoding process on the luminance component has ended and the prediction process on the chrominance component is being performed in the target block. FIG. 17(a) is a diagram illustrating a decoded image uL[ ][ ] of a luminance component of a target block, and 17(c) and 17(d) illustrate prediction images predCb[ ][ ] and predCr[ ][ ] of Cb and Cr components, respectively. In FIGS. 17(a), 17(c) and 17(d), regions rL[ ][ ], rCb[ ][ ], and rCr[ ][ ] outside the respective target blocks illustrate reference images neighboring to the respective target blocks. FIG. 17(b) is a diagram in which a decoded image and reference images of a luminance component of a target block illustrated in FIG. 17(a) are down-sampled, and duL[ ][ ] and drL[ ] indicate a decoded image and reference images of a luminance component after down-sampling. Next, a down-sampling filter used to generate FIG. 17(b) from FIG. 17(a) is illustrated in FIG. 17(e). FIG. 17(e-1) is a fixed sampling filter (default sampling filter) and FIGS. 17(e-2) to 17(e-5) are four kinds of additional sampling filters. For example, expressions for calculating one pixel of dA or dB in FIG. 17(b) from four pixels of A or B in FIG. 17(a) are described below.

In a case of the default sampling filter (FIG. 17(e-1)):

$$duL[x][y]=(uL[2x-1][2y]+2*uL[2x][2y]+uL[2x+1][2y]+uL[2x-1][2y+1]+2*uL[2x][2y+1]+uL[2x+1][2y+1]+4)>>3$$

$$drL[x][y]=(rL[2x-1][2y]+2*rL[2x][2y]+rL[2x+1][2y]+rL[2x-1][2y+1]+2*rL[2x][2y+1]+rL[2x+1][2y+1]+4)>>3 \quad \text{(Expression CCLM-1)}$$

In a case of the additional sampling filter:

Filter index 1 (FIG. 17(e-2))

$$duL[x][y]=(uL[2x][2y]+uL[2x+1][2y]+1)>>1$$

$$drL[x][y]=(rL[2x][2y]+rL[2x+1][2y]+1)>>1$$

Filter index 2 (FIG. 17(e-3))

$$duL[x][y]=(uL[2x+1][2y]+uL[2x+1][2y+1]+1)>>1$$

$$drL[x][y]=(rL[2x+1][2y]+rL[2x+1][2y+1]+1)>>1$$

Filter index 3 (FIG. 17(e-4))

$$duL[x][y]=(uL[2x][2y+1]+uL[2x+1][2y+1]+1)>>1$$

$$drL[x][y]=(rL[2x][2y+1]+rL[2x+1][2y+1]+1)>>1$$

Filter index 4 (FIG. 17(e-5))

$$duL[x][y]=(uL[2x][2y]+uL[2x+1][2y]+uL[2x][2y+1]+\\uL[2x+1][2y+1]+2)>>2$$

$$drL[x][y]=(rL[2x][2y]+rL[2x+1][2y]+rL[2x][2y+1]\\+rL[2x+1][2y+1]+2)>>2 \quad \text{(Expression CCLM-2)}$$

Here, (2x, 2y) is replaced with the upper left coordinates of A and B in FIG. 17(a), and (x, y) is replaced with the upper left coordinates of dA and dB in FIG. 17(b).

The prediction images of Cb and Cr components are generated from the luminance images duL[ ][ ] and drL[ ][ ] down-sampled by any of these filters above.

Switching of Default Sampling Filter

In a case that the chrominance format is other than 4:4:4, in the LM prediction mode, a luminance pixel value in one-to-one correspondence to the chrominance signal is calculated by down-sampling the luminance pixel as described above. The down-sampling method depends on the relative positional relationship between the luminance pixel and the chrominance pixel, but this relative positional relationship depends on the image format standard or the video coding standard. A content provider may calculate and code a chrominance image at a position different from the image format standard. Accordingly, the down-sampling method for luminance pixels is not a fixed filter, but the coding efficiency can be improved by adaptively selecting a down-sampling method for each content.

Figure 20:
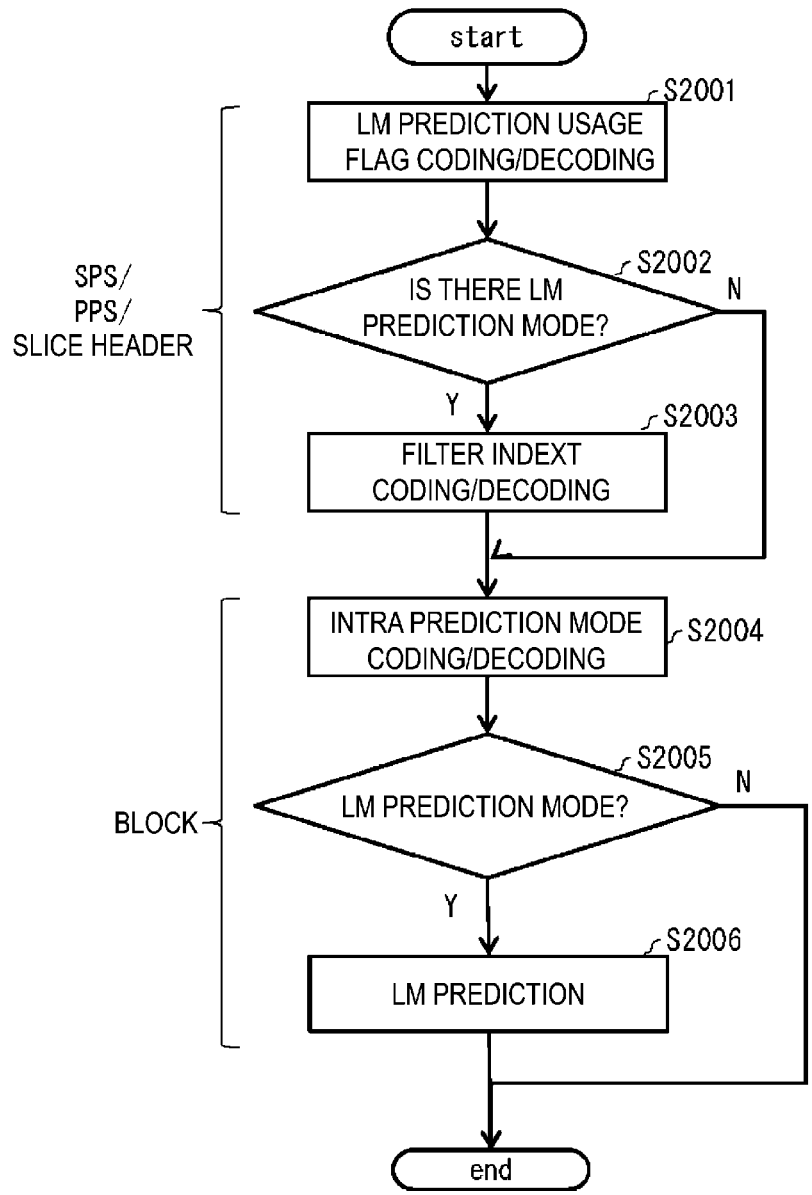
FIG. 20 is a flowchart illustrating a method of signalling a down-sampling method per SPS.

FIG. 20 is a flowchart illustrating a method of signalling a down-sampling method (filter) for each picture. In a case that the LM prediction is applied to the target block, the entropy decoding unit 301 decodes the information related to the down-sampling filter included in the Sequence Parameter Set (SPS) or the PPS or the slice header, and the LM predictor 31044 performs down-sampling, based on the information decoded. Note that in the image encoding device and the image decoding device, there are differences between the coding processing and the decoding processing, but the processing flow is the same, and the processing of the image decoding device will now be described.

In S2001 in FIG. 20, the entropy decoding unit 301 decodes, in decoding SPS, an LM prediction usage flag that signals whether the LM prediction mode is included in the subsequent coded data.

In S2002, the entropy decoding unit 301 checks the LM prediction usage flag and determines whether the LM prediction mode is included in the subsequent coded data. In a case that the LM prediction mode is included (Y in S2002), the process proceeds to S2003. In a case that the coded data does not include the LM prediction mode (N in S2002), the process proceeds to S2004.

In S2003, the entropy decoding unit 301 decodes the filter index specifying one of the multiple down-sampling filters stored in the prediction parameter memory 307 and stores the filter index in the prediction parameter memory 307. Alternatively, the down-sampling filter coefficients used are decoded through the target picture and stored in the prediction parameter memory 307.

In decoding each block, in S2004, the entropy decoding unit 301 decodes mode information indicating whether the target block is the LM prediction mode.

In S2005, the intra prediction parameter decoding unit 304 checks the intra prediction mode of the target block, and in a case of the LM prediction mode (Y in S2005), the process proceeds to S2006. In a case of not the LM prediction mode (N at S2005), the process is terminated.

At S2006, the LM predictor 31044 performs LM prediction described below by using a down-sampling filter specified by the filter index from among the down-sampling filters stored in the prediction parameter memory 307 to generate a prediction image. Alternatively, the decoded down-sampling filter coefficients may be used.

In this way, a down-sampling filter based on the positional relationship between a luminance pixel and a chrominance pixel of the content is signalled by the SPS or the PPS or the slice header and utilized in the prediction process to improve the prediction accuracy for predicting a chrominance pixel value from a luminance pixel value. In other words, by accurately predicting, coding efficiency can be improved.

Figure 21:
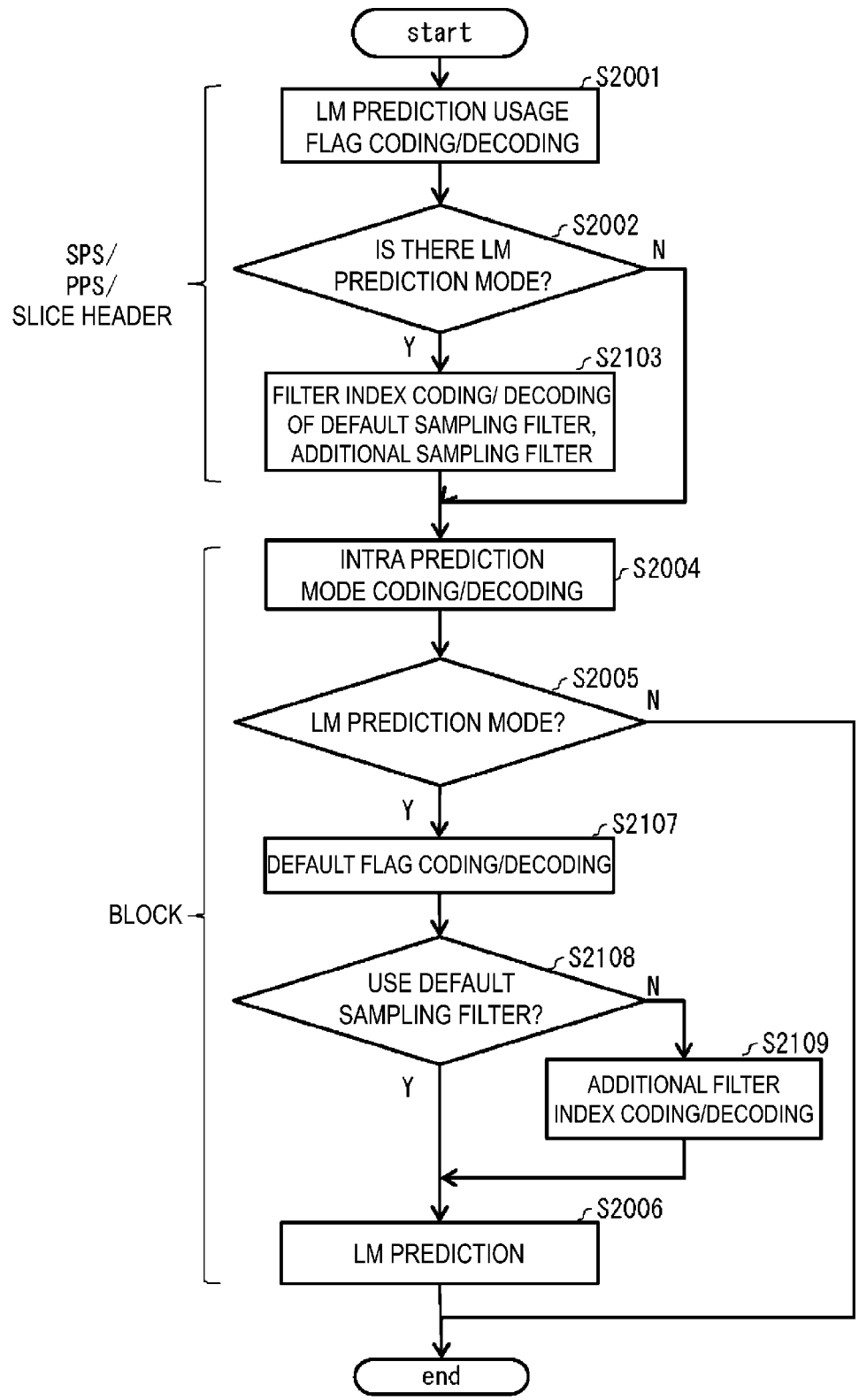
FIG. 21 is a flowchart illustrating a method of signalling multiple down-sampling methods per SPS, signalling a filter index in each block and selecting one from multiple down-sampling filters.

As another embodiment, FIG. 21 is a flowchart illustrating a method of signalling multiple down-sampling methods (filters) for each picture, and in each block, further signalling a filter index and selecting one from the multiple down-sampling filters signalled for each picture. In a case that the LM prediction is applied to the target block, down-sampling is performed by using one selected for each block from the multiple down-sampling filters. Note that in the image encoding device and the image decoding device, there are differences between the coding processing and the decoding processing, but the processing flow is the same, and the processing of the image decoding device will now be described. The processes attached the same numbers as in FIG. 20 are the same processes as in FIG. 20, and thus descriptions thereof will be omitted.

In decoding the SPS or the PPS or the slice header, the entropy decoding unit 301, in S2103, decodes filter indexes of down-sampling filters specified as default sampling filters and multiple down-sampling filters specified as additional sampling filters, and stores each filter index in the prediction parameter memory 307. In this case, multiple down-sampling filters are pre-stored in the prediction parameter memory 307 to select a down-sampling filter for use with the filter index. Alternatively, a down-sampling filter coefficient is decoded and stored in the prediction parameter memory 307.

Next, in decoding each block, the entropy decoding unit 301 decodes, in S2107, a default flag signalling whether or not to use the default sampling filter in the target block.

In S2108, the entropy decoding unit 301 checks the default flag and in a case that the default sampling filter is used (Y in S2108), the process proceeds to S2006, and otherwise (N in S2108), the process proceeds to S2109.

In S2109, the entropy decoding unit 301 decodes an additional filter index indicating which of the multiple additional sampling filters is selected.

In S2006, the LM predictor 31044 performs an LM prediction described below with the specified filter from among default sampling filters stored in the prediction parameter memory 307 or additional sampling filters indicated by an additional filter index, and generates a prediction image.

In this manner, multiple down-sampling filters based on the positional relationship between the luminance pixel and the chrominance pixel of the content are signalled for each picture, and the optimum down-sampling filter is specified for each block to utilize the optimum down-sampling filter for the prediction process. Hence, the prediction accuracy for predicting the chrominance pixel value from the luminance pixel value is improved and, therefore, coding efficiency can be improved resulting from accurate prediction.

Figure 22:
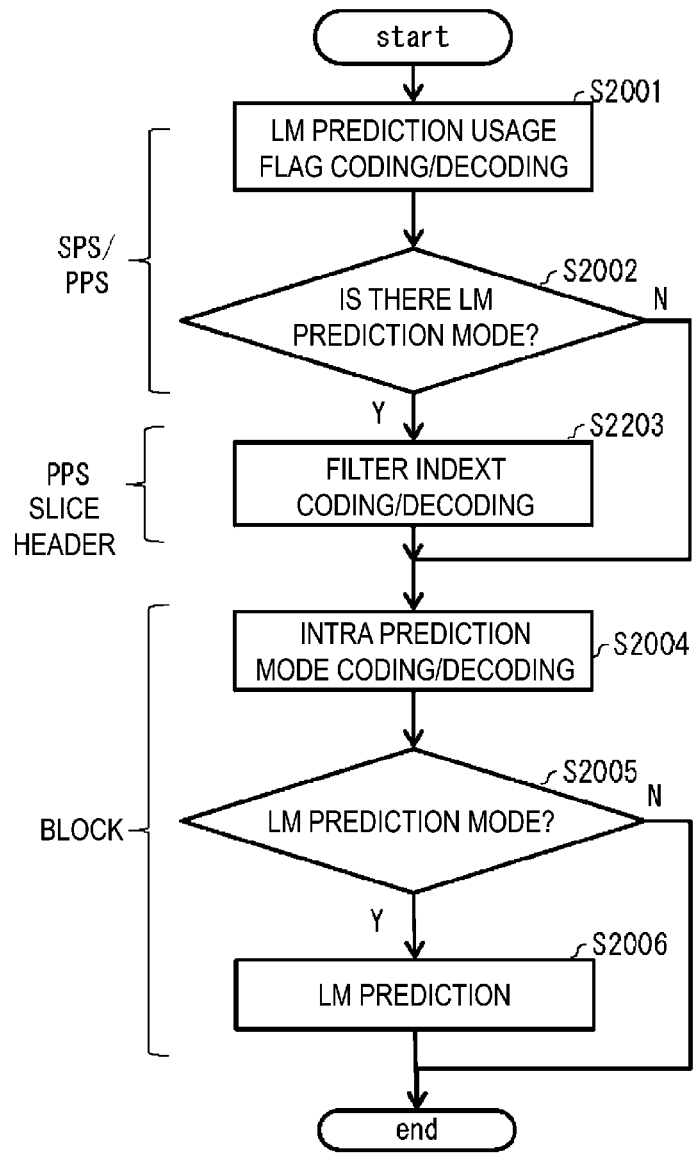
FIG. 22 is a flowchart illustrating a method of signalling a filter index in each picture or each slice from multiple down-sampling methods and selecting one from multiple down-sampling filters.

As another embodiment, FIG. 22 is a flowchart illustrating a method of signalling multiple down-sampling methods (filters) for each picture, and in each slice, signalling the index of the down-sampling filter used in the blocks in the slice. In each block that applies the LM prediction, a down-sampling is performed by using one filter through the slice. In other words, all blocks in the same slice use the same down-sampling filter. Note that in the image encoding device and the image decoding device, there are differences between the coding processing and the decoding processing, but the processing flow is the same, and the processing of the image decoding device will be described. The processes to which the same numbers as in FIG. 20 or FIG. 21 are added are the same processes as in FIG. 20 or FIG. 21, and thus descriptions thereof will be omitted.

In decoding the PPS or the slice header, the entropy decoding unit 301 decodes the index of the down-sampling filter in S2203 and stores the index in the prediction parameter memory 307.

In S2006, the LM predictor 31044 performs the LM prediction described below by using a down-sampling filter specified by the filter index stored in the prediction parameter memory 307, and generates a prediction image.

In this manner, multiple down-sampling filters based on the positional relationship between the luminance pixel and the chrominance pixel of the content are signalled for each picture, and the optimum down-sampling filter is specified for each picture or slice to utilize the optimum down-sampling filter for the prediction process. Hence, the prediction accuracy for predicting the chrominance pixel value from the luminance pixel value is improved as in the LM prediction and, therefore, coding efficiency can be improved resulting from accurate prediction. In addition, the filter index is not coded for each block, and hence the coding amount of the filter index is reduced, and the coding efficiency can be improved.

Downsample Filter Selection Method

Figure 23:
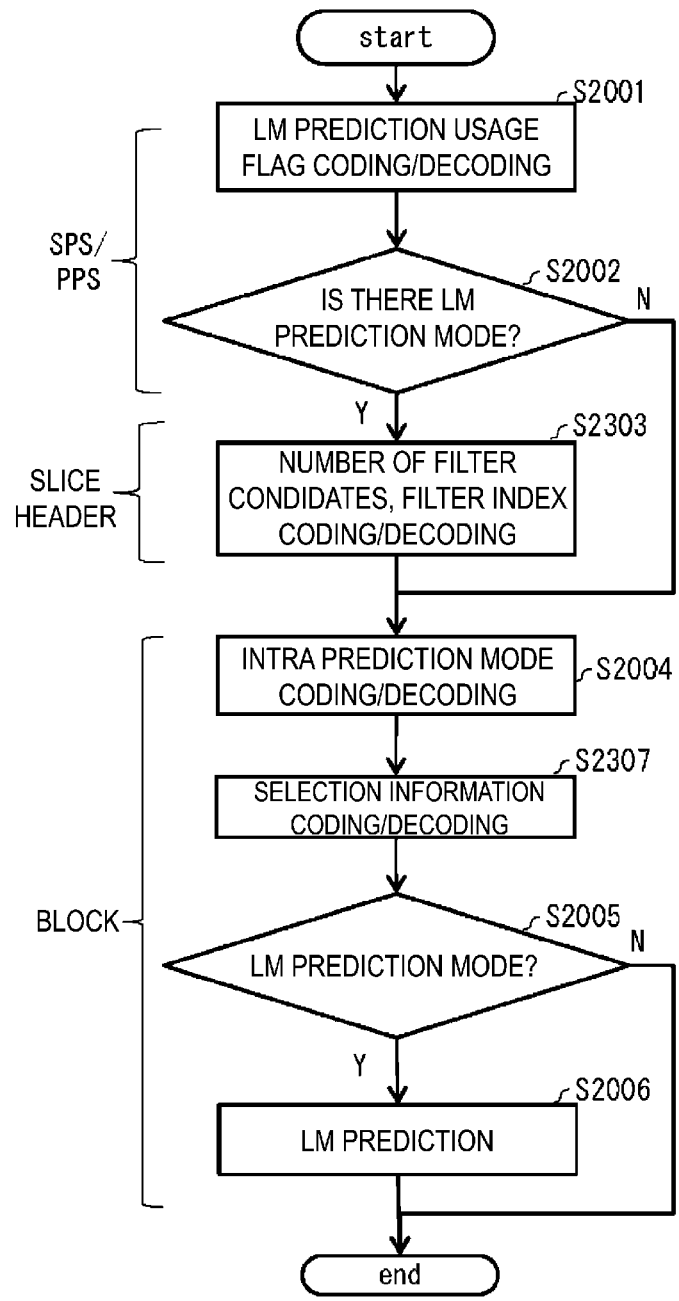
FIG. 23 is a flowchart illustrating another method of signalling a filter index and the number in each picture or each slice from multiple down-sampling methods and selecting one from multiple down-sampling filters.

As another embodiment, FIG. 23 is a flowchart illustrating a method of signalling multiple down-sampling methods (filters) for each picture, in each slice, further signalling the number and index of down-sampling filter candidates to be used in blocks in the slice, and in each block, selecting one from the down-sampling filter candidates. For each block that applies the LM prediction, for example, two filters are specified for each slice from the seven down-sampling filter candidates illustrated in FIG. 17 stored in the prediction parameter memory 307, and one of the two is selected for each block to perform down-sampling. Note that in the image encoding device and the image decoding device, there are differences between the coding processing and the decoding processing, but the processing flow is the same, and the processing of the image decoding device will be described. The processes attached the same numbers as in FIG. 20, FIG. 21, or FIG. 22 are the same processes as in FIG. 20, FIG. 21, or FIG. 22, and thus descriptions thereof will be omitted.

In decoding the slice header, the entropy decoding unit 301 decodes the number of down-sampling filter candidates in S2303, decodes the filter indexes the number of which corresponds to the number of down-sampling filter candidates, and stores each in the prediction parameter memory 307.

In decoding the block to which the LM prediction mode is applied, the entropy decoding unit 301 decodes, in S2307, information selecting one of the down-sampling filter candidates. For example, in a case that two filter candidates are specified for each slice, and each block selects one of the two, the information required for the selection is 1 bit.

In S2006, the LM predictor 31044 performs the LM prediction described below by using a down-sampling filter selected for each block with the selection information, and generates a prediction image.

Note that in a case that down-sampling filter coefficients are stored in the prediction parameter memory 307 in advance, processing for signalling multiple down-sampling methods (filters) for each picture may be omitted, and in the slice header, from among the down-sampling filter coefficients stored in the prediction parameter memory 307, the number and the index of the down-sampling filter candidates used in the blocks in the slice may be signalled.

In this manner, multiple down-sampling filters based on the positional relationship between the luminance pixel and the chrominance pixel of the content are signalled by the SPS, and the optimum down-sampling filter is specified for each picture or slice to utilize the optimum down-sampling filter for the prediction process. Hence, the prediction accuracy for predicting the chrominance pixel value from the luminance pixel value is improved as in the LM prediction and, therefore, coding efficiency can be improved resulting from accurate prediction. In addition, the filter index is not coded for each block or the information required for coding is reduced, and hence the coding amount of the filter index is reduced, and the coding efficiency can be improved.

Note that in FIG. 20 to FIG. 23, in the image encoding device, the entropy encoder 104 codes information such as a flag and an index, the intra prediction parameter encoder 113 checks the intra prediction mode of each block, and the prediction image generation unit 101 generates the prediction image by the LM prediction.

Example of Down-Sampling Filter

Figure 24:
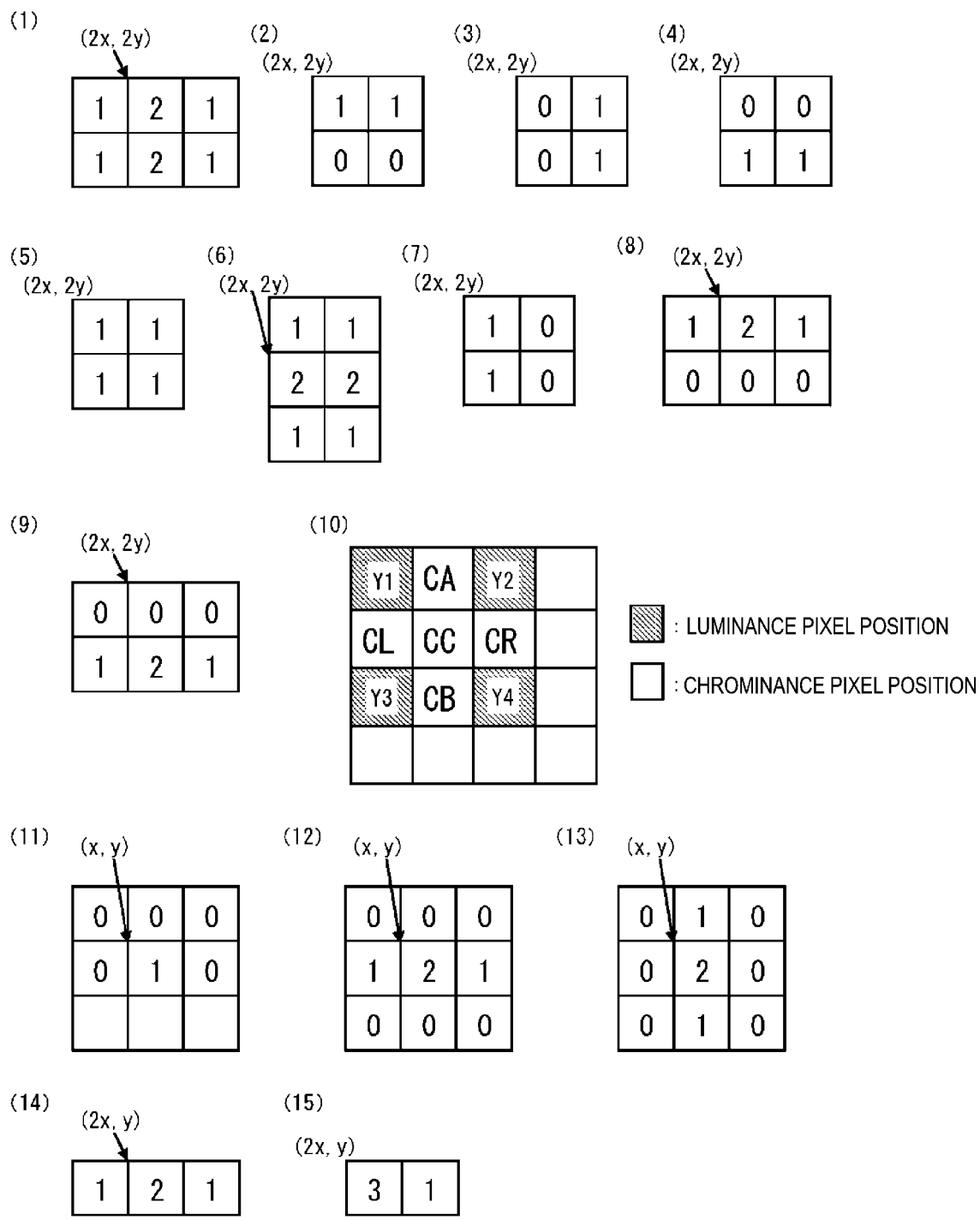
FIG. 24 is a diagram illustrating an example of a down-sampling method of luminance in an LM prediction mode.

Filters used in the down-sampling process will be described. FIG. 24(10) is a diagram illustrating a luminance pixel position and a chrominance pixel position in a 4:2:0 chrominance format. Y1, Y2, Y3, and Y4 represent luminance pixel positions, and there is one chrominance pixel Cb and one chrominance pixel Cr, corresponding to the four luminance pixels.

The position of each chrominance pixel may be CA (intermediate position of two luminance pixels on the upper side of the four luminance pixels), CL (intermediate position of two luminance pixels on the left side of the four luminance pixels), CC (central position of the four luminance pixels), CR (intermediate position of two luminance pixels on the right side of the four luminance pixels), CB (intermediate position of two luminance pixels on the lower side of the four luminance pixels), and luminance pixel positions Y1, Y2, Y3, and Y4. For example, the chrominance position used mainly in ITU-R standard BT. 709 is CL, the chrominance position prescribed in ITU-R standard BT. 2100 or ITU-R standard BT. 2020 is the same position as Y1, and the chrominance position prescribed in JPEG is CC. A configuration is preferable in which coefficients of multiple down-sampling filters are stored in the prediction parameter memory 307 in advance for down-sampling the luminance pixels corresponding to such chrominance pixel positions, and the filter index actually used in the coded data is signalled or the coefficient values of the down-sampling filter used is signalled with the coded data. Because the correlation between the luminance pixel and the chrominance pixel may locally change by the nature of the image, the configuration of adaptively switching the down-sampling filter used is preferable for improving the coding efficiency.

Examples of down-sampling filter coefficients in the case of a 4:2:0 chrominance format are illustrated in FIGS. 24(1) to 24(9). Drawing numbers (1) to (9) are also filter indexes 1 to 9. In the drawings, (2x, 2y) indicates the position of Y1 in FIG. 24(10), (2x+1, 2y) is the position of Y2 in FIG. 24(10), (2x, 2y+1) indicates the position of Y3 in FIG. 24(10), (2x+1, 2y+1) indicates the position of Y4 in FIG. 24(10). The down-sampling process using each filter is represented by the following expression: Note that the decoded pixel value of the luminance image is denoted by uL[ ][ ], and the pixel value after down-sampling is denoted by duL[ ][ ].

Filter index 1 (FIG. 24(1))

$$duL[x][y]=(uL[2x-1][2y]+2*uL[2x][2y]+uL[2x+1][2y]+uL[2x-1][2y+1]+2*uL[2x][2y+1]+uL[2x+1][2y+1]+4)>>3$$

Filter index 2 (FIG. 24(2))

$$duL[x][y]=(uL[2x][2y]+uL[2x+1][2y]+1)>>1$$

Filter index 3 (FIG. 24(3))

$$duL[x][y]=(uL[2x+1][2y]+uL[2x+1][2y+1]+1)>>1$$

Filter index 4 (FIG. 24(4))

$$duL[x][y]=(uL[2x][2y+1]+uL[2x+1][2y+1]+1)>>1$$

Filter index 5 (FIG. 24(5))

$$duL[x][y]=(uL[2x][2y]+uL[2x+1][2y]+uL[2x][2y+1]+uL[2x+1][2y+1]+2)>>2$$

Filter index 6 (FIG. 24(6))

$$duL[x][y]=(uL[2x][2y-1]+uL[2x+1][2y-1]+2*uL[2x][2y]+2*uL[2x+1][2y]+$$

$$uL[2x][2y+1]+uL[2x+1][2y+1]+4)>>3$$

Filter index 7 (FIG. 24(7))

$$duL[x][y]=(uL[2x][2y]+uL[2x][2y+1]+1)>>1$$

Filter index 8 (FIG. 24(8))

$$duL[x][y]=(uL[2x-1][2y]+2*uL[2x][2y]+uL[2x+1][2y]+2)>>2$$

Filter index 9 (FIG. 24(9))

$$duL[x][y]=(uL[2x-1][2y+1]+2*uL[2x][2y+1]+uL[2x+1][2y+1]+2)>>2 \quad \text{(Expression CCLM-3)}$$

For example, in a case that the chrominance pixel position is Y1, the down-sampling filter may have filter index 8. In a case that the chrominance pixel position is CA, the down-sampling filter may have filter index 2 or 6. In a case that the chrominance pixel position is CL, the down-sampling filter may have filter index 1 or 7. In a case that the chrominance pixel position is CC, the down-sampling filter may have filter index 5. In a case that the chrominance pixel position is CR, the down-sampling filter may have filter index 3. In a case that the chrominance pixel position is Y3, the down-sampling filter may have filter index 9. In a case that the chrominance pixel position is CB, the down-sampling filter may have filter index 4. Note that the combinations are examples, and other combinations may be preferable depending on the nature of the image. By signalling these filter indexes with the SPS, the PPS, or the slice header as illustrated in FIG. 20, appropriate down-sampling filters in accordance with the chrominance pixel position may be applied to the luminance image.

Downsample Filter Selection Method 2

As another example, multiple indexes of down-sampling filters may be signalled in the slice header and the filter index used from among the indexes in each block may be signalled. For example, filter indexes 1 and 7 of the down-sampling filters may be signalled in the slice header, and which of 1 and 7 to use in each block may be signalled. Alternatively, filter indexes 2 and 6 of the down-sampling filters may be signalled in the slice header, and which of 2 and 6 to use in each block may be signalled. Regarding these filter indexes, by signalling the number of filter candidates (2 in the above case) and the filter indexes (1 and 7, or 2 and 6 in the above case) in the slice header as described in FIG. 23, and signalling the filter index (1 or 7, 2 or 6 in the above case) in each block, an appropriate down-sampling filter based on the chrominance pixel position may be applied to the luminance image.

Block Size Dependent Downsample Filter

As another example, a down-sampling filter applied may be switched depending on the block size. For example, multiple indexes of down-sampling filters may be signalled in a slice header, and the filter index used in each block may be switched depending on the block size. For example, filter index 2 and 6 of down-sampling filters may be signalled in the slice header, and which of 2 and 6 to use in each block may be determined with reference to the size of the target block. For example, in a case that the sum of the width and height of the block is greater than or equal to a prescribed threshold, filter index 6 may be used, and in a case of less than the prescribed threshold, 2 may be used. In this case, the filter index of the down-sampling filter used in each block is not signalled.

Next, a 4:4:4 chrominance format and a 4:2:2 chrominance format will be described. In the 4:4:4 chrominance format, the luminance pixel and the chrominance pixel are at the same position. In other words, in a case that the positions of the luminance pixels are Y1, Y2, Y3, and Y4, the positions of the chrominance pixels are also Y1, Y2, Y3, and Y4. In the 4:4:4 chrominance format, for example, filters with filter coefficients illustrated in FIGS. 24(11) to 24(13) are applied to the luminance pixels. However, the pixels are not decimated. The down-sampling process using each filter is represented by the following expression: Note that the decoded pixel value of the luminance image is denoted by uL[ ][ ], and the pixel value after filtering is denoted by duL[ ][ ].

Filter index 11 (FIG. 24(11))

$$duL[x][y]=uL[x][y]$$

Filter index 12 (FIG. 24(12))

$$duL[x][y]=(uL[x-1][y]+2*uL[x][y]+uL[x+1][y]+2)>>2$$

Filter index 13 (FIG. 24(13))

$$duL[x][y]=(uL[x][y-1]+2*uL[x][y]+uL[x][y+1]+2)>>2 \quad \text{(Expression CCLM-4)}$$

In the 4:2:2 chrominance format, the chrominance pixels are in positions of Y1 and Y3 of the luminance pixels. In the 4:2:2 chrominance format, for example, filters with filter coefficients illustrated in FIGS. 24(14) to 24(15) are applied to the luminance pixels. However, pixels are only decimated in the horizontal direction, and pixels are not decimated in the vertical direction. The down-sampling process using each filter is represented by the following expression: Note that the decoded pixel value of the luminance image is denoted by uL[ ][ ], and the pixel value after down-sampling is denoted by duL[ ][ ].

Filter index 14 (FIG. 24(14))

$$duL[x][y]=(uL[2x-1][y]+2*uL[2x][y]+uL[2x+1][y]+2)>>2$$

Filter index 15 (FIG. 24(15))

$$duL[x][y]=(3*uL[x][y]+uL[x][y]++1)>>1 \quad \text{(Expression CCLM-5)}$$

Note that these combinations are examples, and other combinations may be preferable depending on the nature of the image.

Similar to the description of the 4:2:0 chrominance format, multiple indexes of down-sampling filters may be signalled in the slice header and the filter index used from among the indexes in each block may be signalled. Alternatively, depending on the block size, the selected down-sampling filter may be switched.

Sharing of Shifted Value

Examples of the 4:2:0, 4:4:4, 4:2:2 chrominance format down-sampling filters are described above. The down-sampling filters have different coefficients and different number of taps, and the above expressions also differ in shifted values. In hardware designs, these shifted values are preferably the same. An example in which the shifted values of the all filters are configured the same by using scaled filter coefficients will be described.

Figure 25:
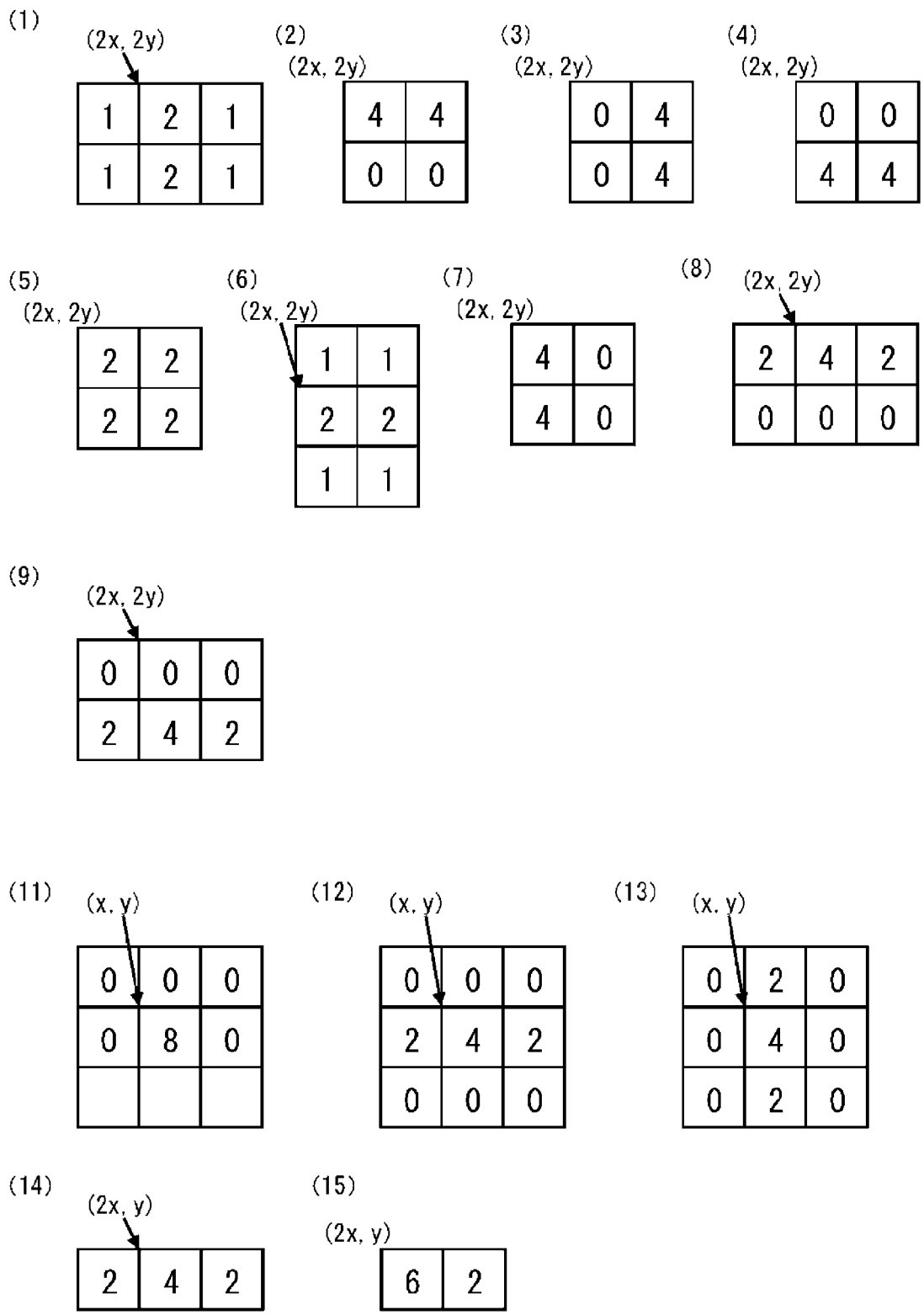
FIG. 25 is a diagram illustrating another example of the down-sampling method of luminance in the LM prediction mode.

With respect to FIGS. 24(1) to 24(9) and 24(11) to 24(15) described above, for example, in a case that the filter coefficients are configured as illustrated in FIGS. 25(1) to 25(9) and 25(11) to 25(15), respectively, a shifted value shiftD for the downsample is all 3. For example, in FIG. 24(2), the shifted value is 1, but in FIG. 25(2), the shifted value is 3 as illustrated below.

Filter index 2 (FIG. 25(2))

$$duL[x][y]=(4*uL[2x][2y]+4*uL[2x+1][2y]+4)>>\text{shiftD} \quad \text{(Expression CCLM-6)}$$

Note that the filter coefficients in FIG. 25 are examples and are not limited to these coefficient values. In other words, in selectable downsample filters, the sum of filter coefficients may be equally configured to be an index power of 2.

Next, FIG. 18 will be described. As illustrated in FIG. 18(a), the LM predictor 31044 includes a CCLM predictor 4101 and an MMLM predictor 4102.

The CCLM predictor 4101 downsamples the luminance image using any of the filters described above in the case that the chrominance format is 4:2:0, and calculates the decoded image duL[ ][ ] and the reference image drL[ ][ ] of the down-sampled luminance component in FIG. 17(b).

Next, the CCLM predictor 4101 derives the parameters (CCLM parameters) (a, b) of the linear model from the reference image drL[ ][ ] of the luminance component, and the reference images rCb[ ][ ] and rCr[ ][ ] of the Cb and Cr components. Specifically, a linear model (aC, bC) is calculated that minimizes a square error SSD between the reference image drL[ ][ ] of the luminance component and the reference image rC[ ][ ] of the chrominance component.

$$SSD=\Sigma\Sigma(rC[x][y]-(aC*drL[x][y]+bC))^2 \quad \text{(Expression CCLM-7)}$$

where $\Sigma\Sigma$ is the sum for x and y. In the case of the Cb component, rC[ ][ ] is rCb[ ][ ] and (aC, bC) is (aCb, bCb), and in the case of the Cr component, rC[ ][ ] is rCr[ ][ ] and (aC, bC) is (aCr, bCr).

In order to utilize correlation between prediction errors of the Cb component and the Cr component, in the Cb component, a linear model aResi may be calculated that minimizes a square error SSD between the reference image rCb[ ][ ] of the Cb component and the reference image rCr[ ] [ ] of the Cr component.

$$predCr[x][y]=aCr*duL[x][y]+bCr$$

$$SSD=\Sigma\Sigma(rCr[x][y]-(predCr+aResi* resiCb[x][y])^2 \quad \text{(Expression CCLM-8)}$$

where $\Sigma\Sigma$ is the sum for x and y. These CCLM parameters are used to generate the prediction images predCb[ ][ ] and predCr[ ][ ] of the chrominance component using the following expressions.

$$predCb[x][y]=aCb*duL[x][y]+bCb$$

$$predCr[x][y]=aCr*duL[x][y]+bCr$$

$$predCr[x][y]=predCr[x][y]+aResi*ResiCb[x][y] \quad \text{(Expression CCLM-9)}$$

where, predCr[x][y] is a prediction image of Cr, and ResiCb[ ][ ] is a prediction error of the Cb component. Note that, in order to perform a prediction coefficient with an integer computation, the following calculation may be performed by using a value multiplied by 1<<shiftA for a linear prediction coefficient.

$$predCb[x][y]=(aCb*duL[x][y]+roundA)>>\text{shiftA}+bCb$$

$$predCr[x][y]=(aCr*duL[x][y]+roundA)>>\text{shiftA}+bCr \quad \text{(Expression CCLM-10)}$$

roundA is a constant for round tuning, for example, 1<<(shiftA−1). Note that, offsets bCb and bCr may be further added before shifting.

$$predCb[x][y]=(aCb*duL[x][y]+bCb+roundA)>>\text{shiftA}$$

$$predCr[x][y]=(aCr*duL[x][y]+bCr+roundA)>>\text{shiftA} \quad \text{(Expression CCLM-11)}$$

The MMLM predictor 4102 is used in a case that the relationship between the reference images of the luminance component and the chrominance component is categorized into two or more linear models. In a case that there are multiple regions in the target block, such as a foreground and a background, the linear model between the luminance component and the chrominance component is different for each region. In such a case, multiple linear models may be used to generate a prediction image of the chrominance component from the decoded image of the luminance component. For example, in a case of two linear models, the pixel values of the reference images of the luminance components are divided into two at a certain threshold th_mmlm, and a linear model is calculated that minimizes the square error SSD between the reference image drL[ ][ ] of the luminance component and the reference image rC[ ][ ] of the chrominance component for category 1 in which the pixel value is equal to or smaller than the threshold th_mmlm and category 2 in which the pixel value is greater than the threshold th_mmlm $SSD1=\Sigma\Sigma(rC[x][y]-(a1C*drL[x][y]+b1))^2$(if $drL[x][y]<=th\_mmlm$)

$SSD2=EE(rC[x][y]-(a2C*drL[x][y]+b2))^2$ (otherwise)  (Expression CCLM-12)

where, $\Sigma\Sigma$ is a sum for x and y, and in a case of the Cb component, rC[ ][ ] is rCb[ ][ ] and (a1C, b1C) is (a1Cb, b1Cb). In a case of the Cr component, rC[ ][ ] is rCr[ ], and (a1C, b1C) is (a1Cr, b1Cr).

The threshold th_mmlm may be an average of the down-sampled reference image drL[x][y] of the luminance component.

$th\_mmlm=(\Sigma\Sigma drL[x][y]+(W+H)/4)/(W/2+H/2)$  (Expression CCLM-13)

Alternatively, the threshold th_mmlm may be an average of the decoded image duL[x][y] of the down-sampled luminance component.

$th\_mmlm=(\Sigma\Sigma duL[x][y]+(W*H)/8)/(W*H/4)$  (Expression CCLM-14)

where, W and H represent the width and height of the target block, respectively.

Since the MMLM has a fewer number of samples of the reference image available for derivation of each linear model than the CCLM, the MMLM may not properly operate in a case that the target block size is small or the number of samples is small. Thus, as illustrated in FIG. 18(b), a switching unit 4103 is provided in the LM predictor 31044, and in a case that any of conditions described below is satisfied, the MMLM is turned off and the CCLM prediction is performed.

The target block size is equal to or smaller than TH_MMLMB (TH_MMLMB is 8×8, for example)
The number of samples of the reference image rCb[ ][ ] of the target block is smaller than TH_MMLMR (TH_MMLMR is 4, for example)
No reference image of the target block is on both the upper side and the left side of the target block These conditions can be determined by the size and position information of the target block, and thus, the signaling of the flag indicating whether or not the CCLM is used may be omitted.

In a case that the threshold th_mmlm is configured as the average of the reference image drL[x][y] of the luminance component, and that the pixel values of the decoded image duL[ ][ ] of the luminance component of the target block are concentrated on one side of th_mmlm, for example, that ⅞ pixels of duL[ ][ ] is concentrated in one category, the MMLM is turned off. Then, the flag indicating whether or not the CCLM is used may be signaled to signal that the MMLM is turned off (CCLM is selected).

In a case that a portion of the reference image is outside the slice, the MMLM is less likely to be selected. Thus, in the case that a portion of the reference image is outside the slice, the default sampling filter may be used in down-sampling without signalling information required for down-sampling so that a required amount of codes is reduced and the MMLM is likely to be selected.

In the coding tree, in a case that different coding trees are used in the luminance image and the chrominance image, that is, in a case that different splits are performed in the luminance image and the chrominance image, different linear models exist in one CTU so MMLM may be configured as default (a signal of a flag indicating whether CCLM or not may be omitted).

In the case that a portion of the reference image is outside the slice, the LM prediction may be turned off. In the blocks for which the intra prediction is used, the flag indicating whether or not the LM prediction is used is signaled in the first area of the intra prediction information of the chrominance component, and thus, the amount of codes can be reduced by not signaling the flag. In other words, the on-off control of the LM prediction is performed at the slice boundary.

Typically, in a case that the chrominance component of the target block has a higher correlation with the luminance component in the target block at the same position as itself than the chrominance component as itself in the neighboring block, the LM prediction is applied in the intra prediction, a more accurate prediction image is generated, and the coding efficiency is increased by reducing the prediction residuals.

Note that the configuration described above is an example of the predictor 3104, and the configuration of the predictor 3104 is not limited to the above configuration.

Suppression of Rounding Error

In the arithmetic operation of (Expression CCLM-1) to (Expression CCLM-8), or (Expression CCLM-12), an error (rounding error) occurs in a case that the processing of whether to round up or round down "0.5" is not shared when the calculation result "0.5" is made to be an integer, and the coding efficiency decreases with accumulated such errors. As a result, down-sampling filter coefficients are modified, the frequency at which "0.5" occurs in the arithmetic operation result is reduced, and a decrease in the coding efficiency due to the rounding error is suppressed.

Figure 26:
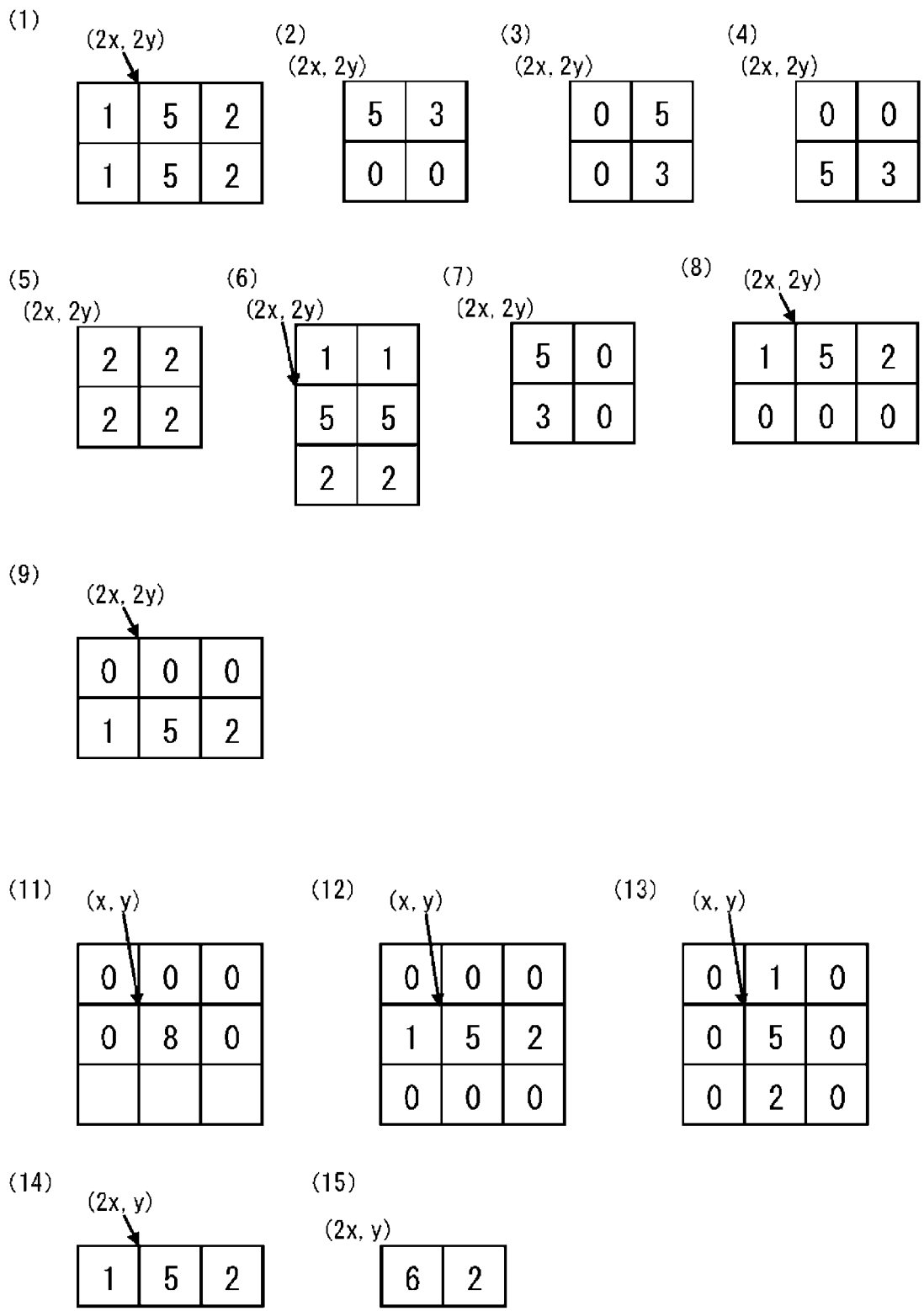
FIG. 26 is a diagram illustrating another example of the down-sampling method of luminance in the LM prediction mode.

FIG. 26 is filter coefficients that has modified the down-sampling filter coefficients of FIG. 24. In particular, by disbalancing the filter coefficients, the arithmetic operation corresponding to the division by 2 is reduced, and the frequency at which "0.5" occurs in the arithmetic operation result is reduced. For example, FIG. 26(2) is of the following expression:

Filter index 2 (FIG. 26(2))

$duL[x][y]=(5*uL[2x][2y]+3*uL[2x+1][2y]+4)>>shiftD$  (Expression CCLM-15)

Note that the filter coefficients in FIG. 26 are examples and are not limited to these coefficient values.

Down-Sampling Filter Shift Application 1

Rounding errors due to shift decreases as the arithmetic operation accuracy increases, or as the shift processing is performed in a further later step in the arithmetic operation. In the above, the down-sampled luminance pixel values are calculated by using (Expression CCLM-1) to (Expression CCLM-6) or (Expression CCLM-12), and linear model parameters aC, bC are derived by using (Expression CCLM-7) to (Expression CCLM-8), and (Expression CCLM-12). But the effect of rounding errors may be reduced by performing a shift operation in a case of deriving the parameters of the linear model without performing a shift operation in the step of deriving the down-sampled luminance image. For example, in the case of filter indexes 1, 2 in FIG. 24(2), the parameters of the linear model are calculated by using the luminance pixel values that have been down-sampled without performing a shift operation as described below. Note that rL[ ][ ] is a luminance pixel value of a reference region of the target block, drL[ ][ ] is a luminance pixel value of a reference region after down-sampling of the target block, and rC[ ][ ] is a chrominance pixel value of a reference region of the target block.

Filter index 1 (FIG. 24(1))

$$drL[x][y]=rL[2x-1][2y]+2*rL[2x][2y]+rL[2x+1][2y]+rL[2x-1][2y+1]+2*rL[2x][2y+1]+rL[2x+1][2y+1]+4$$

$$SSD=[\Sigma\Sigma rC[x][y]-\{(\Sigma\Sigma aC*drL[x][y])\text{>>shiftD1}+\Sigma\Sigma bC\}]^2$$

Filter index 2 (FIG. 24(2))

$$drL[x][y]=rL[2x][2y]+rL[2x+1][2y]+1$$

$$SSD=[\Sigma\Sigma rC[x][y]-\{(\Sigma\Sigma aC*drL[x][y])\text{>>shiftD2}+\Sigma\Sigma bC\}]^2 \quad \text{(Expression CCLM-16)}$$

where ΣΣ is the sum for x and y. shiftD1 is equal to 3, and shiftD2 is equal to 1.

In this way, by transferring the shift operation to the step of calculating the linear model, accumulation of rounding errors can be suppressed and the coding efficiency can be prevented from decreasing.

Down-Sampling Filter Shift Application 2

In the above, a linear model is derived from the down-sampled luminance pixel value, the prediction of the chrominance pixel value is performed, but the shift processing may not be applied at the time of down-sampling, and the shift processing may be applied at the time of prediction by the linear model. In other words, when down-sampling is performed as in the following expressions, shift processing by shiftD is not performed and shift processing by shiftD is performed at the time of prediction.

Filter index 2 (FIG. 25(2))

$$duL[x][y]=(4*uL[2x][2y]+4*uL[2x+1][2y]+4)$$

$$predCb[x][y]=(aCb*duL[x][y])\text{>>shiftD}+bCb$$

$$predCr[x][y]=(aCr*duL[x][y])\text{>>shiftD}+bCr \quad \text{(Expression CCLM-17)}$$

where, shiftD is equal to 3.

Note that, when the linear prediction coefficient is an integer by using the shifted value shiftA, the following expressions are used.

$$predCb[x][y]=(aCb*duL[x][y]+\text{round}CCLM)\text{>>(shiftCCLM)}+bCb$$

$$predCr[x][y]=(aCr*duL[x][y]+\text{round}CCLM)\text{>>(shiftCCLM)}+bCr \quad \text{(Expression CCLM-18)}$$

where, shiftCCLM is a sum of the shifted value shiftA of the linear prediction coefficient and the shifted value shiftD for down-sampling, shiftCCLM is equal to shiftA+shiftD, and roundCCLM is equal to 1<<(shiftCCLM−1). Note that, as described in (Sharing of Shifted Value), also in this case, the processing load can be reduced by setting the shifted value to a fixed shifted value shiftD regardless of the down-sampling filter.

Modification 1: Calculation of Luminance Pixel Value by Median

In the previous description, a luminance pixel value corresponding to a chrominance pixel value is calculated by down-sampling processing. In Modification 1 of the present application, a luminance pixel value corresponding to a chrominance pixel value is calculated by using a median filter.

FIG. 30 is an example of a luminance pixel position used in a case of calculating a luminance pixel value corresponding to a chrominance pixel value by a median filter from the luminance pixel value. FIG. 30 is an example of 3 luminance pixel values to be input into a median filter. The median filter is a filter that outputs a median of the input data. Accordingly, the output data best represents the characteristics of the input data. In the case of FIG. 30(1), a luminance pixel value duL[ ][ ] corresponding to a chrominance pixel value is represented as below.

$$duL[x][y]=\text{median}(uL[2x][2y],uL[2x+1][2y],uL[2x][2y+1]) \quad \text{(Expression CCLM-19)}$$

where, median ( ) is a function that returns a median of the input data. The luminance pixel at the position (2x, 2y) is Y1 in FIG. 24(10), and the luminance pixel at the position (2x+1, 2y) is Y2, and the luminance pixel at the position (2x, 2y+1) is Y3.

A median filter with 3 elements can also be derived by subtracting the maximum and minimum values from the total value. A median filter having a number of elements other than 3 may be used. In a case that the number of elements is 4, the median is not determined in one, but an average of two medians may be used. For example, ½ of a number obtained by subtracting the maximum value and the minimum value from the total may be used.

The pattern of luminance pixel positions input to the median filter may be signalled with the SPS, or the PPS, or the slice header. In another example, regarding the pattern of luminance pixel positions input to the median filter, multiple patterns may be signalled in the SPS, or the PPS, or the slice header, and a pattern used for each block may be further signalled from among the signalled patterns.

Using a median filter does not produce a rounding error, so the accumulation of rounding errors can be avoided.

Modification 2: Method for Deriving Chrominance Prediction Image of Target Block by Using Luminance Decoded Image of Target Block as Template In the above description, a method for deriving a linear model from a luminance decoded image and a chrominance decoded image adjacent to a target block, and generating a chrominance prediction image from a luminance decoded image of the target block by using the linear model is described. In Modification 2, a method of searching for the block that is most similar to a template in the decoded region (search region) of the target picture by using a luminance decoded image of the target block as the template, and configuring the chrominance decoded image of the block as the chrominance prediction image of the target block will be described.

Figure 31:
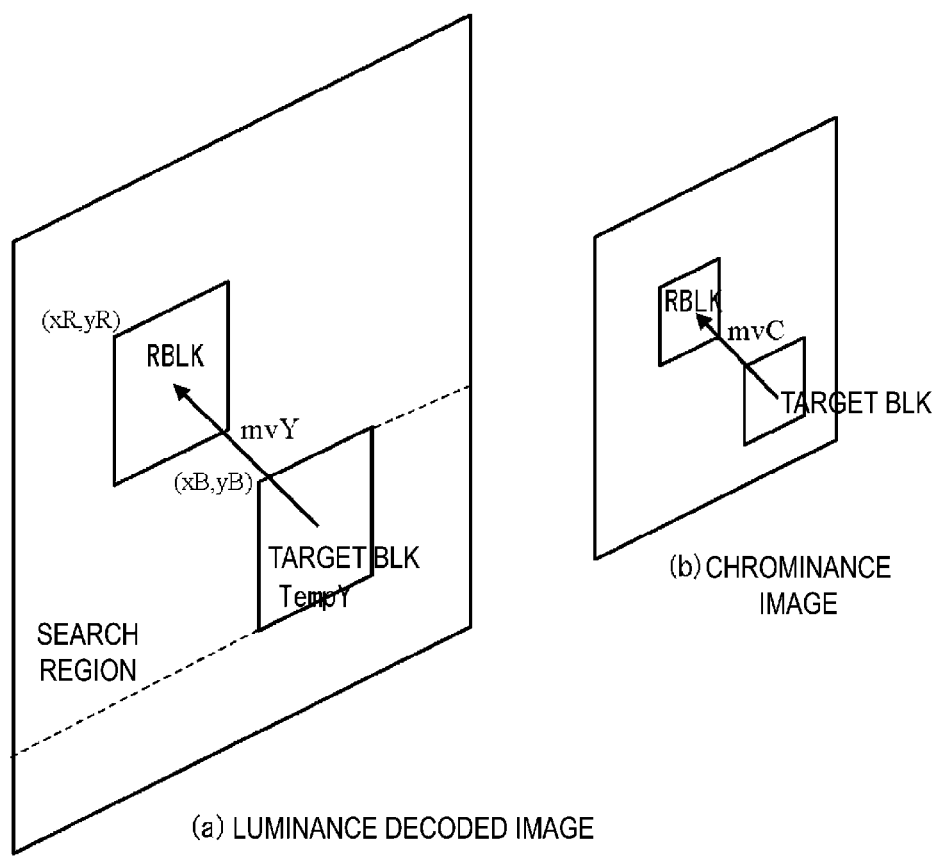
FIG. 31 is a diagram illustrating a method for deriving a chrominance prediction image of a target block, using a luminance decoded image of a target block as a template.

FIG. 31(a) is a diagram illustrating a luminance image TempY (template) of a target block and a block (reference block RBLK) that is most similar to the template in the search region. Assuming the upper left coordinates of the target block as (xB, yB), and motion vector mvY=(mvY[0], mvY[1]), the upper left coordinate of the block BLK in the search region as (xR, yR) is represented by the following expression:

$$(xR, yR)=(xB+mvY[0], yB+mvY[1])$$ (Expression CCLM-20)

The LM predictor 31044 determines a motion vector (mvY[0], mvY[1]) in which the matching costs of TempY and BLK are minimized. For example, the matching cost is expressed as in the following expression:

$$SAD=\Sigma\Sigma abs(TempY[xB+x][yB+y]-uL[xR+x][yR+y])$$ (Expression CCLM-21)

where ΣΣ represents a sum with respect to x and y, and uL[ ][ ] is a luminance decoded image in the search region. This motion vector indicates the distance between the template and the block most similar to the template (reference block RBLK). Note that the search region may be part of the decoded region.

The motion vector mvC, which indicates the distance of the chrominance, is then derived from the motion vector mvY, which indicates the distance of luminance of the target block and the reference block.

$$mvC=(mvC[0], mvC[1])=(mvY[0]/2, mvY[1]/2)(\text{in a case of } 4:2:0)=(mvY[0]/2, mvY[1])(\text{in a case of } 4:2:2)=(mvY[0], mvY[1])(\text{in a case of } 4:4:4)$$ (Expression CCLM-22)

The chrominance prediction images (predCb and predCr) of the target block set the chrominance decoded image at the position shifted by mvC from the upper left coordinate of chrominance of the target block, as illustrated in FIG. 31(b).

$$predCb[x][y]=uCb[x+mvC[0]][y+mvC[1]]$$

$$predCr[x][y]=uCr[x+mvC[0]][y+mvC[1]]$$ (Expression CCLM-23)

where uCb[ ][ ] and uCr[ ][ ] are chrominance decoded images.

In the present modification, reference blocks that are the most similar to the target block are searched in the search region for the luminance decoded image, and the chrominance decoded image of the reference block is configured as the chrominance prediction image of the target block. In other words, a linear model that derives the chrominance pixel value from the luminance pixel value is not required, and therefore, the processing is not influenced by the chrominance format, and no down-sampling processing is necessary. Accordingly, the configuration of down-sampling filters dependent on the luminance pixel position and the chrominance pixel position is not necessary, and there is a merit that processing is simple.

Modification 3: Intra Prediction Mode

In a case that the prediction mode of the target block is LM prediction, the information indicating the number (CCLM or MMLM) of down-sampling filters or linear models is separately signalled with a flag or an index. In Modification 3 of the present application, multiple intra prediction modes indicating LM predictions are provided, and information indicating the number of down-sampling filters and linear models is included in the intra prediction modes. As a result, in a content with a large proportion of LM prediction, an intra prediction mode in which the LM prediction mode, the number of down-sampling filters and linear models are combined is included in the MPM candidate list, and the MPM_idx can be used to signal these items with a short amount of coding. Accordingly, the amount of coding required in the LM prediction mode can be reduced.

FIG. 32 is an example in which the LM prediction including information indicating the number of down-sampling filters and linear models is added to the intra prediction mode of chrominance. The intra prediction mode of chrominance being 0 is Planar prediction, 1 is DC prediction, 2 to 66 are Angular predictions, and an LM prediction is assigned after 67. For example, as illustrated in FIG. 32(a), the intra prediction modes 67 to 70 are assigned linear model number 1, 71 to 74 are assigned linear model number 2, the intra prediction modes 67 and 71 are assigned filter index 1, 68 and 72 are assigned filter index 2, 69 and 73 are assigned filter index 3, and 70 and 74 are assigned filter index 4.

As yet another example, the number of Angular prediction modes of chrominance is reduced because the resolution of chrominance is often less than that of luminance. For example, Angular prediction modes assigned odd numbers are removed. In this case, 2 to 34 are Angular predictions, and LM prediction modes are assigned after 35. As illustrated in FIG. 32(b), the intra prediction modes 35 to 38 are assigned linear model number 1, 39 to 42 are assigned linear model number 2, the intra prediction modes 35 and 39 are assigned filter index 1, 36 and 40 are assigned filter index 2, 37 and 41 are assigned filter index 3, and 38 and 42 are assigned filter index 4.

As yet another example, the assignment of the intra prediction mode is changed, and the LM prediction mode is assigned a smaller value. For example, as illustrated in FIG. 32(c), LM prediction modes are assigned to 0 to 7, Planar prediction is assigned to 8, DC prediction is assigned to 9, and Angular predictions are assigned to 10 to 74.

As yet another example, as illustrated in FIG. 32(d), Planar prediction is assigned to 0, DC prediction is assigned to 1, LM prediction modes are assigned to 2 to 9, and Angular predictions are assigned to 10 to 74.

Note that the assignment patterns of these intra prediction modes are examples and are not limited to the above.

As described above, by individually assigning multiple LM prediction modes including information indicating the number of down-sampling filters or linear models to intra prediction modes, information necessary for prediction can be coded with shorter code by using the MPM candidate list in a case that the frequency of the occurrence of LM predictions is large. Therefore, the coding efficiency can be improved.

The dequantization and inverse transform processing unit 311 dequantizes the quantized transform coefficients input from the entropy decoding unit 301 to find transform coefficients. The dequantization and inverse transform processing unit 311 performs inverse frequency transform such as inverse DCT, inverse DST, and inverse KLT on the found transform coefficients to compute a prediction residual signal. The dequantization and inverse transform processing unit 311 outputs the computed residual signal to the addition unit 312.

The addition unit 312 adds the prediction image of the PU input from the inter prediction image generation unit 309 or intra prediction image generation unit 310 and the residual signal input from the dequantization and inverse transform processing unit 311 for each pixel to generate a decoded image of the PU. The addition unit 312 outputs the decoded image of the generated block to at least any one of the deblocking filter 313, the SAO (sample adaptive offset) unit 314, or the ALF 315.

Configuration of Inter Prediction Parameter Decoding Unit

Next, a description is given of a configuration of the inter prediction parameter decoding unit 303.

Figure 11:
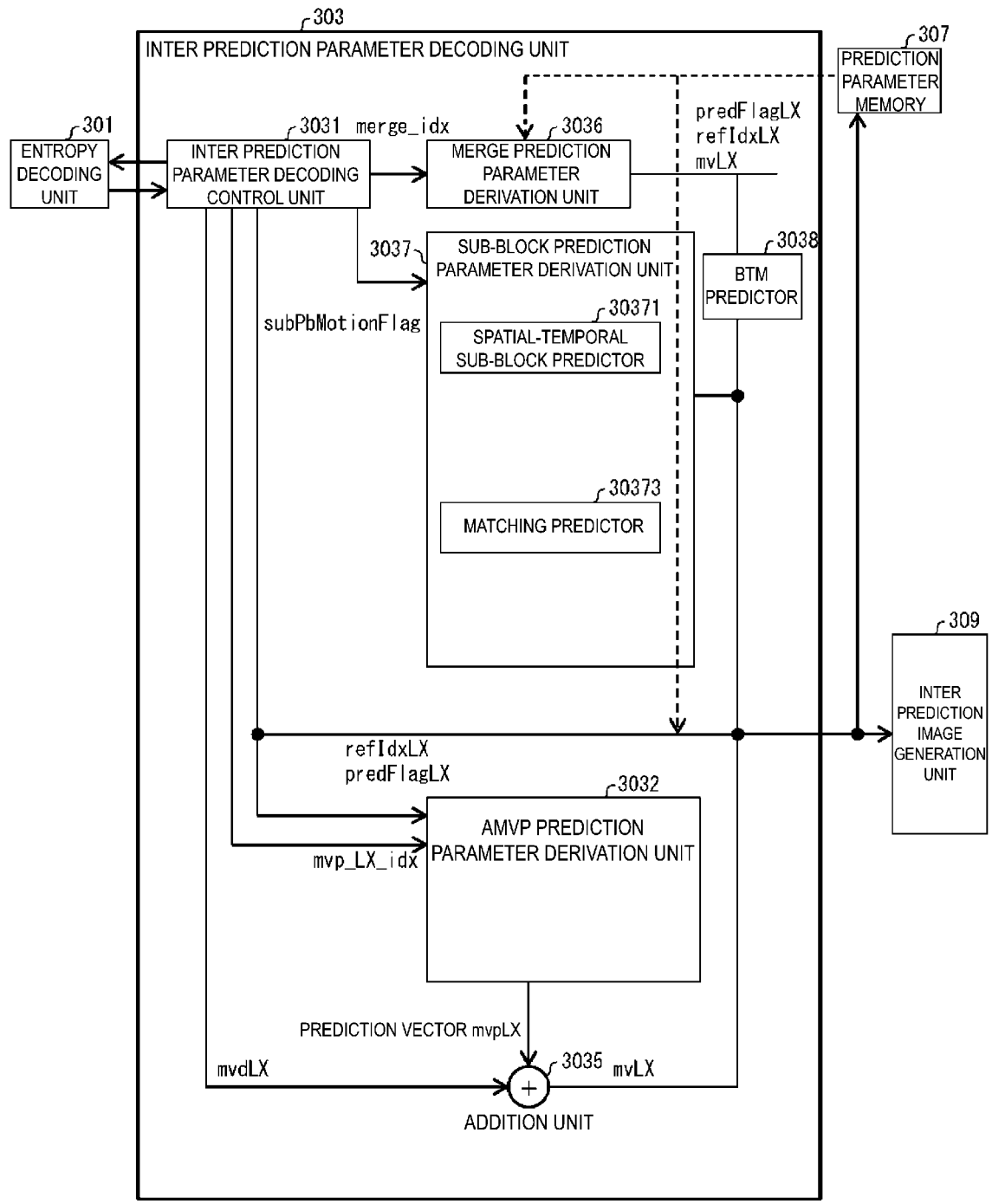
FIG. 11 is a diagram illustrating a configuration of an inter prediction parameter decoding unit according to the present embodiment.

FIG. 11 is a schematic diagram illustrating the configuration of the inter prediction parameter decoding unit 303 according to the present embodiment. The inter prediction parameter decoding unit 303 includes an inter prediction parameter decoding control unit 3031, an AMVP prediction parameter derivation unit 3032, an addition unit 3035, a merge prediction parameter derivation unit 3036, a sub-block prediction parameter derivation unit 3037, and a BTM predictor 3038.

The inter prediction parameter decoding control unit 3031 instructs the entropy decoding unit 301 to decode the code (syntax element) associated with the inter prediction to extract the code (syntax element) included in the coded data, for example, the PU split mode part_mode, the merge flag merge_flag, the merge index merge_idx, the inter prediction identifier inter_pred_idc, the reference picture index ref_idx_lX, the prediction vector index mvp_lX_idx, and the difference vector mvdLX.

The inter prediction parameter decoding control unit 3031 first extracts the merge flag merge_flag. An expression that the inter prediction parameter decoding control unit 3031 extracts a certain syntax element means instructing the entropy decoding unit 301 to decode a certain syntax element to read the syntax element from the coded data.

In a case that the merge flag merge_flag is 0, that is, indicates the AMVP prediction mode, the inter prediction parameter decoding control unit 3031 uses the entropy decoding unit 301 to extract the AMVP prediction parameter from the coded data. Examples of the AMVP prediction parameter include the inter prediction identifier inter_pred_idc, the reference picture index refIdxLX, the prediction vector index mvp_lX_idx, and the difference vector mvdLX. The AMVP prediction parameter derivation unit 3032 derives the prediction vector mvpLX from the prediction vector index mvp_lX_idx. Details will be described below. The inter prediction parameter decoding control unit 3031 outputs the difference vector mvdLX to the addition unit 3035. The addition unit 3035 adds the prediction vector mvpLX and the difference vector mvdLX to derive a motion vector.

In a case that the merge flag merge_flag is 1, that is, indicates the merge prediction mode, the inter prediction parameter decoding control unit 3031 extracts the merge index merge_idx as a prediction parameter related to the merge prediction. The inter prediction parameter decoding control unit 3031 outputs the extracted merge index merge_idx to the merge prediction parameter derivation unit 3036 (details of which are described later), and outputs a sub-block prediction mode flag subPbMotionFlag to the sub-block prediction parameter derivation unit 3037. The sub-block prediction parameter derivation unit 3037 splits the PU into multiple sub-blocks depending on a value of the sub-block prediction mode flag subPbMotionFlag to derive a motion vector in units of sub-block. Specifically, in the sub-block prediction mode, a prediction block is predicted in units of block as small as 4×4 or 8×8. In the image encoding device 11 described later, for a method in which the CU is split into multiple partitions (PU of 2N×N, N×2N, N×N, and the like) and a syntax of the prediction parameter is coded in units of partition, multiple sub-blocks are brought together into one or more sets in the sub-block prediction mode and the syntax of the prediction parameter is coded for each of the sets, and therefore, motion information of many sub-blocks can be coded using a small amount of codes.

To be more specific, the sub-block prediction parameter derivation unit 3037 includes at least one of a spatial-temporal sub-block predictor 30371, and a matching motion derivation unit 30373 that perform sub-block prediction in the sub-block prediction mode.

Sub-Block Prediction Mode Flag

Here, a method, in the image decoding device 31 and the image encoding device 11, for deriving the sub-block prediction mode flag subPbMotionFlag which indicates whether a prediction mode for a certain PU is the sub-block prediction mode will be described. The image decoding device 31, and the image encoding device 11 derive the sub-block prediction mode flag subPbMotionFlag, based on which of a spatial sub-block prediction SSUB, a temporal sub-block prediction TSUB, and a matching motion derivation MAT described later is used. For example, in a case that a prediction mode selected for a certain PU is N (for example, N is a label indicating the selected merge candidate), the sub-block prediction mode flag subPbMotionFlag may be derived by the following expression.

$$\text{subPbMotionFlag} = (N == T\text{SUB}) || (N == S\text{SUB}) || (N == MAT)$$

where, || represents a logical sum (this similarly applies below).

The image decoding device 31 and the image encoding device 11 may be configured to perform some of the spatial sub-block prediction SSUB, the temporal sub-block prediction TSUB, and the matching motion derivation MAT. In other words, in a case that the image decoding device 31 and the image decoding device 31 are configured to perform the spatial sub-block prediction SSUB, the sub-block prediction mode flag subPbMotionFlag may be derived as described below.

$$\text{subPbMotionFlag} = (N == S\text{SUB})$$

Figure 7:
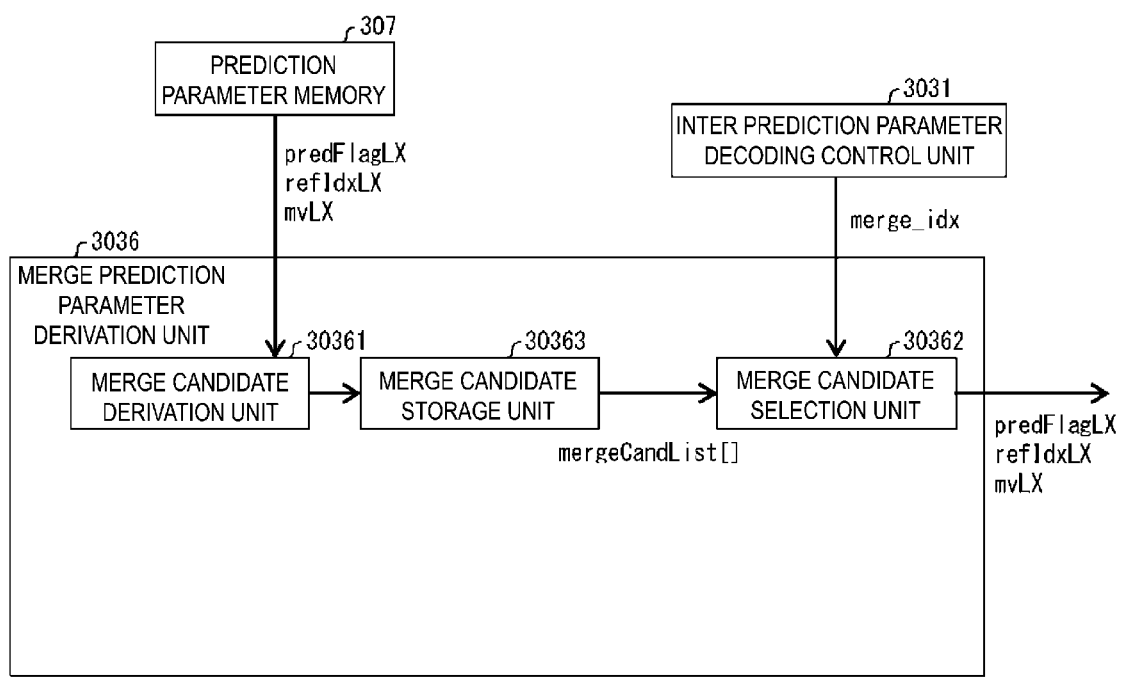
FIG. 7 is a diagram illustrating a configuration of a merge prediction parameter derivation unit according to the present embodiment.

FIG. 7 is a schematic diagram illustrating a configuration of the merge prediction parameter derivation unit 3036 according to the present embodiment. The merge prediction parameter derivation unit 3036 includes a merge candidate derivation unit 30361, a merge candidate selection unit 30362, and a merge candidate storage unit 30363. The merge candidate storage unit 30363 stores therein merge candidates input from the merge candidate derivation unit 30361. Note that the merge candidate includes the prediction list utilization flag predFlagLX, the motion vector mvLX, and the reference picture index refIdxLX. The merge candidate stored in the merge candidate storage unit 30363 is assigned with an index according to a prescribed rule.

The merge candidate derivation unit 30361 uses, without change, a motion vector and reference picture index refIdxLX of a neighboring PU already subjected to the decoding processing to derive a merge candidate.

Spatial Merge Candidate Derivation Process

In the spatial merge candidate derivation process, the merge candidate derivation unit 30361 reads out the prediction parameter (prediction list utilization flag predFlagLX, motion vector mvLX, reference picture index refIdxLX) stored in the prediction parameter memory 307 according to a prescribed rule, derives a merge candidate as the read out prediction parameter, and stores the merge candidate in a merge candidate list mergeCandList[ ] (prediction vector candidate list mvpListLX[ ]). The read out prediction parameters are prediction parameters related to each of the PUs in a predefined range from the decoding target PU (for example, all or some of PUs share the boarder with lower left end, upper left end, and upper right end of the decoding target PU.

Temporal Merge Candidate Derivation Process

In a temporal merge derivation process, the merge candidate derivation unit 30361 reads out, in the reference picture, the prediction parameter for a lower right of the collocated block or a block including the coordinates of the center of the decoding target PU from the prediction parameter memory 307, and stores the read out prediction parameter as a merge candidate in the merge candidate list mergeCandList[ ]. As a method of specifying the reference picture, the reference picture index refIdxLX specified in the slice header may be used, or a minimum one of the reference picture indexes refIdxLX of the PUs neighboring to the decoding target PU may be used to specify the reference picture, for example.

Combined Merge Candidate Derivation Process

In the combined merge derivation process, the merge candidate derivation unit 30361 combines motion vectors and reference picture indexes of two different derived merge candidates which are already derived and stored in the merge candidate storage unit 30363 as motion vectors for L0 and L1, respectively to derive a combined merge candidate, and stores the derived combined merge candidate in the merge candidate list mergeCandList[ ].

Zero Merge Candidate Derivation Process

In the zero merge candidate derivation process, the merge candidate derivation unit 30361 derives a merge candidate which has a reference picture index refIdxLX of 0 and both an X component and Y component of 0 of a motion vector mvLX, and stores the derived merge candidate in the merge candidate list mergeCandList[ ].

The merge candidate selection unit 30362 selects, as an inter prediction parameter for the target PU, a merge candidate assigned with an index corresponding to the merge index merge_idx input from the inter prediction parameter decoding control unit 3031, among the merge candidates stored in the merge candidate list mergeCandList[ ] of the merge candidate storage unit 30363. The merge candidate selection unit 30362 stores the selected merge candidate in the prediction parameter memory 307 and outputs the merge candidate to the prediction image generation unit 308.

Sub-Block Predictor

Next, a sub-block predictor will be described.

Spatial-Temporal Sub-Block Predictor 30371

The spatial-temporal sub-block predictor 30371 derives a motion vector of a sub-block obtained by splitting the target PU, from a motion vector of a PU on the reference picture (for example, the immediately preceding picture) temporally neighboring to the target PU, or a motion vector of a PU spatially neighboring to the target PU. Specifically, by scaling the motion vector of the PU on the reference picture in conformity with the reference picture referred to by the target PU, a motion vector spMvLX[xi][yi] (xi=xPb+BW*i, yj=yPb+BH*j, i=0, 1, 2, . . . , W/BW−1, j=0, 1, 2, . . . , H/BH−1) of each sub-block in the target PU is derived (temporal sub-block prediction). Here, (xPb, yPb) represents the upper left coordinates of the target PU, W and H represent the size of the target PU, and BW and BH represent the size of the sub-block.

By calculating a weighted average of a motion vector of a PU neighboring to the target PU in accordance with a distance from a sub-block obtained by splitting the target PU, the motion vector spMvLX[xi][yi] (xi=xPb+BW*i, yj=yPb+BH*j, i=0, 1, 2, . . . , W/BW−1, j=0, 1, 2, . . . , H/BH−1) of each sub-block in the target PU may be derived (spatial sub-block prediction).

The temporal sub-block prediction candidate TSUB or the spatial sub-block prediction candidate SSUB is selected as one mode of the merge mode (merge candidate).

Motion Vector Scaling

First, a method for deriving a scaling of a motion vector is described. Assuming a motion vector Mv, a picture Pic1 including a block having a motion vector Mv, a reference picture Ric2 of the motion vector Mv, a post-scaling motion vector sMv, a picture Pict3 including a block having a post-scaling motion vector sMv, and a reference picture Pic4 referred to by the post-scaling motion vector sMv, a derivative function MvScale(Mv, Pic1, Pic2, Pic3, Pic4) of sMv is represented by the following expression.

$$sMv2 = MvScale(Mv, Pic1, Pic2, Pic3, Pic4) = Clip3(-R1, R1-1, sign(distScaleFactor*Mv)*((abs(distScaleFactor*Mv)+round1-1)>>shift1))$$

$$distScaleFactor = Clip3(-R2, R2-1, (tb*tx + round2) >> shift2)$$

$$tx = (16384 + abs(td) >> 1)/td$$

$$td = DiffPicOrderCnt(Pic1, Pic2)$$

$$tb = DiffPicOrderCnt(Pic3, Pic4) \quad \text{(Expression MVSCALE-1)}$$

where, round1, round2, shift1, and shift2 are rounded and shifted values for division using an inverse, and are, for example, round1=1<<(shift1−1), round2=1<<(shift2−1), shift1=8, shift2=6, and the like. DiffPicOrderCnt(Pic1, Pic2) is a function that returns a difference in temporal information (for example, POC) between Pic1 and Pic2. R1, R2, and R3 restrict a range of values to perform the process with limited accuracy, and are, for example, R1=32768, R2=4096, R3=128 and the like.

A scaling function MvScale(Mv, Pic1, Pic2, Pic3, Pic4) may also be the following expression.

$$MvScale(Mv, Pic1, Pic2, Pic3, Pic4) = Mv*DiffPicOrderCnt(Pic3, Pic4)/DiffPicOrderCnt(Pic1, Pic2) \quad \text{(Expression MVSCALE-2)}$$

That is, My may be scaled depending on a ratio of the difference in the temporal information between Pic1 and Pic2 to the difference in the temporal information between Pic3 and Pic4.

Matching Motion Derivation Unit 30373

The matching motion derivation unit 30373 performs a matching process of any one of bilateral matching and template matching, and thereby derives a motion vector spMvLX of a block or a sub-block constituting a PU. FIG. 12 is a diagram for illustrating (a) Bilateral matching, and (b) Template matching. A matching motion derivation mode is selected as one merge candidate (matching candidate) of the merge mode.

Based on the assumption that an object moves at a constant speed, the matching motion derivation unit 30373 derives a motion vector by matching of regions of multiple reference pictures. In bilateral matching, based on the assumption that a certain object passes a certain region of a reference picture A, a target PU of a target picture Cur_Pic, and a certain region of a reference picture B at a constant speed, a motion vector of the target PU is derived by matching between the reference pictures A and B. In template matching, based on the assumption that a motion vector of a neighboring region of a target PU and a motion vector of the target PU are equal, a motion vector is derived by matching of a neighboring region Temp_Cur (template) of the target PU and a neighboring region Temp_L0 of a reference block on a reference picture. The matching motion derivation unit splits the target PU into multiple sub-blocks, and performs bilateral matching or template matching (described later) for each of the split sub-blocks, and thereby derives a motion vector spMvLX[xi][yi] (xi=xPb+BW*i, yj=yPb+BH*j, i=0, 1, 2, . . . , W/BW−1, j=0, 1, 2, . . . , H/BH−1) of the sub-block.

As illustrated in (a) of FIG. 12, in bilateral matching, two reference pictures are referred to in order to derive a motion vector of a target block Cur block of a target picture Cur_Pic. More specifically, first, Block_A and Block_B are configured. Block_A is a region within a reference picture Ref0 (referred to as a reference picture A) that is specified by the reference picture index refIdxL0, and that has upper left coordinates (xPos0, yPos0) that are determined according to:

$$(xPos0, yPos0) = (xCur + mv0[0], yCur + mv0[1]) \quad \text{(Expression FRUC-1)}$$

where (xCur, yCur) represents coordinates of the target block Cur_block.

Block_B is, for example, a region within a reference picture Ref1 (referred to as a reference picture B) that is specified by the reference picture index refIdxL1, and that has upper left coordinates (xPos1, yPos1) that are determined according to:

$$(xPos1, yPos1) = (xCur + mv1[0], xCur + mv1[1]) = (xCur - mv0[0]*\text{DiffPicOrderCnt}(Cur\_Pic, Ref1)/\text{DiffPicOrderCnt}(Cur\_Pic, Ref0), yCur - mv0[1]*\text{DiffPicOrderCnt}(Cur\_Pic, Ref1)/\text{DiffPicOrderCnt}(Cur\_Pic, Ref0)) \quad \text{(Expression FRUC-2)}$$

Here, as illustrated in (a) of FIG. 12, DiffPicOrderCnt(Cur_Pic, Ref0) and DiffPicOrderCnt(Cur_Pic, Ref1) respectively represent a function for returning a difference of temporal information between the target picture Cur_Pic and the reference picture A and a function for returning a difference of temporal information between the target picture Cur_Pic and the reference picture B.

Next, (mv0[0], mv0[1]) is determined so that a matching cost between Block_A and Block_B has a minimum value. (mv0[0], mv0[1]) derived in this manner is used as the motion vector assigned for the target block. Based on the motion vector assigned for the target block, a motion vector spMVL0 is derived for each sub-block that is obtained by splitting the target block.

In contrast, (b) of FIG. 12 is a diagram for illustrating Template matching, which is one of the above matching processes.

As illustrated in (b) of FIG. 12, in template matching, one reference picture is referred to at one time in order to derive a motion vector of a target block Cur block of a target picture Cur_Pic.

More specifically, a reference block Block_A is determined. For example, the reference block Block_A is a region within a reference picture Ref0 (referred to as a reference picture A) that is specified by the reference picture index refIdxL0, and that has upper left coordinates (xPos0, yPos0) that are determined according to:

$$(xPos0, yPos0) = (xCur + mv0[0], yCur + mv0[1]) \quad \text{(Expression FRUC-3)}$$

where (xCur, yCur) represents upper left coordinates of the target block Cur_block.

Next, a neighboring template region Temp_Cur of the target block Cur_block in the target picture Cur_Pic and a neighboring template region Temp_L0 of Block_A in the reference picture A are configured. In the example illustrated in (b) of FIG. 12, the template region Temp_Cur includes an upper neighboring region of the target block Cur_block and a left neighboring region of the target block Cur_block. The template region Temp_L0 includes an upper neighboring region of Block_A and a left neighboring region of Block_A.

Next, (mv0[0], mv0[1]) that leads to the minimum matching cost between Temp_Cur and Temp_L0 is determined, and determined (mv0[0], mv0[1]) is used as the motion vector assigned for the target block. Based on the motion vector assigned for the target block, a motion vector spMvL0 is derived for each sub-block that is obtained by splitting the target block.

Also in template matching, two reference pictures Ref0 and Ref1 may be processed. In this case, matching with the reference picture Ref0 and matching with the reference picture Ref1 described above are sequentially performed. A reference block Block_B is determined. The reference block Block_B is the region within a reference picture Ref1 (referred to as a reference picture B) that is specified by the reference picture index refIdxL1, and that has upper left coordinates (xPos1, yPos1) that are determined according to:

$$(xPos1, yPos1) = (xCur + mv1[0], yCur + mv1[1]) \quad \text{(Expression FRUC-4).}$$

Then, neighboring template regions Temp_L1 of Block_B in the reference picture B are configured.

Finally, (mv1[0], mv1[1]) that leads to the minimum matching cost between Temp_Cur and Temp_L1 is determined, and determined (mv1[0], mv1[1]) is used as the motion vector assigned for the target block. Based on the motion vector assigned for the target block, a motion vector spMvL1 is derived for each sub-block that is obtained by splitting the target block.

Motion Vector Derivation Process According to Matching Process

The flow of a motion vector derivation (pattern matched vector derivation) process in a matching mode will be described with reference to the flowchart of FIG. 13.

Figure 13:
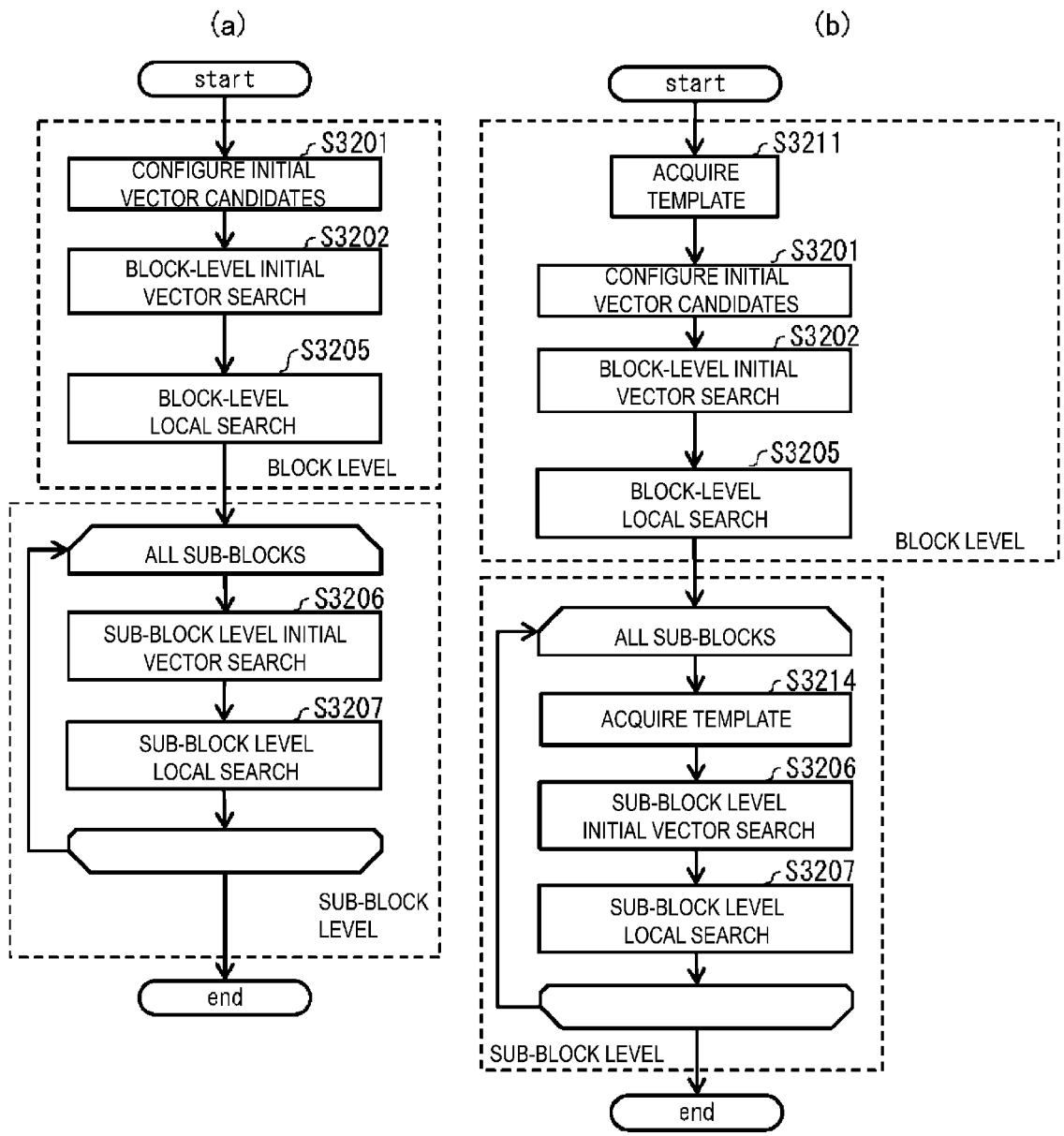
FIG. 13 is a flowchart illustrating operations of a motion vector derivation process of a matching mode.

The process illustrated in FIG. 13 is performed by the matching predictor 30373. FIG. 13(a) is a flowchart of a bilateral matching process, and FIG. 13(b) is a flowchart of a template matching process.

Note that S3201 to S3205, out of the steps illustrated in FIG. 13(a), correspond to a block search performed at the block level. Specifically, a motion vector is derived for the whole block (CU or PU) by means of pattern matching.

S3206 and S3207 correspond to a sub-block search performed at the sub-block level. Specifically, a motion vector is derived for each sub-block that constitutes a block, by means of pattern matching.

First, in S3201, the matching predictor 30373 configures block-level initial vector candidates of a target block. The initial vector candidates are motion vectors of neighboring blocks, such as an AMVP candidate and a merge candidate of the target block.

Next, in S3202, the matching predictor 30373 searches for a vector that leads to the minimum matching cost among the initial vector candidates configured in the above, and uses the searched vector as an initial vector to be the basis for a vector search. For example, the matching cost is expressed as in the following expression:

$$SAD=\Sigma\Sigma abs(Block\_A[x][y]-Block\_B[x][y]) \quad \text{(Expression FRUC-5)}$$

where $\Sigma\Sigma$ represents a sum with respect to x and y, and Block_A[ ][ ] and Block_B[ ][ ] respectively represent a block whose upper left coordinates are expressed by (xPos0, yPos0) and (xPos1, yPos1) of (Expression FRUC-1) and (Expression FRUC-2). Each of the initial vector candidates is substituted into (mv0[0], mv0[1]). Then, a vector that leads to the minimum matching cost is again set to (mv0[0], mv0[1]).

In S3205, the matching predictor 30373 performs a block-level local search of the target block. In the local search, a local region around the initial vector derived in S3202 (for example, a region around the initial vector) is further searched for a vector that leads to the minimum matching cost, and the searched vector is used as the final motion vector of the target block.

Subsequently, the following process is performed on each sub-block included in the target block (S3206 and S3207).

In S3206, the matching predictor 30373 derives an initial vector of each sub-block of the target block (initial vector search). Initial vector candidates of the sub-block are the block-level motion vector derived in S3205, a motion vector of a neighboring block of the sub-block in the spatial-temporal direction, and an ATMVP or STMVP vector of the sub-block, for example. Among these candidate vectors, a vector that leads to the minimum matching cost is used as the initial vector of the sub-block. Note that the vector candidates used for the initial vector search of the sub-block are not limited to the vectors described above.

Next, in S3207, the matching predictor 30373 performs a step search or the like (local search) in a local region around the initial vector of the sub-block selected in S3206 (for example, a region of search_range around the initial vector). Then, matching costs of the vector candidates near the initial vector of the sub-block are derived, and a vector that leads to the minimum matching cost is thereby derived as the motion vector of the sub-block.

After the process for all the sub-blocks included in the target block completes, the pattern matched vector derivation process of bilateral matching ends.

Next, a pattern matched vector derivation process of template matching will be described with reference to FIG. 13(b). Note that S3211 to S3205, out of the steps illustrated in FIG. 13(b), correspond to a block search performed at the block level. S3214 to S3207 correspond to a sub-block search performed at the sub-block level.

First, in S3211, the matching predictor 30373 sets the upper neighboring region and the left neighboring region of the target block to the template Temp_Cur of the target block (both the upper neighboring region and the left neighboring region of the target block) and acquires the template of the target block.

Next, in S3201, the matching predictor 30373 configures block-level initial vector candidates of the target block. The process of S3201 is the same as the process of S3201 of FIG. 13(a).

Next, in S3202, the matching predictor 30373 searches for a vector that leads to the minimum matching cost among the initial vector candidates configured in the above, and uses the searched vector as an initial vector to be the basis for a vector search. For example, the matching cost is expressed as in the following expression:

$$SAD=\Sigma\Sigma abs(Temp\_Cur[x][y]-Temp\_L0[x][y]) \quad \text{(Expression FRUC-6)}$$

where $\Sigma\Sigma$ represents a sum with respect to x and y, and Temp_L0[ ][ ] represents a template of the target block illustrated in FIG. 12(b), and corresponds to the upper and left neighboring regions of Block_A whose upper left coordinates are (xPos0, yPos0) expressed in (Expression FRUC-3). Each of the initial vector candidates is substituted into (mv0[0], mv0[1]) of (Expression FRUC-3). Then, a vector that leads to the minimum matching cost is again set to (mv0[0], mv0[1]).

In S3205, the matching predictor 30373 performs a block-level local search of the target block. In the local search, a local region around the initial vector derived in S3202 (for example, a region of search_range around the initial vector) is further searched for a vector that leads to the minimum matching cost, and the searched vector is used as the final motion vector of the target block.

Subsequently, the following process is performed on each sub-block included in the target block (S3214 to S3207).

In S3214, as illustrated in FIG. 12(d), the matching predictor 30373 acquires a template of each sub-block of the target block.

In S3206, the matching predictor 30373 derives an initial vector of each sub-block of the target block (initial vector search). Initial vector candidates of the sub-block are the block-level motion vector derived in S3205, a motion vector of a neighboring block of the sub-block in the spatial-temporal direction, and an ATMVP or STMVP vector of the sub-block, for example. Among these candidate vectors, a vector that leads to the minimum matching cost is used as the initial vector of the sub-block. Note that the vector candidates used for the initial vector search of the sub-block are not limited to the vectors described above.

Next, in S3207, the matching predictor 30373 performs a step search (local search) around the initial vector of the sub-block selected in S3206. Then, matching costs of the vector candidates in the local region around the initial vector of the sub-block (for example, a range of search_range around the initial vector) are derived, and a vector that leads to the minimum matching cost is thereby derived as the motion vector of the sub-block. Here, in a case that a vector candidate coincides with the search range around the initial vector (or outside of the search range), the matching predictor 30373 does not search the vector candidate.

After the process for all the sub-blocks included in the target block completes, the pattern matched vector derivation process of template matching ends.

Although the above describes a case that the reference picture is Ref0, template matching can also be performed through the same process as above even in a case that the reference picture is Ref1. Furthermore, in a case that two reference pictures are used, the motion compensation unit 3091 performs a bi-prediction process by using two derived motion vectors.

fruc_merge_idx output to the motion compensation unit 3091 is derived according to the following expression:

$$fruc\_merge\_idx = fruc\_merge\_idx \& BM\_flag \& (TM\_flag << 1) \quad \text{(Expression FRUC-7)}$$

Note that, in a case that fruc_merge_idx is signalled by the image decoding device 31, BM_flag and TM_flag are derived before the pattern matched vector derivation process, and only a matching process with a true flag value may be performed.

$$BM\_flag = fruc\_merge\_idx \& 1$$

$$TM\_flag = (fruc\_merge\_idx \& 10) >> 1 \quad \text{(Expression FRUC-8)}$$

Block Size Dependent Search Range

The matching predictor 30373 may configure the search range search_range in the bilateral matching process and the template matching process depending on the size of the target block or the target sub-block. For example, in a case that the width of the target (sub) block is W and the height is H, the search_range may be configured as described below.

$$D=1 \text{ (if } (W+H<=THS1))$$

$$D=4 \text{ (else if } (W+H<=THS2)$$

$$D=8 \text{ (otherwise)}$$

$$search\_range = W+2*D \text{ (horizontal direction)}$$

$$H+2*D \text{ (vertical direction)} \quad \text{(Expression FRUC-9)}$$

In other words, when the image decoding device searches for the motion vector of the target block, the search range may be configured depending on the block size so that the search range is larger in a case that the target block size are large, and the search range is smaller in a case that target block size is small.

For example, with THS1=8 and THS2=16, in a case that the target (sub) block size is 4×4, D is configured to be equal to 1, in a case that the target (sub) block size is 8×8, D is configured to be equal to 4, and in a case that the target (sub) block size is greater than 8×8, D is configured to be equal to 8. The search range configuration according to the block size may be implemented in a configuration in which the search range is derived by reference to a lookup table, based on the block size.

Furthermore, as described below, the matching predictor 30373 may be configured to derive the search range by changing the search range by a shift operation dependent on the block size. More specifically, the default search range default_range is right shifted by range_shift to derive the search range search_range, based on the difference (range_shift) between the sum of logarithmic values of 2 of the block size W and H and a logarithmic value of 2 (log 2 (FRUC_BASE_SIZE*2)) of a prescribed value (FRUC_BASE_SIZE*2). For example, the prescribed value FRUC BASE SIZE may be configured to be 8.

$$range\_shift = \max(0, \log 2(FRUC\_BASE\_SIZE*2) - \log 2(W) - \log 2(H));$$

$$search\_range = default\_range >> range\_shift$$

Note that in a case that the sum of the block size W and H is less than a prescribed value (FRUC_BASE_SIZE*2), the matching predictor 30373 may be configured to use a search range configured in accordance with the block size, and otherwise use the default search range (default_range) as below.

```
search_range = default_range        (Expression FRUC-10)
If (W + H < FRUC_BASE_SIZE * 2) {
    range_shift = max (0, log2(FRUC_BASE_SIZE * 2) - log2(W) -
        log2(H));
    search_range = default_range >> range_shift;
}
```

Note that the matching predictor 30373 may further change the magnitude of the shift amount range_shift derived by the difference as described above by a shift operation, division, product, or the like (here, ½, or ½ may be ">>1" (right shift by 1)).

```
search_range = default_range        (Expression FRUC-11)
If (W + H < FRUC_BASE_SIZE * 2) {
    range_shift = max (0, log2(FRUC_BASE_SIZE * 2) - log2(W) -
        log2(H));
    search_range = default_range >> (range_shift/2);
}
```

In a case of small blocks, the overhead of data transfer required for the search increases, but as described above, the increase in the circuit size can be avoided by configuring the search range to be small.

As another embodiment, the matching predictor 30373 may configure the increment D of the search range search_range in the bilateral matching process and the template matching process for each of the target sub-block, or horizontal and vertical sizes of the target block. For example, in a case that the width of the target (sub) block is W and the height is H, the search_range may be configured as described below. Here, SZ is the width W or the height H of the target (sub) block.

$$D=1 \text{ (if } (SZ<=THS1))$$

$$D=2 \text{ (else if } (SZ<=THS2)$$

$$D=4 \text{ (otherwise)}$$

$$search\_range = W+2*Dh \text{ (horizontal direction)}$$

$$H+2*Dv \text{ (vertical direction)} \quad \text{(Expression FRUC-12)}$$

where, Dh is the increment in the horizontal direction of the search range, Dv is the increment in the vertical direction, Dh is equal to D for the horizontal direction and Dv is equal to D for the vertical direction.

In other words, when the image decoding device searches the motion vector of the target block, the search range may be configured according to the direction of the block size so that the search range in the direction in which the target block size is large may be increased, and the search range in the direction in which the target block size is small is small.

For example, with THS1=4 and THS2=8, in a case that the target (sub) block size is 4×8, the increment Dh of the search range in the horizontal direction is equal to 1 and the increment Dv of the search range in the vertical direction is equal to 2. In a case that the target (sub) block size is 16×8, the increment Dh of the search range in the horizontal direction is equal to 4 and the increment Dv of the search range in the vertical direction is equal to 2. The search range configuration according to the direction of the block size may be implemented in a configuration in which the search range is derived by reference to a lookup table, based on the direction of the block size.

As yet another embodiment, the matching predictor 30373 may configure the increment of the search range search_range of the bilateral matching process and the template matching process depending on the combination of the size of the target block or the target sub-block and the resolution of the image. For example, in a case that the width of the target (sub) block is W, the height is H, the width of the image is Wpict, and the height is Hpict, the increment D of the search range may be configured as illustrated in FIG. 19. FIG. 19(a) illustrates the increment D of the search range depending on the resolution Spict of the image and the block size Sblk. FIG. 19(b) is a diagram illustrating the thresholds THS1, THS2 of block sizes depending on the resolution Spict of the image.

$$Spict=Wpict+Hpic$$

$$Sblk=W+H \quad \text{(Expression FRUC-13)}$$

For example, a threshold of the resolution of the image may be THP1=3000 (HD image), THP2=6000 (4K image), and THP3=12000 (8K image).

In this case, the search range search_range is given by the following expression:

$$search\_range=W+2*D \text{ (horizontal direction)}$$

$$H+2*D \text{ (vertical direction)} \quad \text{(Expression FRUC-14)}$$

In other words, when the image decoding device searches for the motion vector of the target block, the search range may be configured in accordance with the block size so that the search range is larger in a case that the image resolution and the target block size are large, and the search range is smaller in a case that the image resolution and target block size is small.

Configuring the search range dependent on both the resolution of the image and the block size in this manner makes it possible to configure the search range based on the angle of view per pixel that is different depending on the resolution of the image.

The search range configuration according to the resolution of the image and the block size may be implemented in a configuration in which the search range is derived by reference to a lookup table, based on the block size.

BTM

A BTM predictor 3038 uses a prediction image generated using a bi-directional motion vector derived by the merge prediction parameter derivation unit 3036 as a template, performs a bilateral template matching (BTM) process, and thereby derives a motion vector with high accuracy.

Example of Motion Vector Derivation Process

In a case that two motion vectors derived in the merge mode point to a direction opposite to the target block, the BTM predictor 3038 performs the bilateral template matching (BTM) process.

The bilateral template matching (BTM) process will be described with reference to FIG. 14. FIG. 14(a) is a diagram illustrating a relationship between a reference picture and a template in BTM prediction, FIG. 14(b) is a diagram illustrating a flow of the process, and FIG. 14(c) is a diagram illustrating a template in BTM prediction.

As illustrated in FIGS. 14(a) and 14(c), first, the BTM predictor 3038 generates a prediction block of a target block Cur_block, based on multiple motion vectors (for example, mvL0 and mvL1) derived by the merge prediction parameter derivation unit 3036, and uses the generated prediction block as a template. Specifically, a prediction block Cur_Temp is generated based on a motion compensation image predL0 generated based on mvL0 and a motion compensation image predL1 generated based on mvL1.

$$Cur\_Temp[x][y]=Clip3(0,(1<<bitDepth)-1,(predL0[x][y]+predL1[x][y]+1)>>1) \quad \text{(Expression BTM-1)}$$

Next, within a range of search_range around each of mvL0 and mvL1 (initial vector), the BTM predictor 3038 configures motion vector candidates, and derives matching costs between each of the motion compensation images PredL0 and PredL1 generated by the motion vector candidates and the template. Then, vectors mvL0' and mvL1' that lead to the minimum matching cost are used as updated motion vectors of the target block.

Next, the flow of BTM prediction will be described with reference to FIG. 14(b). First, the BTM predictor 3038 acquires a template (S3501). The template is, as described above, generated based on the motion vectors (for example, mvL0 and mvL1) derived by the merge prediction parameter derivation unit 3036. Next, the BTM predictor 3038 performs a local search. The local search may be performed in a manner of repeatedly performing searches of multiple different accuracies, as in S3502 to S3505. For example, the local search is performed in the order of an M-pixel accuracy search L0 process (S3502), an N-pixel accuracy search L0 process (S3503), an M-pixel accuracy search L1 process (S3504), and an N-pixel accuracy search L1 process (S3505). Here, M>N, and for example, M may be 1-pixel accuracy (M=1-pixel accuracy) and N may be ½-pixel accuracy (N=½-pixel accuracy).

In an M-pixel accuracy LX search process (X=0..1), a search is performed around coordinates indicated by mvLX. In an N-pixel accuracy search LX process, a search is performed around coordinates that lead to the minimum matching cost in the M-pixel accuracy search LX process.

The search range of the BTM process may be configured in accordance with the position and the size of the target block or the position and the size of the target sub-block as described in the process of the bilateral matching and template matching. For example, the target (sub) block size may be configured as W (width)+H (height) as in (Expression FRUC-10). The search range may be configured in combination with the resolution and the block size of the image. In this configuration, configuring the search range according to the (sub) block size may make it possible to avoid an increase in overhead of data transfer associated with small blocks.

By modifying the motion vectors derived in the merge mode as in the manner described above, a prediction image can be improved.

Inter Prediction Image Generation Unit 309

Figure 10:
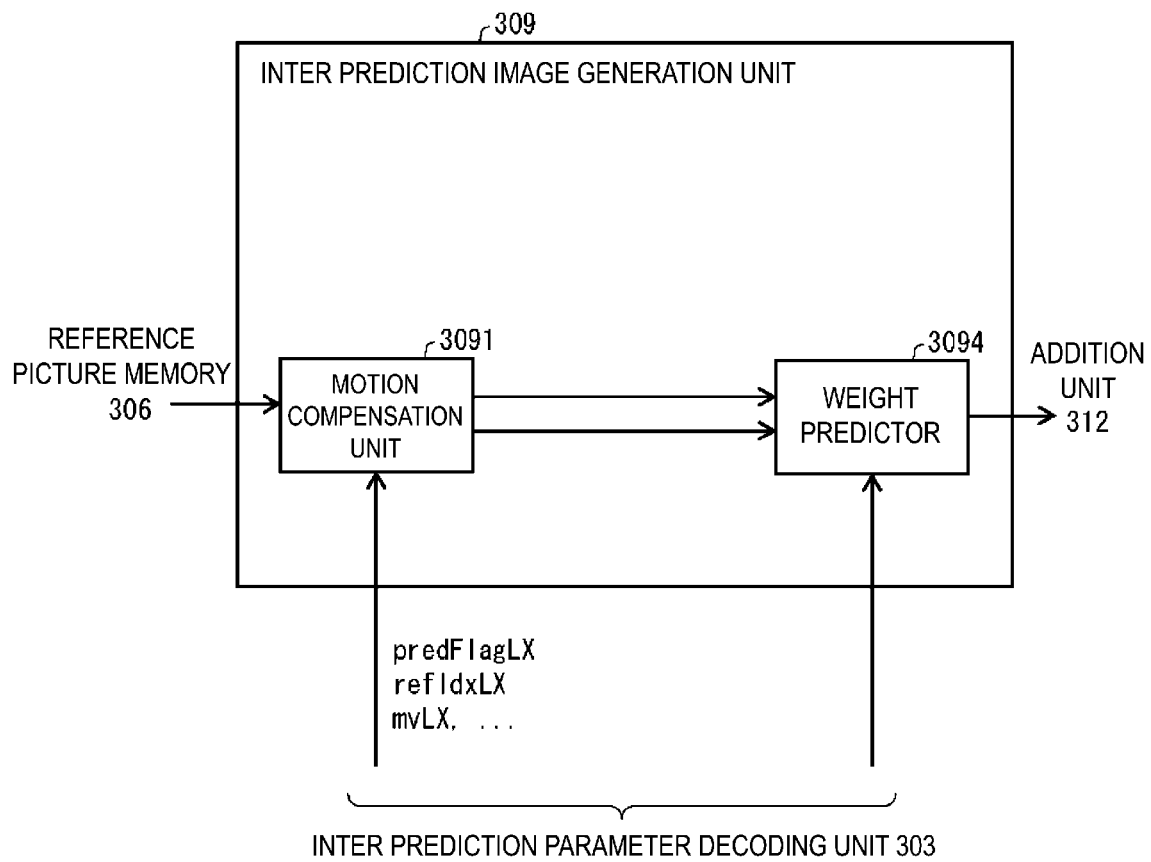
FIG. 10 is a diagram illustrating a configuration of an inter prediction image generation unit according to the present embodiment.

FIG. 10 is a schematic diagram illustrating a configuration of the inter prediction image generation unit 309 included in the prediction image generation unit 308 according to the present embodiment. The inter prediction image generation unit 309 includes a motion compensation unit (prediction image generation device) 3091 and a weighted predictor 3094.

Motion Compensation

Based on the inter prediction parameters (a prediction list use flag predFlagLX, a reference picture index refIdxLX, a motion vector mvLX, an on/off flag, and the like) input from the inter prediction parameter decoding unit 303, the motion compensation unit 3091 reads from the reference picture memory 306 a block located at the position shifted by the motion vector mvLX from the position of the decoding target PU in the reference picture RefX specified by the reference picture index refIdxLX, and thereby generates a compensation image (motion compensation image). Here, in a case that accuracy of the motion vector mvLX is not integer accuracy, a filter, called a motion compensation filter, for generating pixels at fractional positions is applied to generate a motion compensation image.

In a case that the motion vector mvLX or the motion vector mvLXN input to the motion compensation unit 3091 is 1/M-pixel accuracy (M is a natural number of 2 or greater), an interpolation filter is applied to generate a compensation image, based on a pixel value of the reference picture at an integer pixel position. Specifically, a compensation image Pred[ ][ ] described above is generated based on product-sum operation of an NTAP-tap interpolation filter coefficient mcFilter[nFrac][k] (k=0..NTAP−1) corresponding to a phase nFrac and a pixel of the reference picture.

First, the motion compensation unit 3091 derives an integer position (xInt, yInt) and a phase (xFrac, yFrac) corresponding to coordinates (x, y) within the prediction block, according to the following expression:

xInt=xb+(mvLX[0]>>(log 2(M)))+x xFrac=mvLX[0]&(M−1)

yInt=yb+(mvLX[1]>>(log 2(M)))+y yFrac=mvLX[1]&(M−1)　　　(Expression INTER-1)

where (xb, yb) represents upper left coordinates of a block, x=0..nW−1, y=0..nH−1, and M represents accuracy (1/M-pixel accuracy) of the motion vector mvLX.

The motion compensation unit 3091 performs a horizontal interpolation process by using an interpolation filter for a reference picture refImg to derive a temporary image temp[ ][ ]. In the following expression, Σ represents a sum with respect to k for k=0..NTAP−1, shift1 represents a normalization parameter for adjusting a range of a value, and offset1=1<<(shift1−1).

temp[x][y]=(EmcFilter[xFrac][k]*refImg[xInt+k−NTAP/2+1][yInt]+offset1)>>shift1　　(Expression INTER-2)

Note that padding (described later) is performed in a case that a pixel refImg[xInt+k−NTAP/2+1][yInt] on the reference picture is referred to.

Subsequently, the motion compensation unit 3091 performs a vertical interpolation process for the temporary image temp[ ][ ] to derive a compensation image Pred[ ][ ]. In the following expression, Σ represents a sum with respect to k for k=0..NTAP−1, shift2 represents a normalization parameter for adjusting a range of a value, and offset2=1<<(shift2−1).

Pred[x][y]=(EmcFilter[yFrac][k]*temp[x][y+k−NTAP/2+1]+offset2)>>shift2　　(Expression INTER-3)

Note that, in a case of bi-prediction, above Pred[ ][ ] is derived for each of the lists L0 and L1 (respectively referred to as compensation images PredL0[ ][ ] and PredL1 [ ][ ]), and the compensation image Pred[ ][ ] is generated based on the compensation image PredL0[ ][ ] and the compensation image PredL1[ ][ ].

Padding

In (Expression INTER-2) described above, the pixel refImg[xInt+k−NTAP/2+1][yInt] on the reference picture is referred to; however, in a case that an actually non-existent pixel value outside of a picture is referred to, the following picture boundary padding (out-of-picture padding) is performed. The picture boundary padding is implemented by using a pixel value refImg[xRef+i][yRef+j] of the following position xRef+i, yRef+j for the pixel value of a position (xIntL+i, yIntL+j) of the reference pixel.

xRef+i=Clip3(0,pic_width_in_luma_samples−1, xIntL+i)

yRef+j=Clip3(0,pic_height_in_luma_samples−1, yIntL+j)　　　(Expression PAD-1)

Weighted Prediction

The weighted predictor 3094 multiplies the input motion compensation image PredLX by a weighting coefficient, and thereby generates a prediction image of the target block. In a case that one of the prediction list use flags (predFlagL0 or predFlagL1) is 1 (in a case of uni-prediction), and weighted prediction is not used, a process of the following expression for adjusting the input motion compensation image PredLX (LX is L0 or L1) to the number bitDepth of pixel bits is performed.

Pred[x][y]=Clip3(0,(1<<bitDepth)−1,(PredLX[x][y]+offset1)>>shift1)　　(Expression INTER-4)

where shift1=14−bitDepth, and offset1=1<<(shift1−1).

In a case that both of the prediction list use flags (predFlagL0 and predFlagL1) are 1 (in a case of bi-prediction BiPred), and weighted prediction is not used, a process of the following expression for averaging the input motion compensation images PredL0 and PredL1 and adjusting to the number of pixel bits is performed.

Pred[x][y]=Clip3(0,(1<<bitDepth)−1,(PredL0[x][y]+PredL1[x][y]+offset2)>>shift2)　　(Expression INTER-5)

where shift2=15−bitDepth, and offset2=1<<(shift2−1).

Furthermore, in a case of uni-prediction, and that weighted prediction is performed, the weighted predictor 3094 derives a weighted prediction coefficient w0 and an offset o0 from coded data, and performs a process of the following expression:

Pred[x][y]=Clip3(0,(1<<bitDepth)−1, ((PredLX[x][y]*w0+2^(log 2WD−1))>>log 2WD)+o0)　　(Expression INTER-6)

where log 2WD represents a variable indicating a prescribed shift amount.

Furthermore, in a case of bi-prediction BiPred, and that weighted prediction is performed, the weighted predictor 3094 derives weighted prediction coefficients w0, w1, o0, and of from coded data, and performs a process of the following expression:

$$Pred[x][y]=Clip3(0,(1<<bitDepth)-1,$$
$$(PredL0[x][y]*w0+PredLX[x][y]*w1+$$
$$((o0+o1+1)<<\log 2WD))>>(\log 2WD+$$
$$1)) \quad \text{(Expression INTER-7)}$$

Motion Vector Decoding Process

A motion vector decoding process according to the present embodiment will be specifically described below with reference to FIG. 8.

As is apparent from the above description, the motion vector decoding process according to the present embodiment includes a process of decoding syntax elements associated with inter prediction (also referred to as a motion syntax decoding process), and a process of deriving a motion vector (motion vector derivation process).

Motion Syntax Decoding Process

Figure 8:
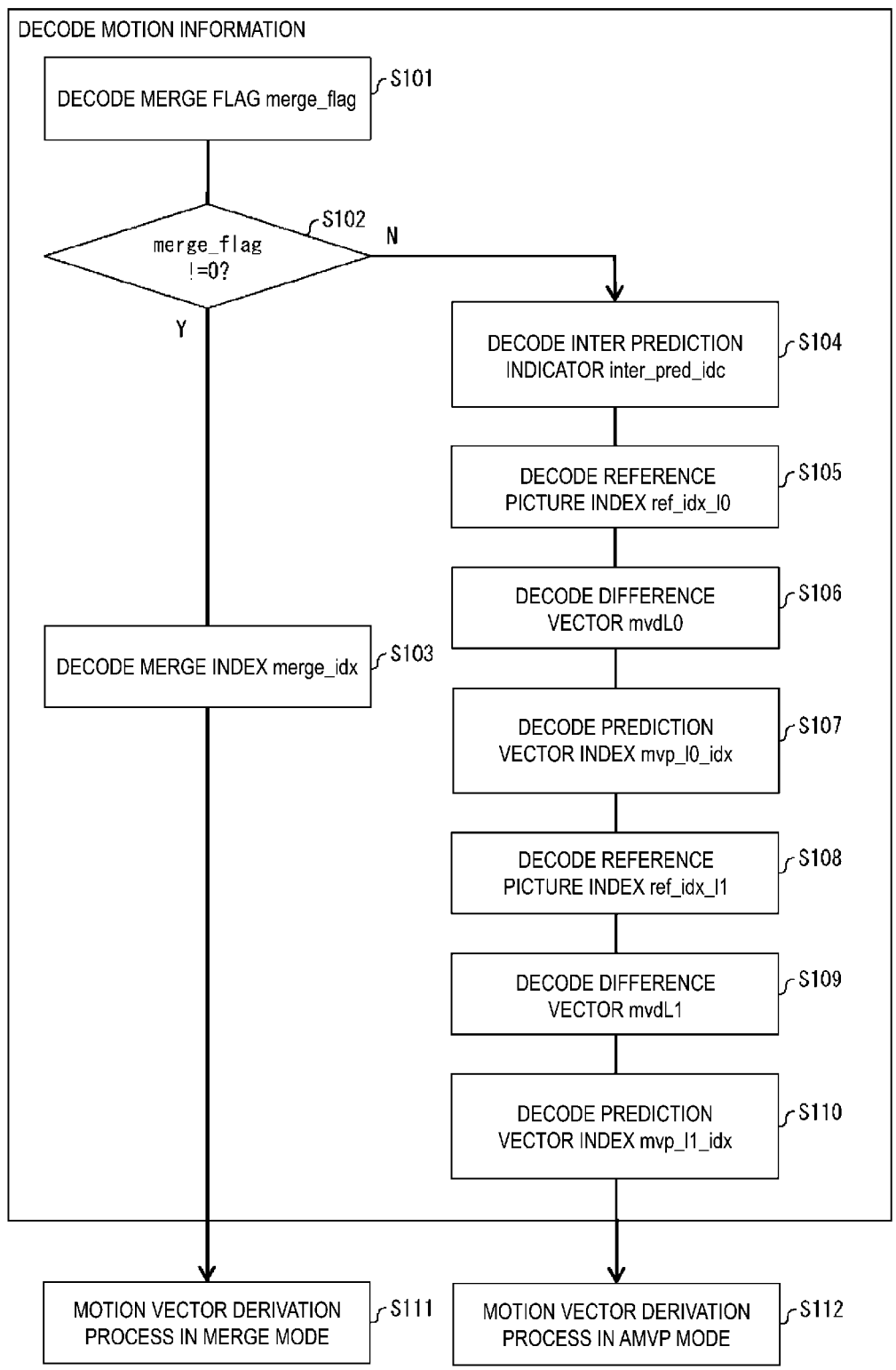
FIG. 8 is a flowchart illustrating operations of a decoding process of motion information according to the present embodiment.

FIG. 8 is a flowchart illustrating a flow of an inter prediction syntax decoding process performed by the inter prediction parameter decoding control unit 3031. In the following description concerning the description of FIG. 8, each process is performed by the inter prediction parameter decoding control unit 3031, unless otherwise specifically noted.

First, in Step S101, a merge flag merge_flag is decoded, and in Step S102, whether or not merge_flag is 0 (merge_flag !=0) is determined.

In a case that merge_flag !=0 is true (Y in S102), in S103, a merge index merge_idx is decoded, and a motion vector derivation process of the merge mode (S111) is performed.

In a case that merge_flag !=0 is false (N in S102), in S104, an inter prediction indicator inter_pred_idc is decoded.

In a case that inter_pred_idc is other than PRED_L1 (PRED_L0 or PRED_BI), a reference picture index ref_idx_l0, a parameter mvdL0 of a difference vector, and a prediction vector index mvp_l0_idx are decoded respectively in S105, S106, and S107.

In a case that inter_pred_idc is other than PRED_L0 (PRED_L1 or PRED_BI), a reference picture index ref_idx_l1, a parameter mvdL1 of a difference vector, and a prediction vector index mvp_l1_idx are decoded respectively in S108, S109, and S110. Subsequently, a motion vector derivation process of the AMVP mode (S112) is performed.

Configuration of Image Encoding Device

Figure 4:
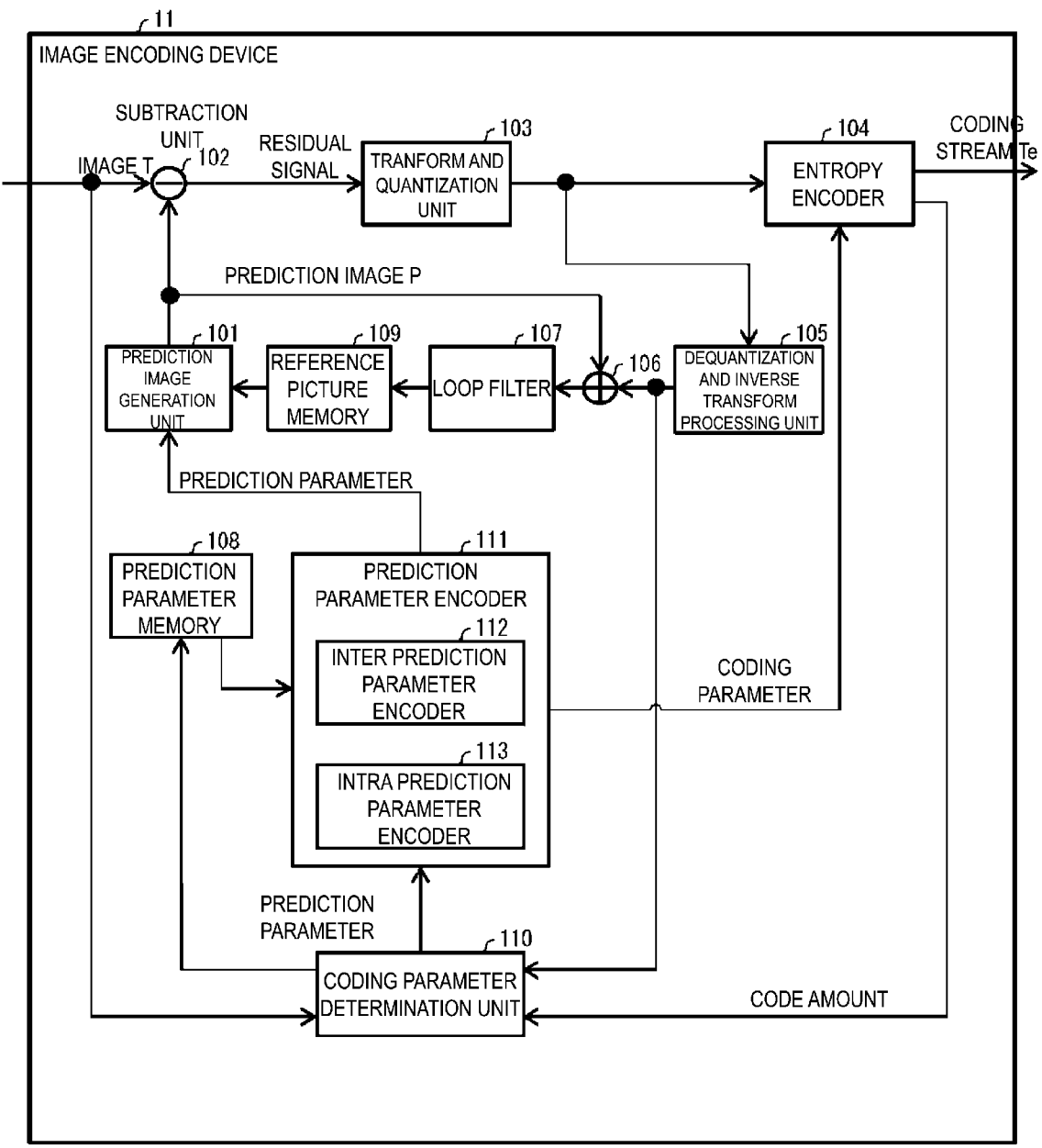
FIG. 4 is block diagram illustrating a configuration of an image encoding device according to the present embodiment.

Next, a configuration of the image encoding device 11 will be described. A configuration of the image encoding device 11 as an example will be described below with reference to FIG. 4. FIG. 4 is a block diagram illustrating the configuration of the image encoding device 11 according to the present embodiment. The image encoding device 11 includes a prediction image generation unit 101, a subtraction unit 102, a transform processing and quantization unit 103, an entropy encoder 104, a dequantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter encoder 111. The prediction parameter encoder 111 includes an inter prediction parameter encoder 112 and an intra prediction parameter encoder 113. Note that the image encoding device 11 may not include the loop filter 107.

For each picture of an image T, the prediction image generation unit 101 generates a prediction image P of a prediction unit PU for each coding unit CU that is a region where the picture is split. Here, the prediction image generation unit 101 reads a block that has been decoded from the reference picture memory 109, based on a prediction parameter input from the prediction parameter encoder 111. For example, in a case of an inter prediction, the prediction parameter input from the prediction parameter encoder 111 is a motion vector. The prediction image generation unit 101 reads a block in a position in a reference picture indicated by a motion vector starting from a target PU. In a case of an intra prediction, the prediction parameter is, for example, an intra prediction mode. The prediction image generation unit 101 reads a pixel value of a neighboring PU used in an intra prediction mode from the reference picture memory 109, and generates the prediction image P of a PU. The prediction image generation unit 101 generates the prediction image P of a PU by using one prediction scheme among multiple prediction schemes for the read reference picture block. The prediction image generation unit 101 outputs the generated prediction image P of the PU to the subtraction unit 102.

Figure 6:
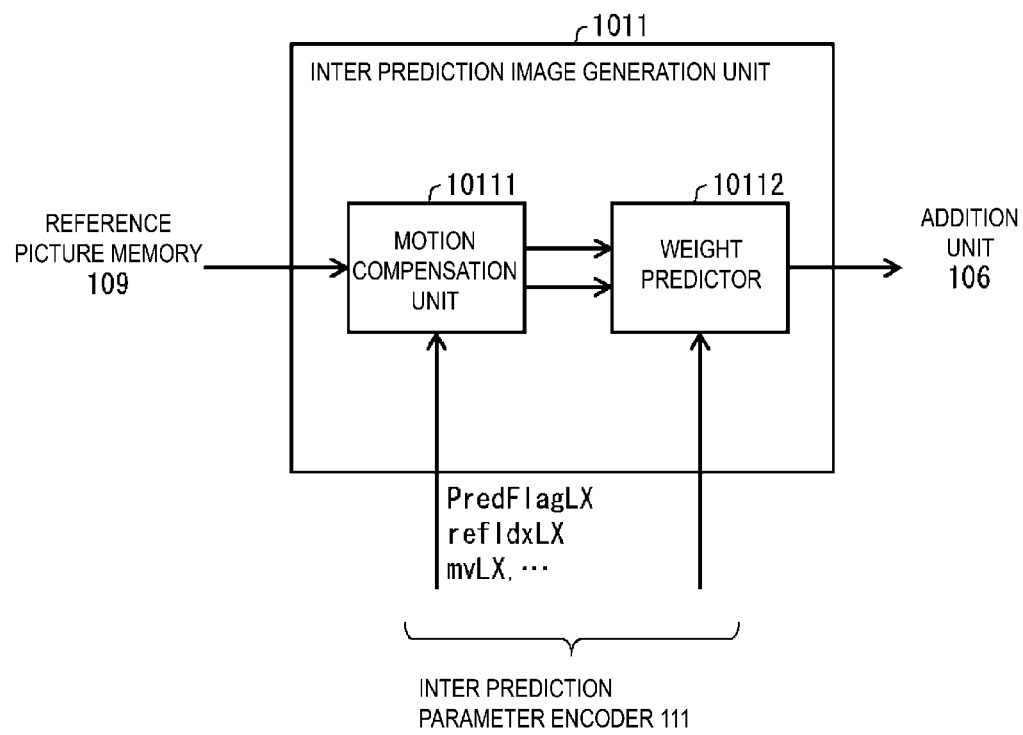
FIG. 6 is a diagram illustrating a configuration of an inter prediction image generation unit according to the present embodiment.

Note that the prediction image generation unit 101 is an operation the same as the prediction image generation unit 308 already described. For example, FIG. 6 is a schematic diagram illustrating a configuration of an inter prediction image generation unit 1011 included in the prediction image generation unit 101. The inter prediction image generation unit 1011 includes a motion compensation unit 10111 and a weight predictor 10112. Descriptions about the motion compensation unit 10111 and the weight predictor 10112 are omitted since the motion compensation unit 10111 and the weight predictor 10112 have configurations similar to those of the above-mentioned motion compensation unit 3091 and weight predictor 3094, respectively.

The prediction image generation unit 101 generates the prediction image P of a PU, based on a pixel value of a reference block read from the reference picture memory, by using a parameter input by the prediction parameter encoder. The prediction image generated by the prediction image generation unit 101 is output to the subtraction unit 102 and the addition unit 106.

The intra prediction image generation unit (not illustrated) included in the prediction image generation unit 101 performs the same operation as the operation of the intra prediction image generation unit 310 described above.

The subtraction unit 102 subtracts a signal value of the prediction image P of a PU input from the prediction image generation unit 101 from a pixel value of a corresponding PU position of the image T, and generates a residual signal. The subtraction unit 102 outputs the generated residual signal to the transform processing and quantization unit 103.

The transform processing and quantization unit 103 performs a frequency transform for the prediction residual signal input from the subtraction unit 102, and calculates transform coefficients. The transform processing and quantization unit 103 quantizes the calculated transform coefficients to calculate quantization transform coefficients. The transform processing and quantization unit 103 outputs the calculated quantization transform coefficients to the entropy encoder 104 and the dequantization and inverse transform processing unit 105.

To the entropy encoder 104, quantization transform coefficients are input from the transform processing and quantization unit 103, and prediction parameters are input from the prediction parameter encoder 111. For example, input prediction parameters include codes such as a reference picture index ref_idx_lX, a prediction vector index mvp_lX_idx, a difference vector mvdLX, a prediction mode pred_mode_flag, and a merge index merge_idx.

The entropy encoder 104 performs entropy coding on the input split information, prediction parameters, quantization transform coefficients, and the like to generate the coding stream Te, and outputs the generated coding stream Te to the outside.

The dequantization and inverse transform processing unit 105 is the same as the dequantization and inverse transform processing unit 311 (FIG. 5) of the image decoding device 31, and inversely quantizes the quantization transform coefficients input from the transform processing and quantization unit 103 to calculate transform coefficients. The dequantization and inverse transform processing unit 105 performs inverse transform on the calculated transform coefficient to calculate residual signals. The dequantization and inverse transform processing unit 105 outputs the calculated residual signals to the addition unit 106.

The addition unit 106 adds signal values of the prediction image P of the PUs input from the prediction image generation unit 101 and signal values of the residual signals input from the dequantization and inverse transform processing unit 105 for each pixel, and generates the decoded image. The addition unit 106 stores the generated decoded image in the reference picture memory 109.

The loop filter 107 performs a deblocking filter 114, a sample adaptive offset (SAO) 115, and an adaptive loop filter (ALF) 116 to the decoded image generated by the addition unit 106. Note that the loop filter 107 need not necessarily include the above three types of filters, and may include only the deblocking filter 114, for example.

The prediction parameter memory 108 stores the prediction parameters generated by the coding parameter determination unit 110 for each picture and CU of the coding target in a prescribed position.

The reference picture memory 109 stores the decoded image generated by the loop filter 107 for each picture and CU of the coding target in a prescribed position.

The coding parameter determination unit 110 selects one set among multiple sets of coding parameters. A coding parameter is the above-mentioned QT or BT split parameter or prediction parameter, or a parameter to be a target of coding generated in association with these parameters. The prediction image generation unit 101 generates the prediction image P of the PUs by using each of the sets of these coding parameters.

The coding parameter determination unit 110 calculates RD cost values indicating a volume of an information quantity and coding errors for each of the multiple sets. For example, an RD cost value is a sum of a code amount and a value of multiplying a coefficient λ by a square error. The code amount is an information quantity of the coding stream Te obtained by performing entropy coding on a quantization residual and a coding parameter. The square error is a sum of pixels for square values of residual values of residual signals calculated in the subtraction unit 102. The coefficient λ is a real number that is larger than a pre-configured zero. The coding parameter determination unit 110 selects a set of coding parameters by which the calculated RD cost value is minimized. With this configuration, the entropy encoder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter encoder 111 derives a format for coding from parameters input from the coding parameter determination unit 110, and outputs the format to the entropy encoder 104. A derivation of a format for coding is, for example, to derive a difference vector from a motion vector and a prediction vector. The prediction parameter encoder 111 derives parameters necessary to generate a prediction image from parameters input from the coding parameter determination unit 110, and outputs the parameters to the prediction image generation unit 101. For example, parameters necessary to generate a prediction image are a motion vector of a sub-block unit.

The inter prediction parameter encoder 112 derives inter prediction parameters such as a difference vector, based on prediction parameters input from the coding parameter determination unit 110. The inter prediction parameter encoder 112 includes a partly identical configuration to a configuration by which the inter prediction parameter decoding unit 303 derives inter prediction parameters, as a configuration to derive parameters necessary for generation of a prediction image output to the prediction image generation unit 101. A configuration of the inter prediction parameter encoder 112 will be described later.

The intra prediction parameter encoder 113 includes a partly identical configuration to a configuration by which the intra prediction parameter decoding unit 304 derives intra prediction parameters, as a configuration to derive prediction parameters necessary for generation of a prediction image output to the prediction image generation unit 101.

The intra prediction parameter encoder 113 derives a format for coding (for example, MPM_idx, rem_intra_luma_pred_mode, and the like) from the intra prediction mode IntraPredMode input from the coding parameter determination unit 110.

Configuration of Inter Prediction Parameter Encoder

Figure 9:
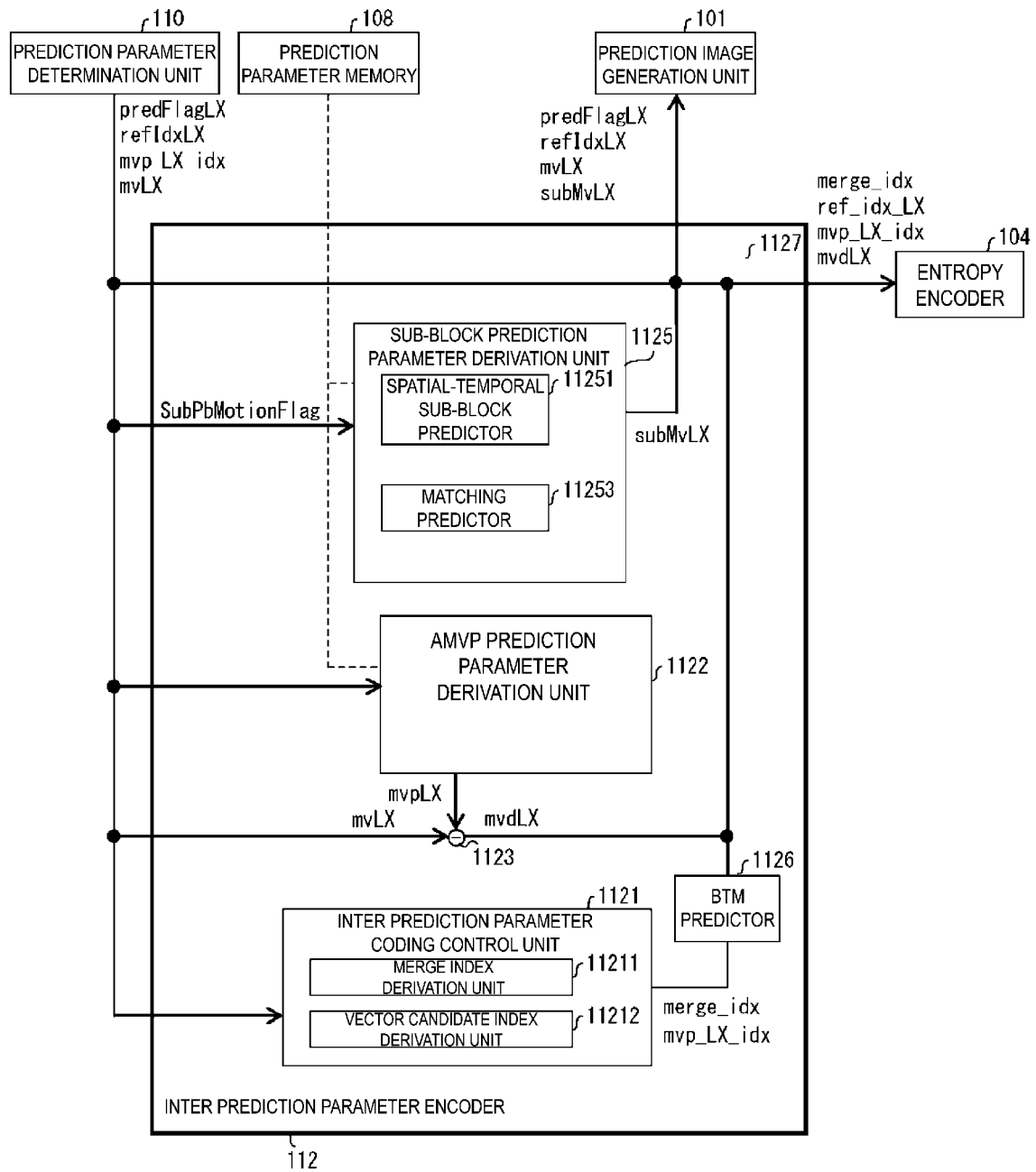
FIG. 9 is a schematic diagram illustrating a configuration of an inter prediction parameter encoder according to the present embodiment.

Next, a configuration of the inter prediction parameter encoder 112 will be described. The inter prediction parameter encoder 112 is a unit corresponding to the inter prediction parameter decoding unit 303 of FIG. 11, and its configuration is illustrated in FIG. 9.

The inter prediction parameter encoder 112 includes an inter prediction parameter coding control unit 1121, an AMVP prediction parameter derivation unit 1122, a subtraction unit 1123, a sub-block prediction parameter derivation unit 1125, and a BTM predictor 1126. Although not illustrated, the inter prediction parameter encoder 112 further includes a split mode derivation unit, a merge flag derivation unit, an inter prediction indicator derivation unit, a reference picture index derivation unit, and a vector difference derivation unit, for example. The split mode derivation unit, the merge flag derivation unit, the inter prediction indicator derivation unit, the reference picture index derivation unit, and the vector difference derivation unit derive the PU split mode part_mode, the merge flag merge_flag, the inter prediction indicator inter_pred_idc, the reference picture index refIdxLX, and the difference vector mvdLX, respectively. The inter prediction parameter encoder 112 outputs, to the prediction image generation unit 101, the motion vectors (mvLX, subMvLX) and the reference picture index refIdxLX, the PU split mode part_mode, the inter prediction indicator inter_pred_idc, or information indicating these. The inter prediction parameter encoder 112 outputs, to the entropy encoder 104, the PU split mode part_mode, the merge flag merge_flag, the merge index merge_idx, the inter prediction indicator inter_pred_idc, the reference picture index refIdxLX, the prediction vector index mvp_lX_idx, the difference vector mvdLX, and the sub-block prediction mode flag subPbMotionFlag.

The inter prediction parameter coding control unit 1121 includes a merge index derivation unit 11211 and a vector candidate index derivation unit 11212. The merge index derivation unit 11211 compares a motion vector and a reference picture index input from the coding parameter determination unit 110 with motion vectors and reference picture indexes of PUs of merge candidates read from the prediction parameter memory 108, respectively, and thereby derives a merge index merge_idx and outputs the derived merge index merge_idx to the entropy encoder 104. The merge candidates are reference PUs (for example, reference PUs touching a lower left end, an upper left end, and an upper right end of a coding target block) that are located within a predetermined range with respect to a coding target CU to be coded, and are PUs that have been subjected to a coding process. The vector candidate index derivation unit 11212 derives the prediction vector index mvp_lX_idx.

In a case that the coding parameter determination unit 110 determines to use the sub-block prediction mode, the sub-block prediction parameter derivation unit 1125 derives a motion vector and a reference picture index for sub-block prediction of any one of spatial sub-block prediction, temporal sub-block prediction, and matching motion derivation, in accordance with the value of subPbMotionFlag. As described in the description for the image decoding device 31, the motion vector and the reference picture index are derived by reading a motion vector and a reference picture index of a neighboring PU, a reference picture block, and the like from the prediction parameter memory 108. The sub-block prediction parameter derivation unit 1125, as well as a spatial-temporal sub-block predictor 11251, and a matching predictor 11253 included in the sub-block prediction parameter derivation unit 1125, have configurations similar to the configurations of the sub-block prediction parameter derivation unit 3037 of the inter prediction parameter decoding unit 303, as well as the spatial-temporal sub-block predictor 30371, and the matching predictor 30373 included in the sub-block prediction parameter derivation unit 3037, respectively.

The AMVP prediction parameter derivation unit 1122 has a configuration similar to the configuration of the above-described AMVP prediction parameter derivation unit 3032 (see FIG. 11).

Specifically, in a case that the prediction mode predMode indicates the inter prediction mode, the motion vector mvLX is input to the AMVP prediction parameter derivation unit 1122 from the coding parameter determination unit 110. Based on the input motion vector mvLX, the AMVP prediction parameter derivation unit 1122 derives a prediction vector mvpLX. The AMVP prediction parameter derivation unit 1122 outputs the derived prediction vector mvpLX to the subtraction unit 1123. Note that the reference picture index refIdxLX and the prediction vector index mvp_lX_idx are output to the entropy encoder 104.

The subtraction unit 1123 subtracts the prediction vector mvpLX input from the AMVP prediction parameter derivation unit 1122 from the motion vector mvLX input from the coding parameter determination unit 110, and thereby generates a difference vector mvdLX. The difference vector mvdLX is output to the entropy encoder 104.

An image decoding device according to an aspect of the present invention includes, in an LM prediction for predicting a pixel value of chrominance, based on a pixel value of luminance: a decoder configured to decode an index of a filter for down-sampling a luminance image; a selection unit configured to select a he filter for down-sampling by using the index; a down-sampling unit configured to downsample a luminance decoded image of a target block and a luminance decoded image adjacent to the target block by using the filter; a derivation unit configured to derive a linear prediction parameter used for a linear prediction from a luminance decoded image resulting from down-sampling adjacent to the target block and a chrominance decoded image adjacent to the target block; and a generation unit configured to generate a chrominance prediction image by using the linear prediction parameter from a luminance decoded image resulting from down-sampling of the target block, wherein the decoder decodes the index of the filter included in a sequence parameter set or a picture parameter set of coded data.

In an image decoding device according to an aspect of the present invention, the decoder decodes a plurality of the indexes of the filters included in the sequence parameter set or the picture parameter set of coded data, and decodes information indicating a filter index to be used in the target block in the coded data in a block unit.

In an image decoding device according to an aspect of the present invention, the decoder decodes a plurality of the indexes of the filters included in the sequence parameter set or the picture parameter set of the coded data, decodes the number of down-sampling filter candidates to be used in blocks in a slice, and indexes the number of which corresponds to the number of down-sampling filter candidates in a slice header of the coded data, and decodes information indicating a filter index to be used in the target block from the coded data in a block unit.

An image encoding device includes, in an LM prediction for predicting a pixel value of chrominance, based on a pixel value of luminance: an encoder configured to code an index of a filter for down-sampling a luminance image; a selection unit configured to select a filter for down-sampling by using the index; a down-sampling unit configured to downsample a luminance decoded image of a target block and a luminance decoded image adjacent to the target block by using the filter; a derivation unit configured to derive a linear prediction parameter used for a linear prediction from a luminance decoded image resulting from down-sampling adjacent to the target block and a chrominance decoded image adjacent to the target block; and a generation unit configured to generate a chrominance prediction image by using the linear prediction parameter from a luminance decoded image resulting from down-sampling of the target block, wherein the encoder codes the index of the filter in a sequence parameter set or a picture parameter set of coded data.

In an image encoding device according to an aspect of the present invention, the encoder codes a plurality of the indexes of the filters in the sequence parameter set or the picture parameter set of the coded data, and codes information indicating a filter index to be used in the target block in a block unit.

In an image encoding device according to an aspect of the present invention, the encoder codes a plurality of the indexes of the filters in the sequence parameter set or the picture parameter set of the coded data, codes the number of down-sampling filter candidates to be used in blocks in a slice and the indexes the number of which corresponds to the number of down-sampling filter candidates in a slice header of the coded data, and codes information indicating a filter index to be used in the target block in a block unit.

In an image decoding device or an image encoding device according to an aspect of the present invention, in the down-sampling unit, luminance pixel values as a target of down-sampling are multiplied by filter coefficients, and after adding the all multiplication results, the addition result is right shifted with a prescribed shifted value to calculate a down-sampled luminance pixel value, wherein the shifted value is configured to be a common value in all filters, and the coefficients of the filters are scaled to be common in shifted values.

In an image decoding device or an image encoding device according to an aspect of the present invention, in the down-sampling unit, luminance pixel values as a target of down-sampling are multiplied by filter coefficients, and the all multiplication results are added to calculate a down-sampled luminance pixel value, wherein the derivation unit derives a linear prediction parameter by multiplying down-sampled luminance pixel values by linear prediction parameter candidates, and after adding all the luminance pixel values of the target, right shifting the multiplication result with a prescribed shifted value.

An image decoding device or an image encoding device according to an aspect of the present invention is an LM predictor including, in an LM prediction for predicting a pixel value of chrominance, based on a pixel value of luminance: a first set unit configured to set a luminance decoded image of a target block as a template; a motion search unit configured to search for a block (reference block) similar to the template in a decoded region (search region) of a target picture, and derive a motion vector indicating a difference between positions of the target block and the reference block; a chrominance vector calculation unit configured to calculate a motion vector of chrominance from the motion vector; and a second set unit configured to set a chrominance decoded image at a position shifted by the motion vector of chrominance from an upper left coordinate of chrominance of the target block as a chrominance prediction image of the target block.

An image decoding device or an image encoding device according to an aspect of the present invention is an LM predictor including: in an LM prediction for predicting a pixel value of chrominance, based on a luminance pixel value, an extraction unit configured to extract, from a luminance image, a pixel value to be input to a median filter; a derivation unit configured to derive a linear prediction parameter used for linear prediction, from a median filter for calculating a median value from the extracted pixel value, and a luminance decoded image after a median filter of a region adjacent to a target block and a chrominance decoded image adjacent to the target block; and a generation unit configured to generate a chrominance prediction image by using the linear prediction parameter from a luminance decoded image after a median filter of the target block.

An image decoding device or an image encoding device according to an aspect of the present invention includes an LM predictor including: in an LM prediction for predicting a pixel value of chrominance, based on a pixel value of luminance, an encoder or the decoder configured to code or decode an intra prediction mode; a selection unit configured to select a filter for down-sampling by using the index; a down-sampling unit configured to downsample a luminance decoded image of a target block and a luminance decoded image adjacent to the target block by using the filter; a derivation unit configured to derive a linear prediction parameter used for a linear prediction, from a luminance decoded image resulting from down-sampling adjacent to the target block and a chrominance decoded image adjacent to the target block; and a generation unit configured to generate a chrominance prediction image by using the linear prediction parameter from a luminance decoded image resulting from down-sampling of the target block, wherein the LM predictor derives, from the intra prediction mode, information indicating whether the LM prediction or not, and further derives information indicating the number of down-sampling filters and linear models in a case of LM prediction.

An image decoding device or an image encoding device according to an aspect of the present invention includes: a first selector configured to select an initial vector of a target block from a motion vector of a block adjacent to the target block in spatial-temporal direction; a first deriver configured to search a local region (search_range) around the initial vector of the target block, search for a vector having a minimum matching cost, and derive a motion vector of the target block; a second selector configured to select an initial vector of a target sub-block from the motion vector of the target block, and a motion vector of a block adjacent to a target sub-block in the spatial-temporal direction; a second deriver configured to search a local region (search range) around the initial vector of the target sub-block, search for a vector having a minimum matching cost; and d a motion vector of the target sub-block, wherein the first and second derivers configure the local region depending on at least either the size of the target block or target sub-block, or the size of the image.

In an image decoding device or an image encoding device according to an aspect of the present invention, the matching predictor configures a local region larger in a case that a size of a target block or a target sub-block is large and configures a local region smaller in a case that a size of a target block or a target sub-block is small.

Implementation Examples by Software

Note that, part of the image encoding device 11 and the image decoding device 31 in the above-mentioned embodiments, for example, the entropy decoding unit 301, the prediction parameter decoding unit 302, the loop filter 305, the prediction image generation unit 308, the dequantization and inverse transform processing unit 311, the addition unit 312, the prediction image generation unit 101, the subtraction unit 102, the transform processing and quantization unit 103, the entropy encoder 104, the dequantization and inverse transform processing unit 105, the loop filter 107, the coding parameter determination unit 110, and the prediction parameter encoder 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image encoding device 11 or the image decoding device 31, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image encoding device 11 and the image decoding device 31 in the embodiments described above may be realized as an integrated circuit such as a Large Scale Integration (LSI). Each function block of the image encoding device 11 and the image decoding device 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiments of the present invention have been described in detail above referring to the drawings, but the specific configuration is not limited to the above embodiments and various amendments can be made to a design that falls within the scope that does not depart from the gist of the present invention.

APPLICATION EXAMPLES

The above-mentioned image encoding device 11 and the image decoding device 31 can be utilized being installed to various devices performing transmission, reception, recording, and regeneration of videos. Note that, videos may be natural videos imaged by cameras or the like, or may be artificial videos (including CG and GUI) generated by computers or the like.

At first, referring to FIG. 27, it will be described that the above-mentioned image encoding device 11 and the image decoding device 31 can be utilized for transmission and reception of videos.

Figure 27:
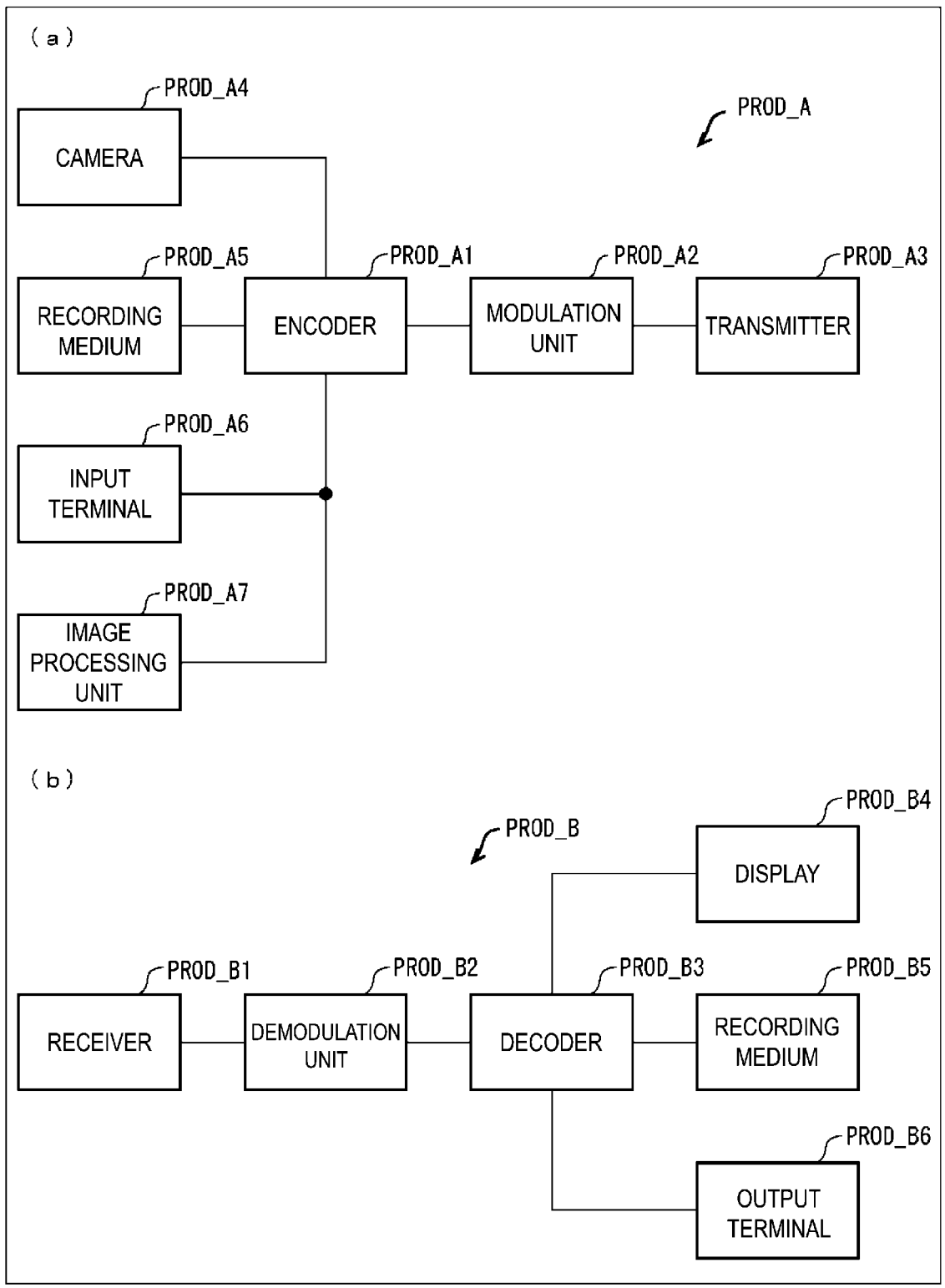
FIG. 27 is a diagram illustrating configurations of a transmission device equipped with the image encoding device and a reception device equipped with the image decoding device according to the present embodiment. (a) illustrates the transmission device equipped with the image encoding device, and (b) illustrates the reception device equipped with the image decoding device.

(a) of FIG. 27 is a block diagram illustrating a configuration of a transmission device PROD_A installed with the image encoding device 11. As illustrated in (a) of FIG. 27, the transmission device PROD_A includes an encoder PROD_A1 which obtains coded data by coding videos, a modulation unit PROD_A2 which obtains modulated signals by modulating carrier waves with the coded data obtained by the encoder PROD_A1, and a transmitter PROD_A3 which transmits the modulated signals obtained by the modulation unit PROD_A2. The above-mentioned image encoding device 11 is utilized as the encoder PROD_A1.

The transmission device PROD_A may further include a camera PROD_A4 imaging videos, a recording medium PROD_A5 recording videos, an input terminal PROD_A6 to input videos from the outside, and an image processing unit PRED_A7 which generates or processes images, as sources of supply of the videos input into the encoder PROD_A1. In (a) of FIG. 27, although the configuration that the transmission device PROD_A includes these all is exemplified, a part may be omitted.

Note that the recording medium PROD_A5 may record videos which are not coded, or may record videos coded in a coding scheme for recording different from a coding scheme for transmission. In the latter case, a decoder (not illustrated) to decode coded data read from the recording medium PROD_A5 according to coding scheme for recording may be interleaved between the recording medium PROD_A5 and the encoder PROD_A1.

(b) of FIG. 27 is a block diagram illustrating a configuration of a reception device PROD_B installed with the image decoding device 31. As illustrated in (b) of FIG. 27, the reception device PROD_B includes a receiver PROD_B1 which receives modulated signals, a demodulation unit PROD_B2 which obtains coded data by demodulating the modulated signals received by the receiver PROD_B1, and a decoder PROD_B3 which obtains videos by decoding the coded data obtained by the demodulation unit PROD_B2. The above-mentioned image decoding device 31 is utilized as the decoder PROD_B3.

The reception device PROD_B may further include a display PROD_B4 displaying videos, a recording medium PROD_B5 to record the videos, and an output terminal PROD_B6 to output videos outside, as supply destination of the videos output by the decoder PROD_B3. In (b) of FIG. 27, although the configuration that the reception device PROD_B includes these all is exemplified, a part may be omitted.

Note that the recording medium PROD_B5 may record videos which are not coded, or may record videos which are coded in a coding scheme for recording different from a coding scheme for transmission. In the latter case, an encoder (not illustrated) to code videos acquired from the decoder PROD_B3 according to a coding scheme for recording may be interleaved between the decoder PROD_B3 and the recording medium PROD_B5.

Note that the transmission medium transmitting modulated signals may be wireless or may be wired. The transmission aspect to transmit modulated signals may be broadcasting (here, referred to as the transmission aspect where the transmission target is not specified beforehand) or may be telecommunication (here, referred to as the transmission aspect that the transmission target is specified beforehand). Thus, the transmission of the modulated signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of the transmission device PROD_A/reception device PROD_B transmitting and/or receiving modulated signals in radio broadcasting. Broadcasting stations (broadcasting equipment, and the like)/receiving stations (television receivers, and the like) of cable television broadcasting are an example of the transmission device PROD_A/reception device PROD_B transmitting and/or receiving modulated signals in cable broadcasting.

Servers (work stations, and the like)/clients (television receivers, personal computers, smartphones, and the like) for Video On Demand (VOD) services, video hosting services using the Internet and the like are an example of transmission device PROD_A/reception device PROD_B transmitting and/or receiving modulated signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multifunctional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmission device PROD_A and the reception device PROD_B.

Next, referring to FIG. 28, it will be described that the above-mentioned image encoding device 11 and the image decoding device 31 can be utilized for recording and regeneration of videos.

Figure 28:
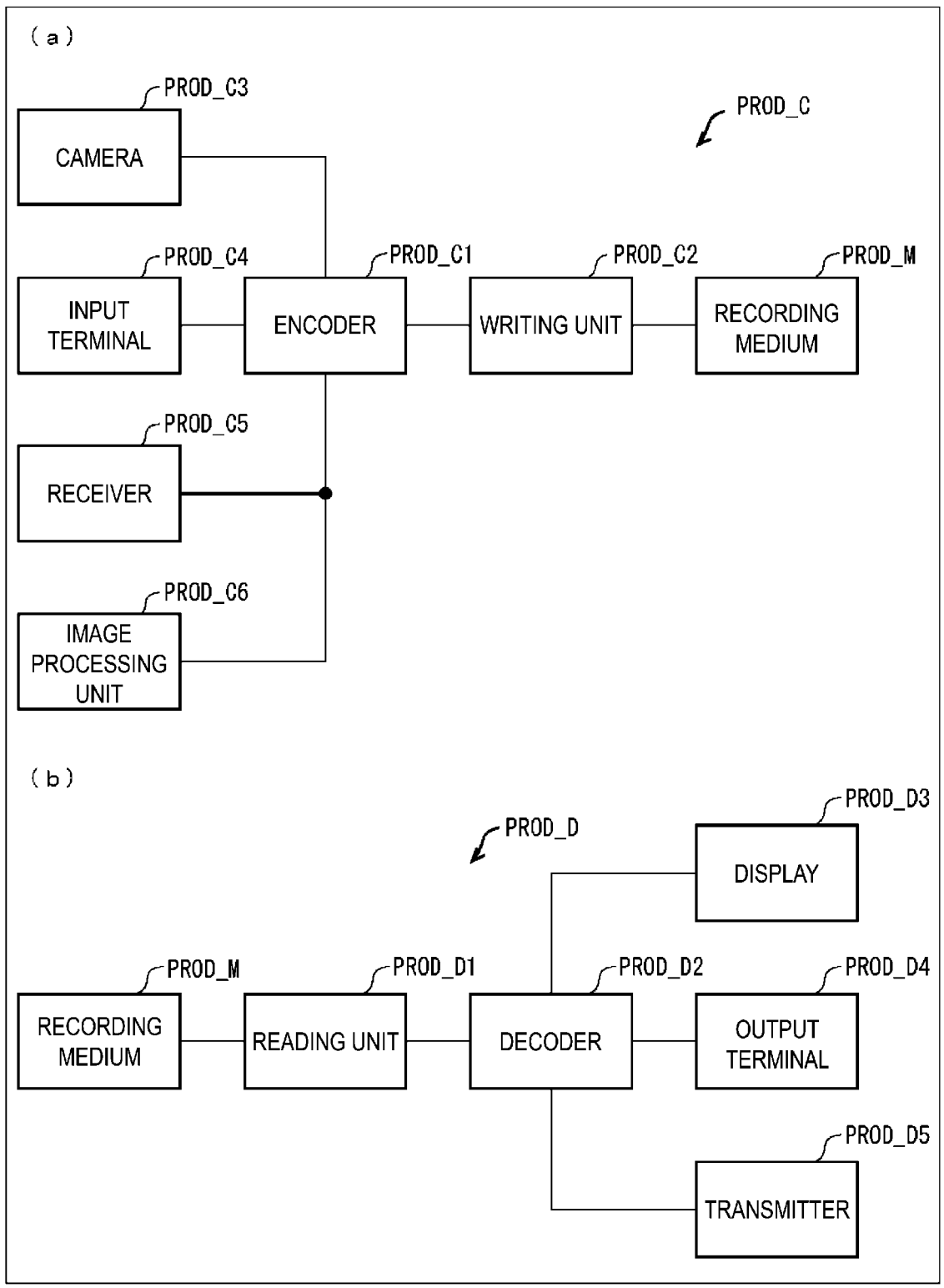
FIG. 28 is a diagram illustrating configurations of a recording device equipped with the image encoding device and a regeneration device equipped with the image decoding device according to the present embodiment. (a) illustrates the recording device equipped with the image encoding device, and (b) illustrates the regeneration device equipped with the image decoding device.

(a) of FIG. 28 is a block diagram illustrating a configuration of a recording device PROD_C installed with the above-mentioned image encoding device 11. As illustrated in (a) of FIG. 28, the recording device PROD_C includes an encoder PROD_C1 which obtains coded data by coding a video, and a writing unit PROD_C2 which writes the coded data obtained by the encoder PROD_C1 in a recording medium PROD_M. The above-mentioned image encoding device 11 is utilized as the encoder PROD_C1.

Note that the recording medium PROD_M may be (1) a type built in the recording device PROD_C such as Hard Disk Drive (HDD) or Solid State Drive (SSD), may be (2) a type connected to the recording device PROD_C such as an SD memory card or a Universal Serial Bus (USB) flash memory, and may be (3) a type loaded in a drive device (not illustrated) built in the recording device PROD_C such as Digital Versatile Disc (DVD) or Blu-ray (trademark) Disc (BD).

The recording device PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the encoder PROD_C1. In (a) of FIG. 28, although the configuration that the recording device PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoder (not illustrated) for transmission to decode coded data coded in a coding scheme for transmission may be interleaved between the receiver PROD_C5 and the encoder PROD_C1.

Examples of such recording device PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording device PROD_C.

(b) of FIG. 28 is a block illustrating a configuration of a regeneration device PROD_D installed with the above-mentioned image decoding device 31. As illustrated in (b) of FIG. 28, the regeneration device PROD_D includes a reading unit PROD_D1 which reads coded data written in the recording medium PROD_M, and a decoder PROD_D2 which obtains a video by decoding the coded data read by the reading unit PROD_D1. The above-mentioned image decoding device 31 is utilized as the decoder PROD_D2.

Note that the recording medium PROD_M may be (1) a type built in the regeneration device PROD_D such as HDD or SSD, may be (2) a type connected to the regeneration device PROD_D such as an SD memory card or a USB flash memory, and may be (3) a type loaded in a drive device (not illustrated) built in the regeneration device PROD_D such as DVD or BD.

The regeneration device PROD_D may further include a display PROD_D3 displaying a video, an output terminal PROD_D4 to output the video to the outside, and a transmitter PROD_D5 which transmits the video, as the supply destination of the video output by the decoder PROD_D2. In (b) of FIG. 28, although the configuration that the regeneration device PROD_D includes these all is exemplified, a part may be omitted.

Note that the transmitter PROD_D5 may transmit a video which is not coded, or may transmit coded data coded in a coding scheme for transmission different from a coding scheme for recording. In the latter case, an encoder (not illustrated) to code a video in a coding scheme for transmission may be interleaved between the decoder PROD_D2 and the transmitter PROD_D5.

Examples of such regeneration device PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such regeneration device PROD_D.

Realization as Hardware and Realization as Software

Each block of the above-mentioned image decoding device 31 and the image encoding device 11 may be realized as a hardware by a logical circuit formed on an integrated circuit (IC chip), or may be realized as a software using a Central Processing Unit (CPU).

In the latter case, each device includes a CPU performing a command of a program to implement each function, a Read Only Memory (ROM) stored in the program, a Random Access Memory (RAM) developing the program, and a storage device (recording medium) such as a memory storing the program and various data, and the like. The purpose of the embodiments of the present invention can be achieved by supplying, to each of the devices, the recording medium recording in a computer-readable manner the program code (execution form program, intermediate code program, source program) of the control program of each of the devices which is software implementing the above-mentioned functions, and a computer (or a CPU or a MPU) reading and performing the program code recorded in the recording medium.

For example, as the recording medium, a tape such as a magnetic tape or a cassette tape, a disc including a magnetic disc such as a floppy (trademark) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray (trademark) Disc, a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trademark)/a flash ROM, or a Logical circuits such as a Programmable logic device (PLD) or a Field Programmable Gate Array (FPGA) can be used.

Each of the devices is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trademark), IEEE 802.11 radio communication, High Data Rate (HDR), Near Field Communication (NFC), Digital Living Network Alliance (trademark) (DLNA), a cellular telephone network, a satellite channel, a terrestrial digital broadcast network are available. Note that the embodiments of the present invention can be also realized in the form of computer data signals embedded in a carrier wave where the program code is embodied by electronic transmission.

The embodiments of the present invention are not limited to the above-described embodiments. It is possible to make various modifications within the scope of the claims. In other words, an embodiment obtained by combining technical elements appropriately modified within the scope of the claims falls also within the technical scope of the present invention.

INDUSTRIAL APPLICABILITY

The embodiments of the present invention can be preferably applied to an image decoding device to decode coded data where image data is coded, and an image encoding device to generate coded data where image data is coded. The embodiments of the present invention can be preferably applied to a data structure of coded data generated by the image encoding device and referred to by the image decoding device.

CROSS-REFERENCE OF RELATED APPLICATION

This application claims the benefit of priority to JP 2017-176817 filed on Sep. 14, 2017, which is incorporated herein by reference in its entirety.

REFERENCE SIGNS LIST

41 Image display device
31 Image decoding device
11 Image encoding device

What is claimed is:

1. A decoding device for generating a prediction image of chrominance by using a luminance image, the decoding device comprising:
  decoding circuitry that decodes information related to a down-sampling in a sequence parameter set, the information indicating one of a plurality of position relationships between at least one luma pixel and a chroma pixel; and
  a predictor that derives (i) a down-sampled luminance image by down-sampling the luminance image of a target block, (ii) a down-sampled neighboring luminance image by down-sampling a neighboring luminance image, (iii) a neighboring chrominance image and (iv) parameters from the down-sampled neighboring luminance image and the neighboring chrominance image, wherein:
    each of the down-sampled luminance image and the down-sampled neighboring luminance image is derived based on the information,
    the plurality of position relationships indicates that a position of the chroma pixel is identical to a position of one of the at least one luma pixel and that the position of the chroma pixel is located in an intermediate of two of the at least one luma pixel on a left side of a 2×2 luma pixel block, and
    the prediction image is derived by using the down-sampled luminance image and the parameters.

2. The decoding device of claim 1, wherein the down-sampled neighboring luminance image is further derived based on at least two of (i) the luminance image with a target pixel, (ii) the luminance image with a first neighboring pixel, which is located in a horizontal direction with respect to the target pixel, (iii) the luminance image with a second neighboring pixel, which is located in a vertical direction with respect to the target pixel or (iv) the luminance image with a third neighboring pixel that is located in a diagonal direction with respect to the target pixel.

3. The decoding device of claim 2, wherein the down-sampled neighboring luminance image is further derived based on each of (i) the luminance image with the target pixel and (ii) the luminance image with the first neighboring pixel, which is located in the horizontal direction with respect to the target pixel when the information indicates that the position of the chroma pixel is identical to the position of the one of the at least one luma pixel.

4. The decoding device of claim 2, wherein the down-sampled neighboring luminance image is further derived based on each of (i) the luminance image with the target pixel, (ii) the luminance image with the first neighboring pixel, which is located in the horizontal direction with respect to the target pixel, (iii) the luminance image with the second neighboring pixel, which is located in the vertical direction with respect to the target pixel and (iv) the luminance image with the third neighboring pixel that is located in the diagonal direction with respect to the target pixel when the information indicates that the position of the chroma pixel is located in the intermediate of the two of the at least one luma pixel on the left side of the 2×2 luma pixel block.

5. The decoding device of claim 1, wherein each of the down-sampled luminance image and the down-sampled neighboring luminance image is further derived by using (i) a plurality of first filter coefficients or a plurality of second filter coefficients and (ii) the information.

6. The decoding device of claim 5, wherein:
the plurality of first filter coefficients is used when the position of the chroma pixel is identical to the position of the one of the at least one luma pixel, and
the plurality of second filter coefficients is used when the position of the chroma pixel is located in the intermediate of the two of the at least one luma pixel on the left side of the 2×2 luma pixel block.

7. A coding device for generating a prediction image of chrominance by using a luminance image, the coding device comprising:
coding circuitry that codes information related to a down-sampling in a sequence parameter set, the information indicating one of a plurality of position relationships between at least one luma pixel and a chroma pixel; and
a predictor that derives (i) a down-sampled luminance image by down-sampling the luminance image of a target block, (ii) a down-sampled neighboring luminance image by down-sampling a neighboring luminance image, (iii) a neighboring chrominance image and (iv) parameters from the down-sampled neighboring luminance image and the neighboring chrominance image, wherein:
each of the down-sampled luminance image and the down-sampled neighboring luminance image is derived based on the information,
the plurality of position relationships indicates that a position of the chroma pixel is identical to a position of one of the at least one luma pixel and that the position of the chroma pixel is located in an intermediate of two of the at least one luma pixel on a left side of a 2×2 luma pixel block, and
the prediction image is derived by using the down-sampled luminance image and the parameters.

8. The coding device of claim 7, wherein the down-sampled neighboring luminance image is further derived based on at least two of (i) the luminance image with a target pixel, (ii) the luminance image with a first neighboring pixel, which is located in a horizontal direction with respect to the target pixel, (iii) the luminance image with a second neighboring pixel, which is located in a vertical direction with respect to the target pixel or (iv) the luminance image with a third neighboring pixel that is located in a diagonal direction with respect to the target pixel.

9. The coding device of claim 8, wherein the down-sampled neighboring luminance image is further derived based on each of (i) the luminance image with the target pixel and (ii) the luminance image with the first neighboring pixel, which is located in the horizontal direction with respect to the target pixel when the information indicates that the position of the chroma pixel is identical to the position of the one of the at least one luma pixel.

10. The coding device of claim 8, wherein the down-sampled neighboring luminance image is further derived based on each of (i) the luminance image with the target pixel, (ii) the luminance image with the first neighboring pixel, which is located in the horizontal direction with respect to the target pixel, (iii) the luminance image with the second neighboring pixel, which is located in the vertical direction with respect to the target pixel, and (iv) the luminance image with the third neighboring pixel that is located in the diagonal direction with respect to the target pixel when the information indicates that the position of the chroma pixel is located in the intermediate of the two of the at least one luma pixel on the left side of the 2×2 luma pixel block.

11. The coding device of claim 7, wherein each of the down-sampled luminance image and the down-sampled neighboring luminance image is further derived by using (i) a plurality of first filter coefficients or a plurality of second filter coefficients and (ii) the information.

12. The coding device of claim 11, wherein:
the plurality of first filter coefficients is used when the position of the chroma pixel is identical to the position of the one of the at least one luma pixel, and
the plurality of second filter coefficients is used when the position of the chroma pixel is located in the intermediate of the two of the at least one luma pixel on the left side of the 2×2 luma pixel block.

13. A prediction image generation method for generating a prediction image of chrominance by using a luminance image, the prediction image generation method including:
deriving a down-sampled luminance image by down-sampling the luminance image of a target block based on information related to a down-sampling, the information indicating one of a plurality of position relationships between at least one luma pixel and a chroma pixel;
deriving a down-sampled neighboring luminance image by down-sampling a neighboring luminance image based on the information;
deriving a neighboring chrominance image;
deriving parameters derived from the down-sampled neighboring luminance image and the neighboring chrominance image; and
deriving the prediction image by using the down-sampled luminance image and the parameters,
wherein the plurality of position relationships indicates that a position of the chroma pixel is identical to a position of one of the at least one luma pixel and that the position of the chroma pixel is located in an intermediate of two of the at least one luma pixel on a left side of a 2×2 luma pixel block.

14. The method of claim 13, wherein the down-sampled neighboring luminance image is further derived based on at least two of (i) the luminance image with a target pixel, (ii) the luminance image with a first neighboring pixel, which is located in a horizontal direction with respect to the target pixel, (iii) the luminance image with a second neighboring pixel, which is located in a vertical direction with respect to the target pixel or (iv) the luminance image with a third neighboring pixel that is located in a diagonal direction with respect to the target pixel.

15. The method of claim 14, wherein the down-sampled neighboring luminance image is further derived based on each of (i) the luminance image with the target pixel and (ii) the luminance image with the first neighboring pixel, which is located in the horizontal direction with respect to the target pixel when the information indicates that the position of the chroma pixel is identical to the position of the one of the at least one luma pixel.

16. The method of claim 14, wherein the down-sampled neighboring luminance image is further derived based on each of (i) the luminance image with the target pixel, (ii) the luminance image with the first neighboring pixel, which is located in the horizontal direction with respect to the target pixel, (iii) the luminance image with the second neighboring pixel, which is located in the vertical direction with respect to the target pixel and (iv) the luminance image with the third neighboring pixel that is located in the diagonal direction with respect to the target pixel when the information indicates that the position of the chroma pixel is located in the intermediate of the two of the at least one luma pixel on the left side of the 2×2 luma pixel block.

17. The method of claim 13, wherein each of the down-sampled luminance image and the down-sampled neighboring luminance image is further derived by using (i) a plurality of first filter coefficients or a plurality of second filter coefficients and (ii) the information.

18. The method of claim 17, wherein:
the plurality of first filter coefficients is used when the position of the chroma pixel is identical to the position of the one of the at least one luma pixel, and
the plurality of second filter coefficients is used when the position of the chroma pixel is located in the intermediate of the two of the at least one luma pixel on the left side of the 2×2 luma pixel block.

* * * * *

UNITED STATES PATENT AND TRADEMARK OFFICE
CERTIFICATE OF CORRECTION

| | |
|---|---|
| PATENT NO. | : 11,463,701 B2 |
| APPLICATION NO. | : 17/326024 |
| DATED | : October 4, 2022 |
| INVENTOR(S) | : Tomoko Aono, Tomohiro Ikai and Takeshi Chujoh |

It is certified that error appears in the above-identified patent and that said Letters Patent is hereby corrected as shown below:

On the Title Page

Please replace item (54) and in the Specification, Column 1, Lines 1-3 with the following:
(54) CODING DEVICE PREDICTING CHROMINANCE BASED ON DOWNSAMPLED LUMINANCE Signed and Sealed this
Twenty-third Day of January, 2024

Katherine Kelly Vidal
*Director of the United States Patent and Trademark Office*